(12) United States Patent
Li et al.

(10) Patent No.: US 6,526,054 B1
(45) Date of Patent: Feb. 25, 2003

(54) SYSTEM, DEVICE, AND METHOD FOR TRANSITIONING FROM DVMRP TO BGMP FOR INTERDOMAIN MULTICAST ROUTING OVER THE INTERNET MULTICAST BACKBONE

(75) Inventors: Yunzhou Li, Lowell, MA (US); Billy C. Ng, Revere, MA (US); Shuching Shieh, Nashua, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/344,931

(22) Filed: Jun. 28, 1999

(51) Int. Cl.[7] .......................... H04L 12/46; H04L 12/56
(52) U.S. Cl. ................... 370/390; 370/395.5; 370/466; 370/401; 709/249
(58) Field of Search .......................... 370/390; 709/228, 709/235, 249

(56) References Cited

U.S. PATENT DOCUMENTS

| | | | | |
|---|---|---|---|---|
| 5,331,637 A | * | 7/1994 | Francis et al. ............... | 370/408 |
| 6,215,766 B1 | * | 4/2001 | Ammar et al. ............... | 370/229 |
| 6,216,167 B1 | * | 4/2001 | Momirov ..................... | 370/229 |
| 6,330,238 B1 | * | 12/2001 | Ooe ............................ | 370/390 |
| 6,331,983 B1 | * | 12/2001 | Haggerty et al. ........... | 370/400 |
| 6,385,647 B1 | * | 5/2002 | Willis et al. ................ | 709/217 |

* cited by examiner

*Primary Examiner*—Hassan Kizou
*Assistant Examiner*—D L Levitan
(74) *Attorney, Agent, or Firm*—Bromberg & Sunstein LLP

(57) ABSTRACT

A system, device, and method for transitioning from DVMRP to BGMP for interdomain multicast routing over the Internet multicast backbone (Mbone) switches the Mbone DVMRP distribution tree, piece by piece, into BGMP distribution trees. Each piece is a contiguous BGMP regional tree. The routers in the regional BGMP tree run an extended BGMP protocol. The root of the regional BGMP tree also runs DVMRP, and joins the Mbone DVMRP distribution tree in order to receive multicast packets and forward the multicast packets over the regional BGMP tree. The extended BGMP protocol ensures that no fowarding loops are created between the Mbone DVMRP distribution tree and the regional BGMP tree.

58 Claims, 34 Drawing Sheets

1400

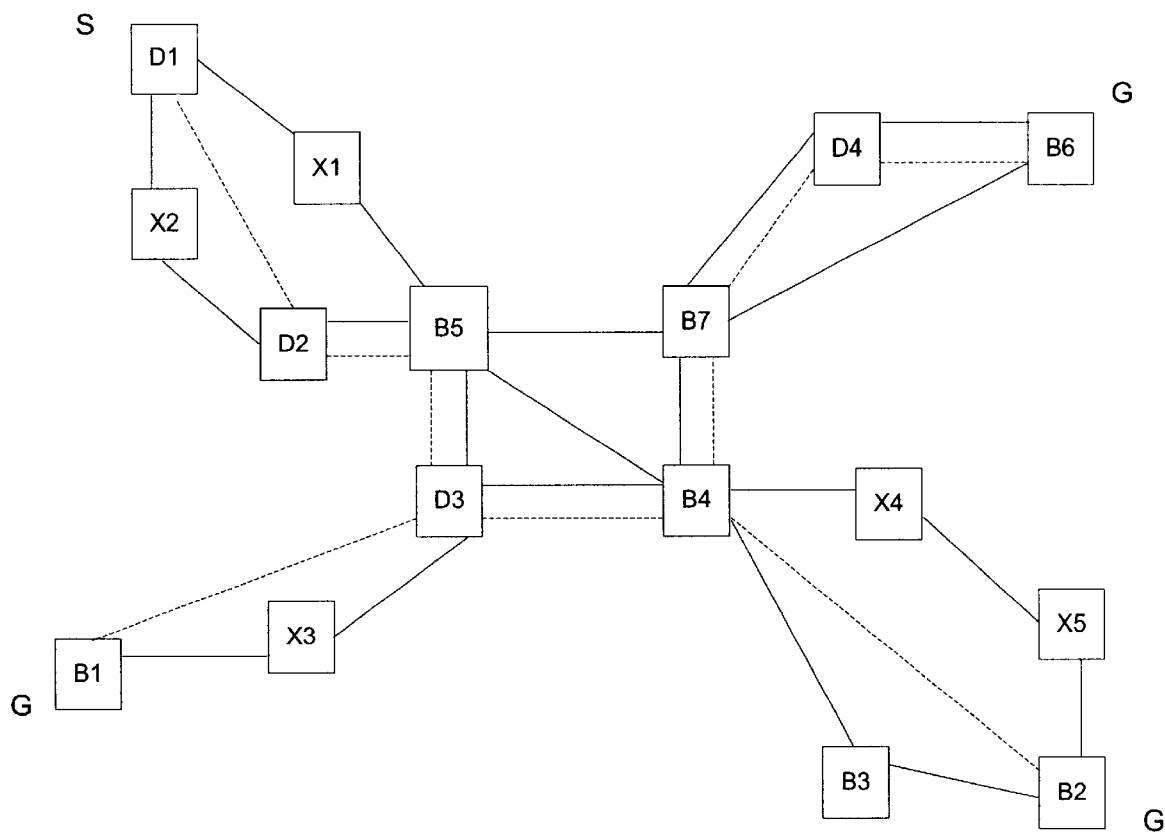
FIG. 14      1400

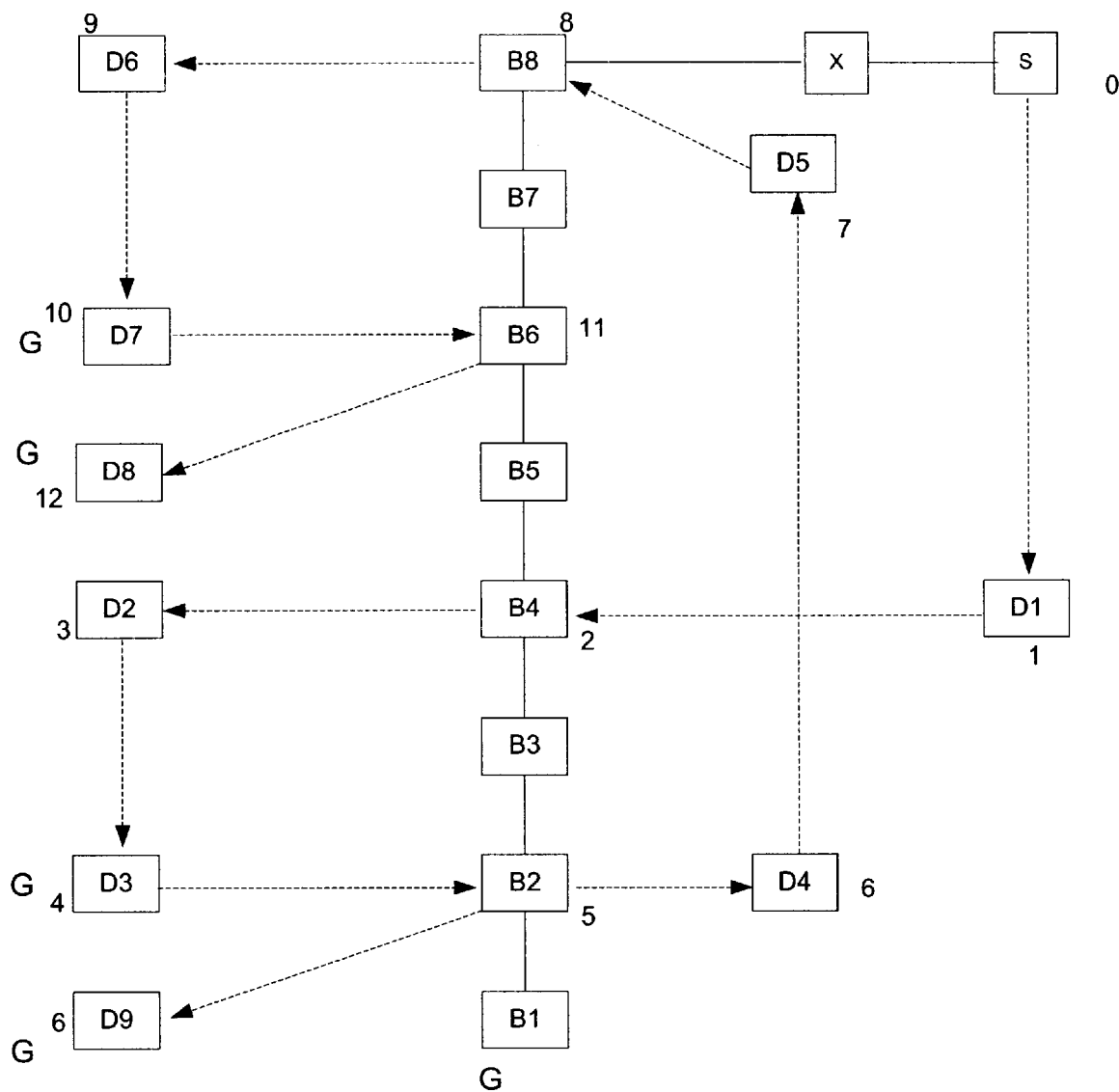
FIG. 15      1500

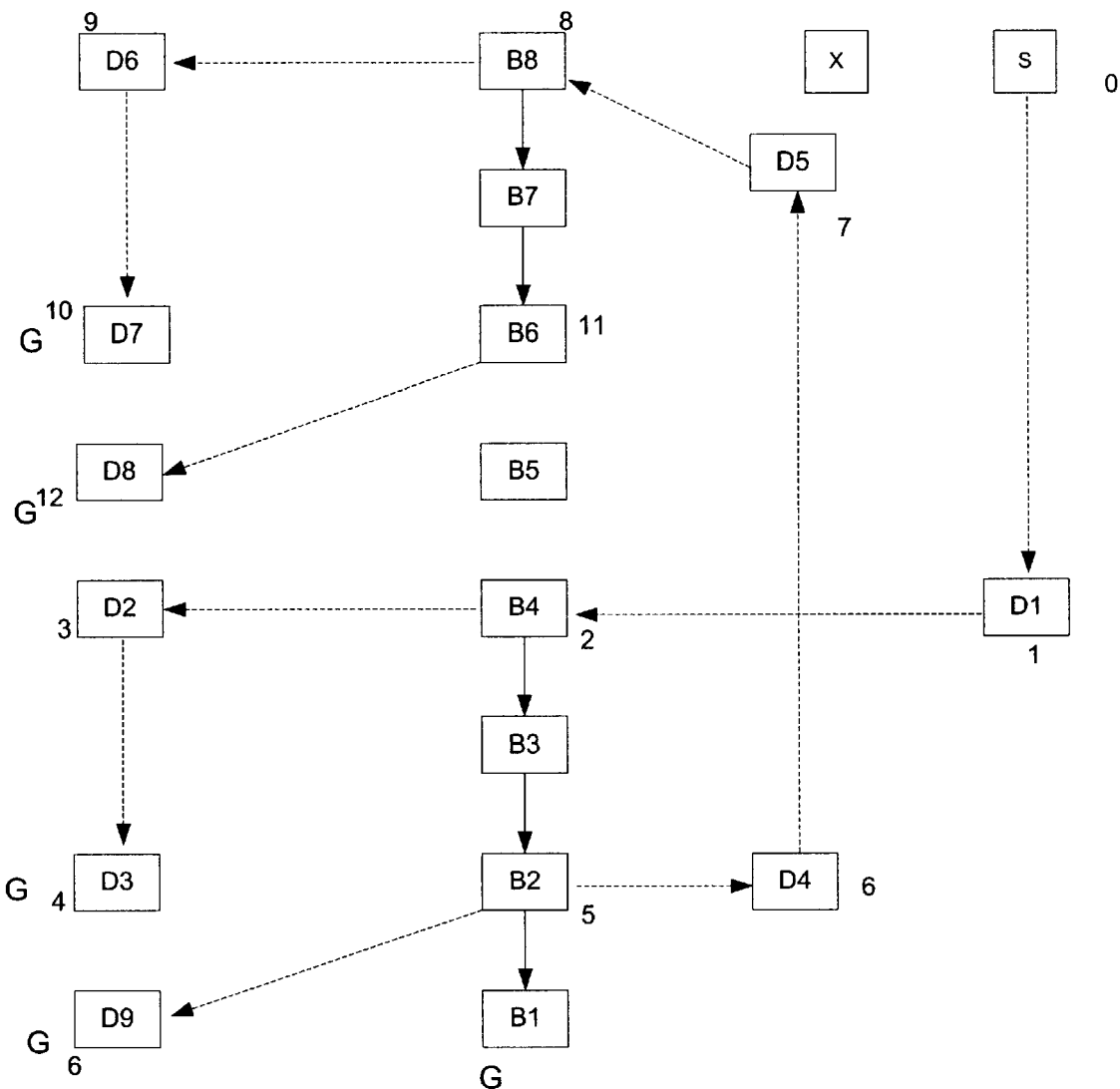
FIG. 16        1600

SYSTEM, DEVICE, AND METHOD FOR TRANSITIONING FROM DVMRP TO BGMP FOR INTERDOMAIN MULTICAST ROUTING OVER THE INTERNET MULTICAST BACKBONE

FIELD OF THE INVENTION

The present invention relates generally to communication networks, and, more particularly, to transitioning from DVMRP to BGMP for interdomain multicast routing over the internet multicast backbone.

BACKGROUND OF THE INVENTION

In today's information age, multicasting is gaining popularity as a technique for distributing information to groups of information consumers. Specifically, multicasting allows an information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast group address. The multicast clients monitor the communication network for multicast packets addressed to the multicast group.

One factor that is spurring the growth of multicast applications is the Internet Multicast Backbone (commonly referred to as the "Mbone"). The MBone is a virtual network that is layered on top of sections of the physical Internet. The Mbone is composed of a number of multicast regions or domains (i.e., sections of the Internet that have been upgraded to support multicasting) that are interconnected over virtual point-to-point links (commonly referred to as "tunnels"). Each tunnel interconnects a multicast border router in one multicast region to a multicast border router in another multicast region. The tunnels allow multicast traffic to pass from one multicast region to another multicast region over sections of the Internet that do not support multicasting.

In order to route multicast packets within a multicast region of the Mbone (i.e., intradomain multicast routing), the multicast routers within the multicast region exchange multicast routing information using a multicast routing protocol, such as Multicast Open Shortest-Path First (MOSPF), Distance Vector Multicast Routing Protocol (DVMRP), or Protocol-Independent Multicast (PIM). The multicast routers within a particular multicast region are required to run the same multicast routing protocol, although each multicast region may run a different multicast routing protocol.

In order to route multicast packets across multicast regions of the Mbone (i.e., interdomain multicast routing), the multicast border routers exchange multicast routing information using a separate multicast routing protocol. The predominant interdomain multicast routing protocol used by multicast border routers in the Mbone is DVMRP, which is a well-known protocol that is described in an Internet Draft of the Internet Engineering Task Force (IETF) entitled *Distance Vector Multicast Routing Protocol*, document draft-ietf-idmr-dvmrp-v3-08.txt (February 1999), hereby incorporated by reference in its entirety. However, the Mbone is migrating from DVMRP to the Border Gateway Multicast Protocol BGMP), which is a well-known protocol that is described in an Internet Draft of the Internet Engineering Task Force (IETF) entitled *Border Gateway Multicast Protocol (BGMP): Protocol Specification*, document draft-ietf-idmr-gum-04.txt (Nov. 17, 1998), hereby incorporated by reference in its entirety.

In order for BGMP to set up a multicast distribution tree across the Mbone, all multicast border routers in the Mbone would have to support BGMP. Therefore, in order to transition the Mbone from DVMRP to BGMP, it would be necessary to upgrade all multicast border routers to BGMP. Such upgrading of multicast border routers is unlikely within a relatively short period of time.

Instead, it would be preferable to upgrade individual multicast border routers to BGMP. Unfortunately, DVMRP and BGMP create different distribution trees, and therefore a multicast border router running BGMP will not interoperate with a multicast border router running DVMRP.

Thus, a need remains for a way upgrade a multicast border router from DVMRP to BGMP without requiring all multicast border routers to be upgraded to support BGMP.

SUMMARY OF THE INVENTION

In accordance with one aspect of the invention, a number of routers run an extended BGMP protocol in order to transition a piece of the Mbone DVMRP distribution tree to BGMP. The extended BGMP protocol allows the routers to create a regional BGMP tree that is rooted at router that is a member of the Mbone DVMRP distribution tree. The extended BGMP protocol ensures that no fowarding loops are created between the Mbone DVMRP distribution tree and the regional BGMP tree.

BRIEF DESCRIPTION OF THE DRAWINGS

The foregoing and other objects and advantages of the invention will be appreciated more fully from the following further description thereof with reference to the accompanying drawings wherein:

FIG. 14 is a block diagram showing an exemplary multicast communication network in accordance with an embodiment of the present invention;

FIG. 15 is a block diagram showing an exemplary multicast communication network prior to processing in accordance with an embodiment of the present invention; and FIG. 16 is a block diagram showing an exemplary multicast communication network subsequent to processing in accordance with an embodiment of the present invention.

DETAILED DESCRIPTION OF A PREFERRED EMBODIMENT

Figure 1A:
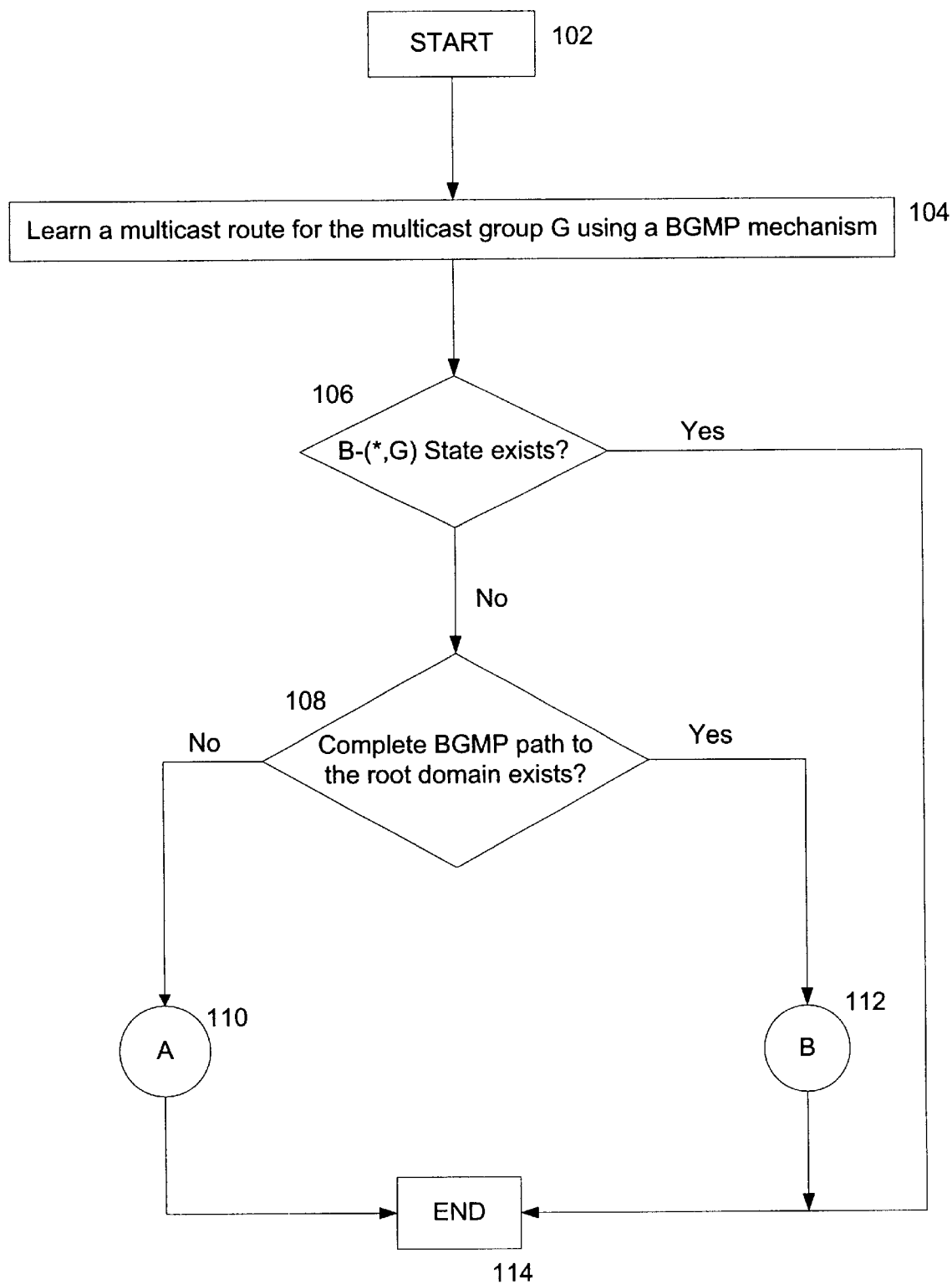
FIGS. 1A, 1B, and 1C are logic flow diagrams showing exemplary logic for originating B-Join and DB-Join for (*,G) in accordance with an embodiment of the present invention.

As discussed above, a need has remained for a way to upgrade a multicast border router from DVMRP to BGMP without requiring all multicast border routers to be upgraded to support BGMP. The present invention provides a technique for upgrading a multicast border router from DVMRP to BGMP without requiring all multicast border routers to be upgraded to support BGMP. Specifically, the present invention defines an extension to BGMP (referred to hereinafter as "DBGMP") that allows a multicast border router running DBGMP to interoperate with multicast border routers running DVMRP, BGMP, or, of course, DBGMP. Instead of upgrading a multicast border router from DVMRP to BGMP, the multicast border router is upgraded from DVMRP to DBGMP. For convenience, a router that supports DBGMP may be referred to hereinafter as a "DB-Router." Also for convenience, a DB-Router that also supports DVMRP may be referred to hereinafter as an "MDB-Router." Once all multicast border routers in the Mbone have been upgraded to DBGMP, no further upgrading is required in order to run BGMP.

Until all routers in the Mbone are upgraded to BGMP/DBGMP, a Mbone-wide BGMP distribution tree cannot be created. Therefore, DBGMP divides the Mbone-wide BGMP distribution tree into pieces, where each piece consists of a contiguous BGMP deployment. For convenience, each piece of the Mbone-wide BGMP distribution tree is referred to hereinafter as a "BGMP Regional Tree."

A "DVMRP Ingress Point" to a BGMP Regional Tree is a DB-Router that is a joint point of the Mbone DVMRP distribution tree and the BGMP Regional Tree. There may be multiple DVMRP Ingress Points in a BGMP Regional Tree. If there exists a contiguous BGMP distribution tree from the multicast source S to the multicast group G for a particular (S,G) pair, then all DVMRP Ingress Points are pruned from the Mbone DVMRP distribution tree so that only a single copy of the multicast data is distributed over the BGMP Regional Tree. Otherwise, one DVMRP Ingress Point (referred to hereinafter as the "Regional BGMP Root") becomes a root of the BGMP Regional Tree. The Regional BGMP Root is activated to receive multicast data from the Mbone DVMRP distribution tree for the (S,G) pair.

Because DVMRP and BGMP create different multicast distribution trees, it is possible for a forwarding loop to be created when a BGMP Regional Tree is created. For example, a multicast packet that originates within the Mbone DVMRP distribution tree may enter the BGMP Regional Tree through a downstream DB-Router, re-enter the Mbone DVMRP distribution tree, and then re-enter the BGMP Regional Tree through an upstream DB-Router.

In order to prevent such forwarding loops, DBGMP requires that each BGMP Regional Tree be hierarchical with a single DVMRP Ingress Point at the Regional BGMP Root. Therefore, DBGMP selects the Regional BGMP Root for a BGMP Regional Tree based upon a predetermined priority scheme, and may split the BGMP Regional Tree into a number of smaller BGMP Regional Trees in order to make each BGMP Regional Tree hierarchical with a single DVMRP Ingress Point at the Regional BGMP Root.

In a preferred embodiment of the present invention, the predetermined priority scheme is based upon a metric that is incremental hop-by-hop from the multicast source, which in turn is based upon the DVMRP metric. Each DB-Router is associated with a metric value that indicates the number of hops from the multicast source to the DB-Router over the Mbone DVMRP distribution tree. The metric value of a DVMRP Ingress Point is the DVMRP metric associated with the Mbone DVMRP distribution tree. The metric value of a non-DVMRP DB-Router is defined to be "infinity," since the non-DVMRP DB-Router is not part of the Mbone DVMRP distribution tree. The metric value of a border router for the source domain is defined as zero (0). Since DVMRP does not have a universal (wildcard) state for a multicast group G [i.e., a (*,G) state], there is no DVMRP metric for a multicast group G. Therefore, the metric value of an intermediate DB-Router to a multicast group G is defined as "infinity." However, the metric value of a border router for the multicast group's root domain is defined as zero (0).

In order to prevent forwarding loops between the Mbone DVMRP distribution tree and the BGMP Regional Tree, the Regional BGMP Root must be the closest DVMRP Ingress Point to the multicast source, and therefore must have the lowest metric value among all DVMRP Ingress Points in the BGMP Regional Tree. Therefore, if a DVMRP Ingress Point is determined to have a lower metric value than the Regional BGMP Root within a particular BGMP Regional Tree, then that DVMRP Ingress Point (referred to hereinafter as a "DBGMP Break Point") prunes itself from the BGMP Regional Tree and becomes the Regional BGMP Root of a new BGMP Regional Tree. Within a BGMP Regional Tree, only the Regional BGMP Root is activated to receive multicast data from the Mbone DVMRP distribution tree, and the downstream DVMRP Ingress Points (if any) are pruned from the Mbone DVMRP distribution tree.

Because the topology of the Mbone DVMRP distribution tree may change over time, it is necessary for DBGMP Break Points to be identified and pruned. Therefore, the Regional BGMP Root broadcasts its metric value to the downstream DB-Routers in the BGMP Regional Tree using a mechanism that is described in more detail below. For convenience, the metric value associated with the Regional BGMP Root of a BGMP Regional Tree may be referred to as the "BGMP Regional MD-Metric for (S,G)," since that metric value represents the lowest possible metric value for the BGMP Regional Tree. Each downstream DB-Router in the BGMP Regional Tree compares its own metric value to the BGMP Regional MD-Metric for (S,G). If a downstream DB-Router has a lower metric value than the BGMP Regional MD-Metric for (S,G), then that DB-Router is a DBGMP Break Point, in which case the DBGMP Break Point prunes itself from the BGMP Regional Tree in order to become the Regional BGMP Root of a new BGMP Regional Tree.

In order for a router to join the Mbone DVMRP distribution tree and/or a BGMP Regional Tree, the router maintains forwarding states that define the incoming and outgoing interfaces over which multicast packets are received and forwarded, respectively. In a typical embodiment, the router supports separate forwarding tables for DVMRP forwarding states and BGMP forwarding states. Specifically, the router supports a DVMRP forwarding table for maintaining DVMRP forwarding states and a BGMP forwarding table for maintaining BGMP forwarding states.

A DVMRP router utilizes a DVMRP "graft" (MD-Graft) message to join the Mbone DVMRP distribution tree, and utilizes a DVMRP "prune" (MD-Prune) message to leave the Mbone DVMRP distribution tree. The DVMRP router maintains DVMRP forwarding states in the DVMRP forwarding table. For convenience, a (S,G) state created in accordance with DVMRP is referred to hereinafter as a "MD-(S,G) State."

A BGMP router utilizes a BGMP "join" (B-Join) message to join the BGMP distribution tree, and utilizes a BGMP "prune" (B-Prune) message to leave the BGMP distribution tree. The BGMP router maintains BGMP forwarding states in the BGMP forwarding table. For convenience, a (S,G) state created in accordance with BGMP is referred to hereinafter as a "B-(S,G) State," and a (*,G) state created in accordance with BGMP is referred to hereinafter as a "B-(*,G) State."

DBGMP defines a DBGMP "join" (DB-Join) message that is used by a DB-Router to join a BGMP Regional Tree, and a DBGMP "root" (DB-Root) message that is sent by the Regional BGMP Root to indicate the Regional BGMP Root for the BGMP Regional Tree. The DB-Join message is similar to the B-Join message, but is driven by the MD-(S,G) State. The DB-Join message is propagated upstream hop-by-hop within the BGMP Regional Tree. The DB-Root message is propagated downstream hop-by-hop within the BGMP Regional Tree, and includes a MD-Metric indicating the metric value associated with the Regional BGMP Root so that each downstream MDB-Router can determine whether it is a Break Point MDB-Router. Together, the DB-Join message and the DB-Root message perform essentially the same function as the B-Join message. However, the DB-Root message may be flooded downstream separately in order to indicate a new Regional BGMP Root. The use of the DB-Join and DB-Root messages is described in more detail below.

DBGMP also defines a number of operational states. These operational states are not used for data forwarding, and therefore are stored separately from the forwarding tables, for example, in a DBGMP join table. DBGMP creates a (*,G) state [referred to hereinafter as a "DB-(*,G) State"] in order to probe a Global BGMP Root (i.e., a root of the global BGMP distribution tree) for a corresponding B-(*,G) State. DBGMP creates a (S,G) state [referred to hereinafter as a "DB-(S,G) State"] in order to probe the Regional BGMP, Root for a corresponding B-(S,G) State. The DB-(*,G) State and the DB-(S,G) State are transitory, and are changed into a B-(*,G) State and a B-(S,G) State, respectively, upon receiving a DB-Root message as described in detail below. For convenience, a DB-(*,G) State or a DB-(S,G) State is considered to be "pending" prior to receiving the DB-Root message, and is considered to be "confirmed" after receiving the DB-Root message. The use of the DB-(*,G) State and the DB-(S,G) State is described in more detail below.

In order to forward a multicast packet for (S,G) over a particular multicast distribution tree, a DB-Router must determine the valid incoming and outgoing interfaces associated with the multicast distribution tree. As discussed above, each forwarding state is associated with incoming and outgoing interfaces. Thus, the DB-Router associates each MD-(S,G) State with its respective incoming and outgoing interfaces, the B-(*,G) State with its respective incoming and outgoing interfaces, and the B-(S,G) State with its respective incoming and outgoing interfaces.

A MD-(S,G) State is considered to be "active" if there is at least one steady outgoing interface associated with the MD-(S,G) State. Assuming the MD-(S,G) State is active, an incoming interface associated with the MD-(S,G) State is considered to be "preferred" if the router accepts multicast-data from an upstream DVMRP neighbor over the incoming interface. The incoming interface is considered to be "deprecated" if the router is joined to the upstream DVMRP neighbor but does not accept multicast data from the upstream DVMRP neighbor over the incoming interface. The incoming interface is considered to be "pruned" when router is pruned from the upstream DVMRP neighbor.

An incoming interface associated with the B-(S,G) State is considered to be "preferred" if the router accepts multicast data from a BGMP parent target over the incoming interface. The incoming interface is considered to be "deprecated" if the router is joined to the BGMP parent target but does not accept multicast data from the BGMP parent target over the incoming interface. The incoming interface is considered to be "pruned" when the router is pruned from the BGMP parent target.

An incoming interface associated with the B-(*,G) State is always preferred. Therefore, when the B-(*,G) State is present, the incoming interfaces associated with all B(S,G) States and all MD-(S,G) States are pruned for all multicast sources S.

In the discussion below, it is often necessary to refer to a neighboring router of a DB-Router. In order to differentiate between a neighboring router from the perspective of DVMRP and a neighboring router from the perspective of BGMP, different terms are used. For DVMRP, the terms "upstream neighboring router" and "downstream neighboring router" are used to reference an upstream (i.e., closer to the multicast source) or downstream (i.e., further from the multicast source) neighboring router, respectively. For BGMP, the terms "parent peer" and "child peer" are used to reference an upstream (i.e., closer to the multicast source) or downstream (i.e., further from the multicast source) neighboring router, respectively. Also for BGMP, a DB-Router maintains a list of child peers. For convenience, this list is referred to as a "child target list." A child peer may be added to the child target list as a member of the child target list or as a pending member of the child target list. For convenience, a child peer that is a pending member of the child target list is referred to as a "pending peer."

Originating B-Join and DB-Join for (*,G)

When a DB-Router is a border router for a domain with membership for the multicast group G and the DB-Router learns a multicast route for the multicast group G from BGMP, the DB-Router joins the BGMP distribution tree.

If there does not exist a complete BGMP path from the DB-Router to the root domain, the DB-Router does not have a B-(*,G) State or a DB-(*,G) State, and the next hop router towards the multicast group G is a DB-Router, then the DB-Router creates a pending DB-(*,G) state and sends DB-Join to the next hop router towards the multicast group G.

If there exists a complete BGMP path from the DB-Router to the root domain but the DB-Router does not have a B-(*,G) State, then the DB-Router creates a B-(*,G) State and sends a B-Join message to the next hop router towards the multicast group G. For each B-(S,G) State that has an unpruned incoming interface and has a different parent target than the B-(*,G) parent target, the DB-Router sends a B-Prune message to the B-(S,G) parent target and sets the B-(S,G) incoming interface pruned. Also, for each MD-(S,G) State that has an unpruned incoming interface and has an upstream neighboring router that is different from the B-(*,G) parent target, the DB-Router sends a MD-Prune message to the MD-(S,G) upstream neighboring router and sets the MD-(S,G) incoming interface pruned. In this case, the DB-Router may be a BGMP speaker without DBGMP support.

Otherwise, the DB-Router is already joined to the BGMP distribution tree, and therefore takes no further action.

Figure 1B:
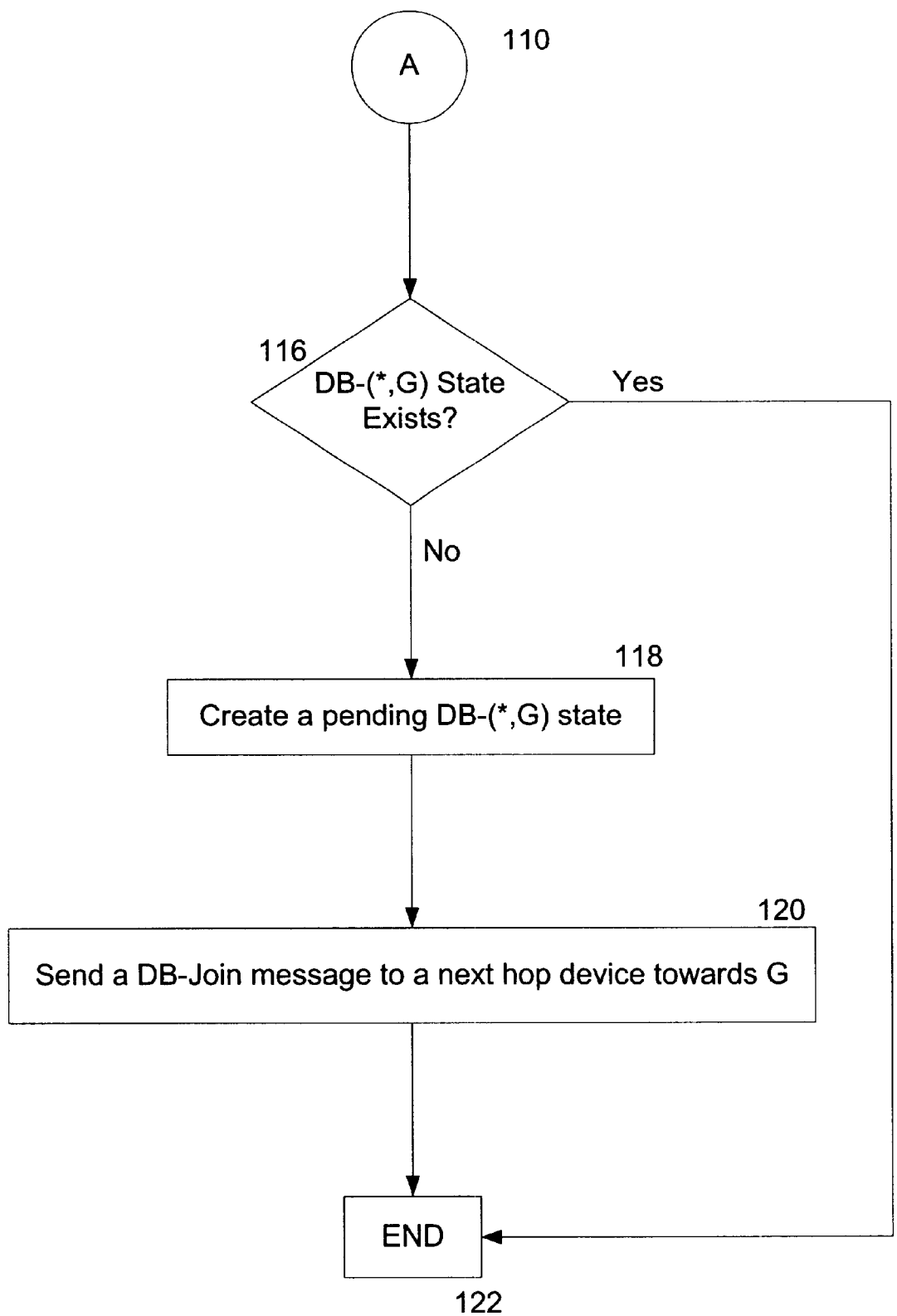
Figure 1C:
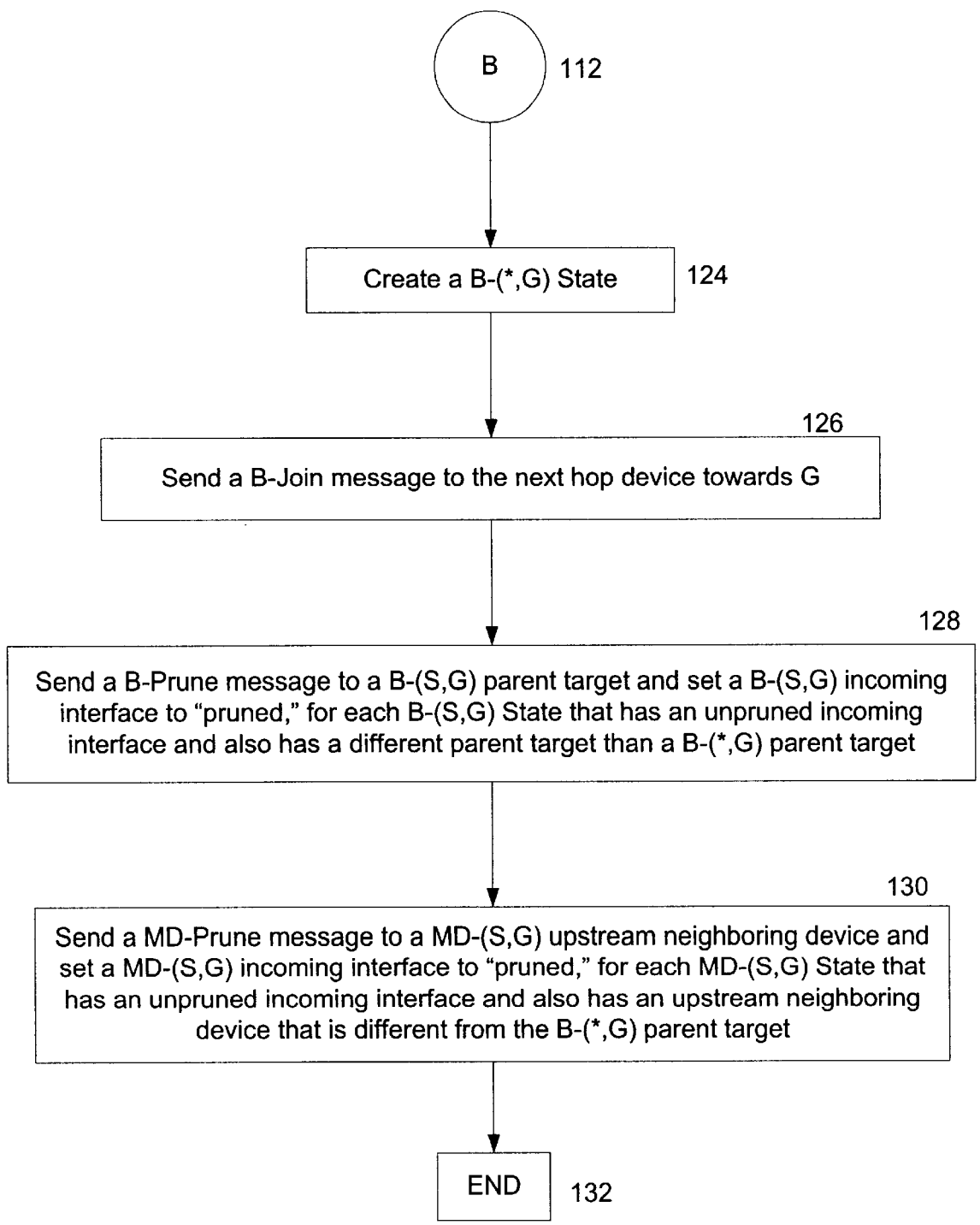

FIGS. 1A, 1B, and 1C show exemplary border router logic for originating B-Join and DB-Join for (*,G). After starting in step 102, and upon learning a multicast route for the multicast group G using a BGMP mechanism, in step 104, the logic determines whether the router has a B-(*,G) State, in step 106. If the router has a B-(*,G) State (YES in step 106), then the logic terminates in step 114. If the logic does not have a B-(*,G) State (NO in step 106), then the logic determines whether there exists a complete BGMP path to the root domain, in step 108. If there does not exist a complete BGMP path to the root domain, then the logic proceeds to step 110; otherwise, the logic proceeds to step 112. The logic then terminates in step 114.

From step 110 (FIG. 1B), the logic determines whether the router has a DB-(*,G) State, in step 116. If the router has a DB-(*,G) State (YES in step 116), then the logic terminates in step 122. If the router does not have a DB-(*,G) State (NO in step 116), then the logic creates a pending DB-(*,G) State, in step 118, sends a DB-Join message to the next hop router towards the multicast group G, in step 120, and terminates in step 122.

From step 112 (FIG. 1C), the logic creates a B-(*,G) State, in step 124, and sends a B-Join message to the next hop router towards the multicast group G, in step 126. Then, for each B-(S,G) State that has an unpruned incoming interface and also has a different parent target than the B-(*,G) parent target, the logic sends a B-Prune message to the B-(S,G) parent target and sets the B-(S,G) incoming interface to "pruned," in step 128. Also, for each MD-(S,G) State that has an unpruned incoming interface and also has an upstream neighboring device that is different from the B-(*,G) parent target, the logic sends an MD-Prune message to the MD-(S,G) upstream neighboring device and sets the MD-(S,G) incoming interface to "pruned," in step 130. The logic terminates in step 132.

Originating B-Join and DB-Join for (S,G)

When a DB-router detects an active MD-(S,G) state and the DB-Router does not have a B-(*,G) State, a B-(S,G) State or a DB-(S,G) State, the DB-Router determines whether the next hop router towards the multicast source S supports DBGMP. If the next hop router towards the multicast source S supports DBGMP, then the DB-Router creates a DB-(S,G) State and sends a DB-Join message to the next hop router towards the multicast source S.

Figure 2A:
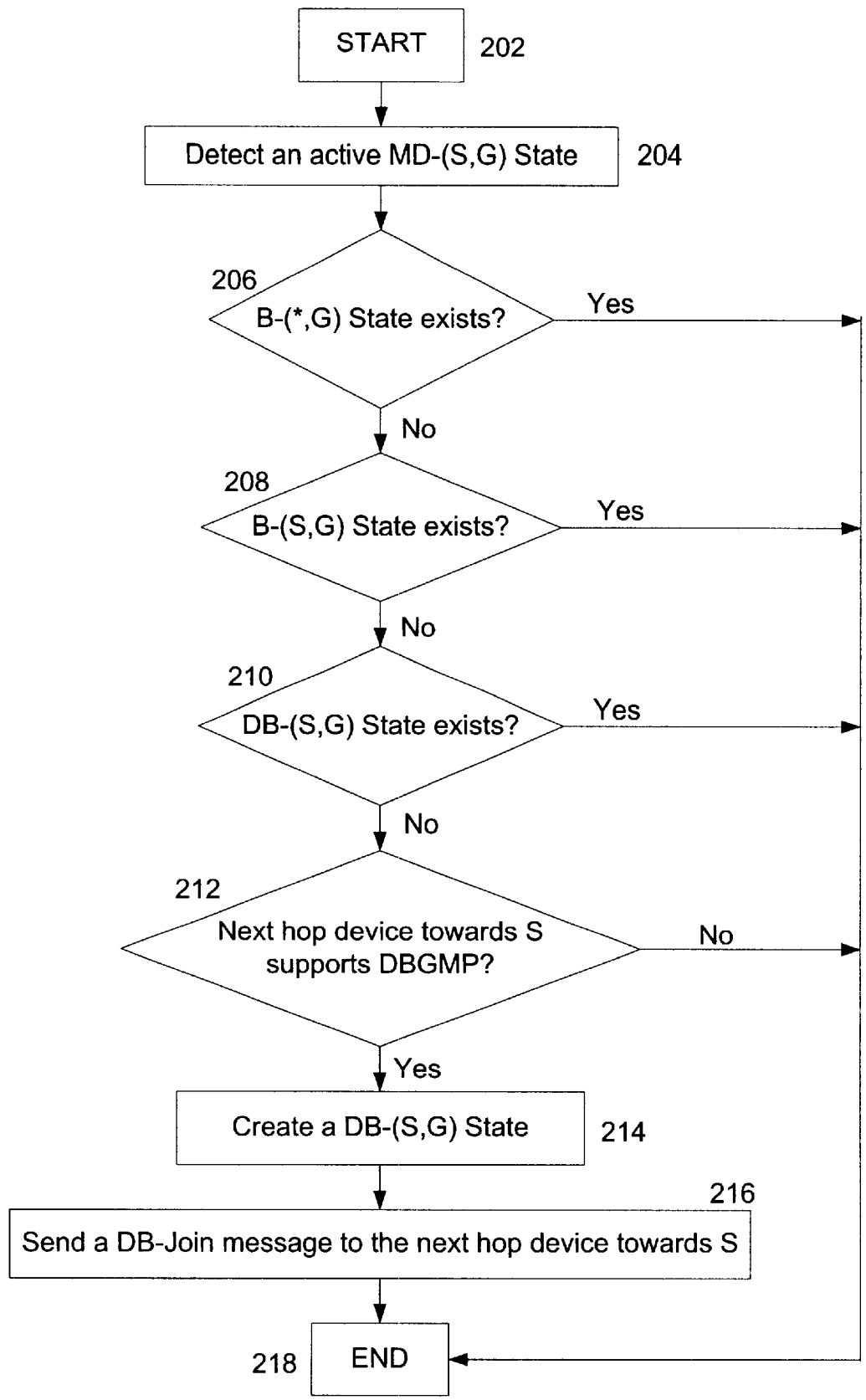
FIGS. 2A and 2B are logic flow diagrams showing exemplary logic for originating B-Join and DB-Join for (S,G) in accordance with an embodiment of the present invention.

FIG. 2A shows exemplary logic for originating DB-Join for (S,G). After starting in step 202, and upon detecting an active MD-(S,G) State in step 204, the logic creates a DB-(S,G) State, in step 214, and sends a DB-Join message to the next hop router towards the multicast source S, in step 216, if the router does not have the B-(*,G) State (NO in step 206), the B-(S,G) State (NO in step 208), the DB-(S,G) State (NO in step 210) and the next hop router towards the multicast source S supports DBGMP (YES in step 212).

If the DB-Router is a border router for a domain associated with an (S,G) state and the multicast source S is in a remote domain, then the DB-Router creates a B-(S,G) State and sends a B-Join message to the next hop router toward the multicast source S, if there exists a complete BGMP path from the DB-Router to the source domain and the DB-router has neither a B(*,G) State nor a B-(S,G) State. In this case, the DB-Router may be a BGMP speaker without DBGMP support. The B-(S,G) incoming interface is set preferred.

Figure 2B:
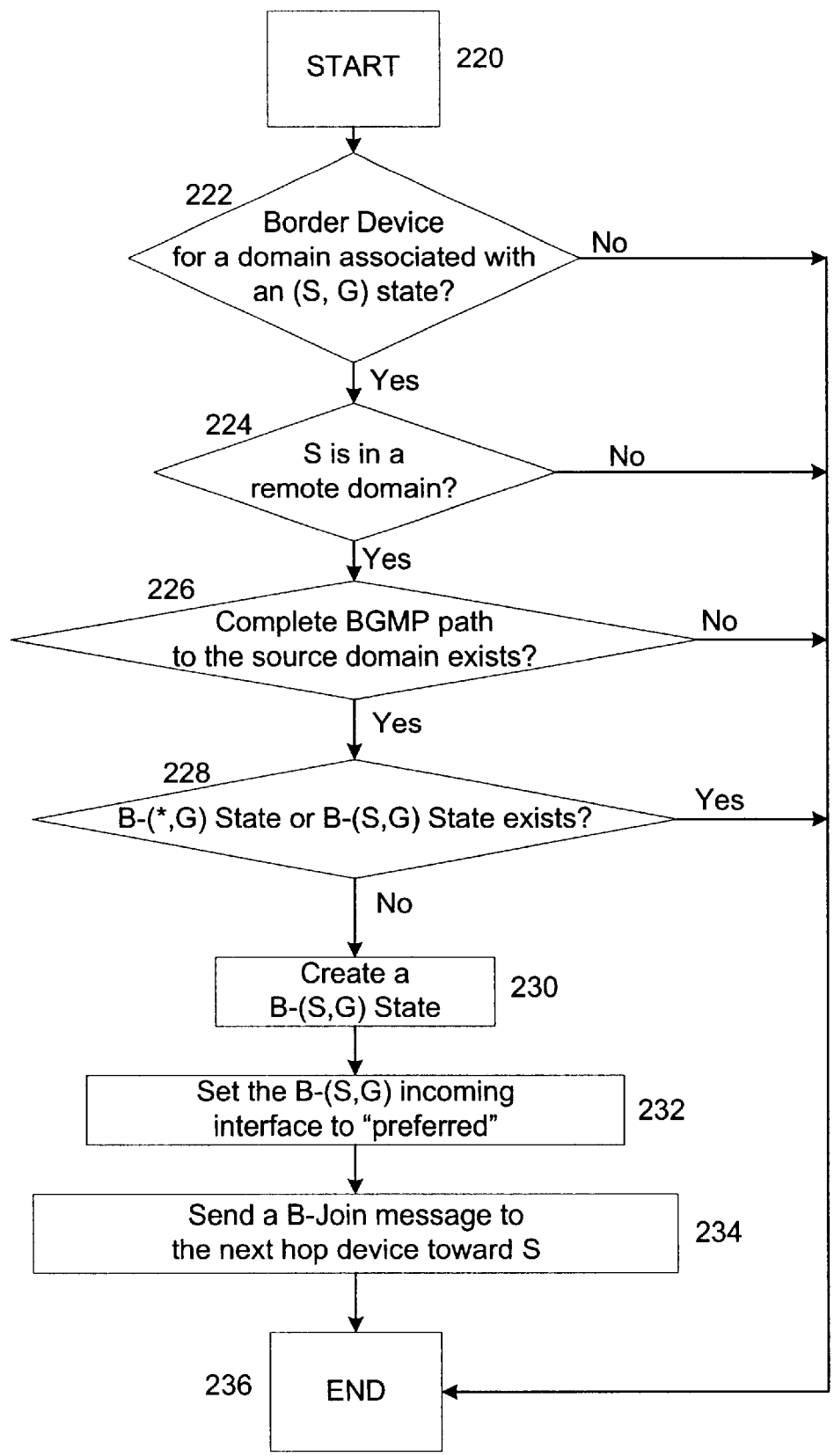

FIG. 2B shows exemplary logic for originating B-Join for (S,G). After starting in step 220, if the router is a border router for a domain associated with (S,G) (YES in step 222), the logic creates a B-(S,G) State, in step 230, sets the B-(S,G) incoming interface to "preferred," in step 232, and sends a B-Join message to the next hop router towards the multicast source S, in step 234, if the multicast source S is in a remote domain (YES in step 224), there exists a complete BGMP path to the source domain (YES in step 226), and the router has neither the B-(*,G) State nor the B-(S,G) State (NO in step 228).

In either case, the DB-Router determines the next hop DB-Router toward the multicast source S by checking if there is any multicast route for the source that is learned from BGMP. If not, the DB-Router may rely on unicast routes for transition.

Receiving B-Join

Upon receiving a B-Join message, a DB-Router first processes the B-Join message in accordance with the BGMP protocol. Then, the DB-Router deletes any DBGMP operational states [i.e., the DB-(*,G) State and the DB-(S,G) State, if either exists], and determines the states of the various incoming interfaces. Specifically, if a B-(S,G) State is created from the processing of the B-Join message, then the B-(S,G) incoming interface is set to "pruned," if the B-(*,G) State exists, or to "preferred," if the B-(*,G) State does not exist. If, instead, a B-(*,G) State is created from the processing of the B-Join message, then each B-(S,G) incoming interface is set to "pruned," if the B-(*,G) parent target differs from B-(S,G) parent target, and each MD-(S,G) incoming interface is set to "pruned," if the B (*,G) parent target differs from MD-(S,G) upstream neighbor.

Figure 3A:
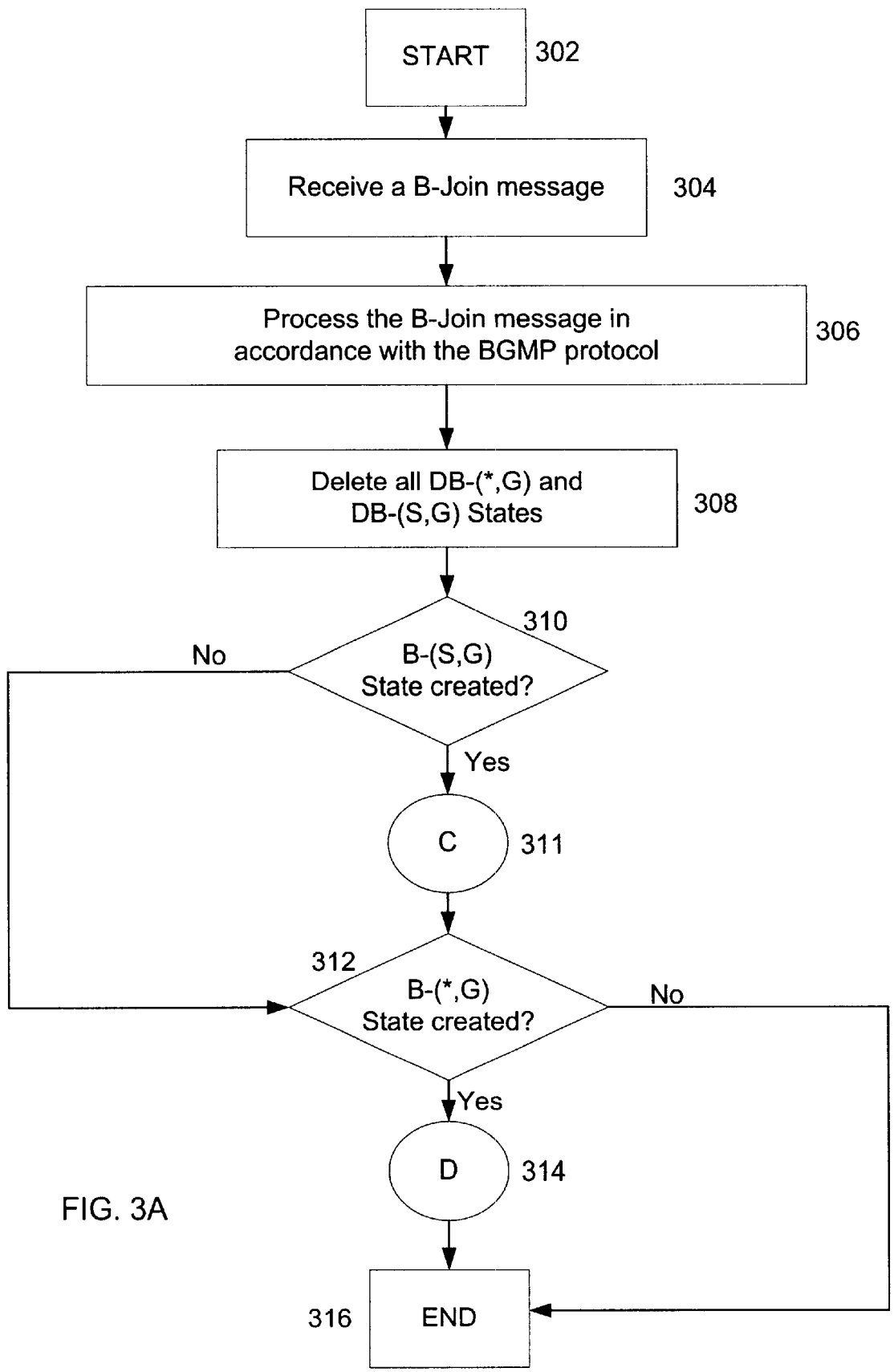
FIGS. 3A, 3B, and 3C are logic flow diagrams showing exemplary logic for processing a B-Join in accordance with an embodiment of the present invention.
Figure 3B:
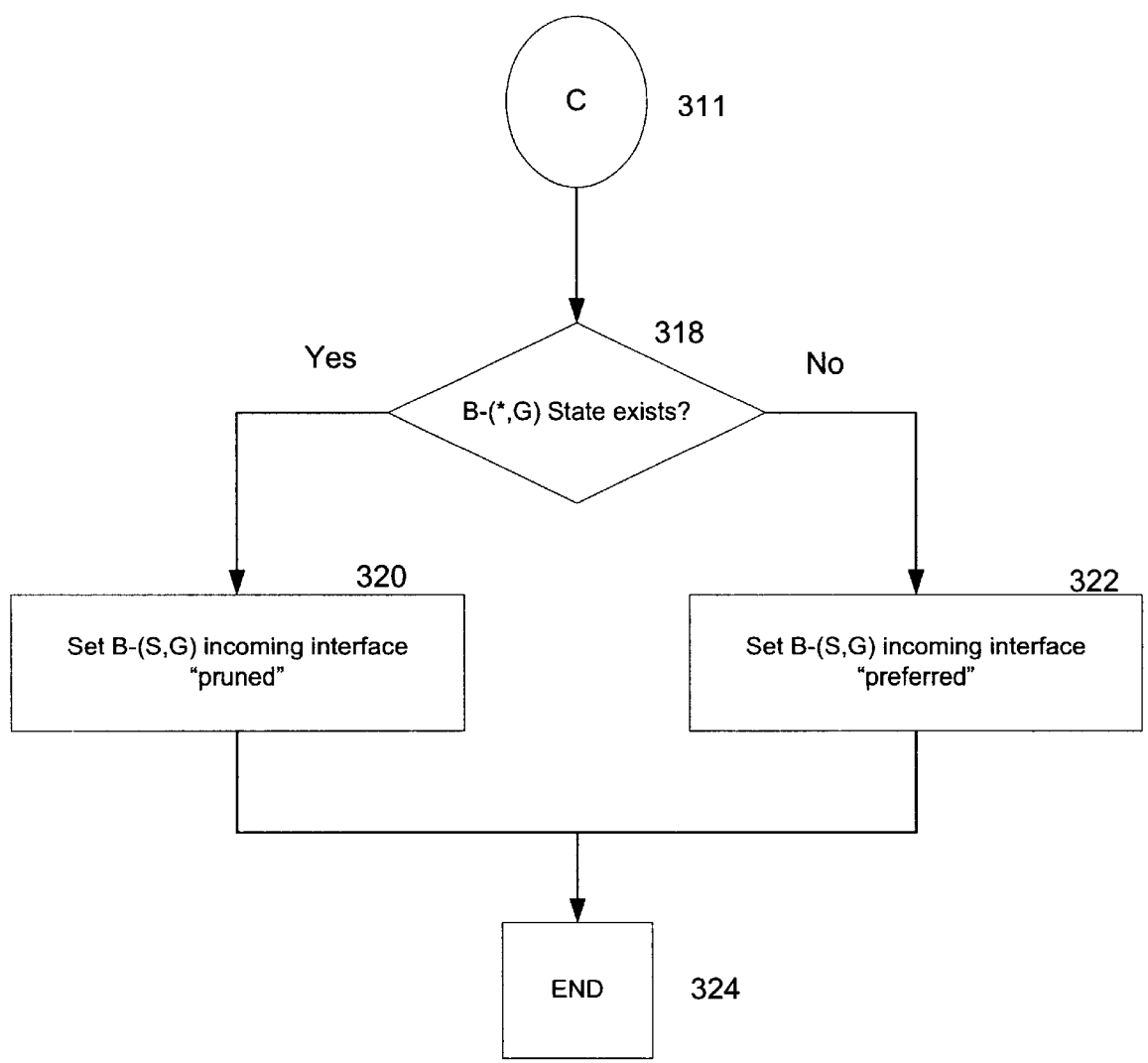
Figure 3C:
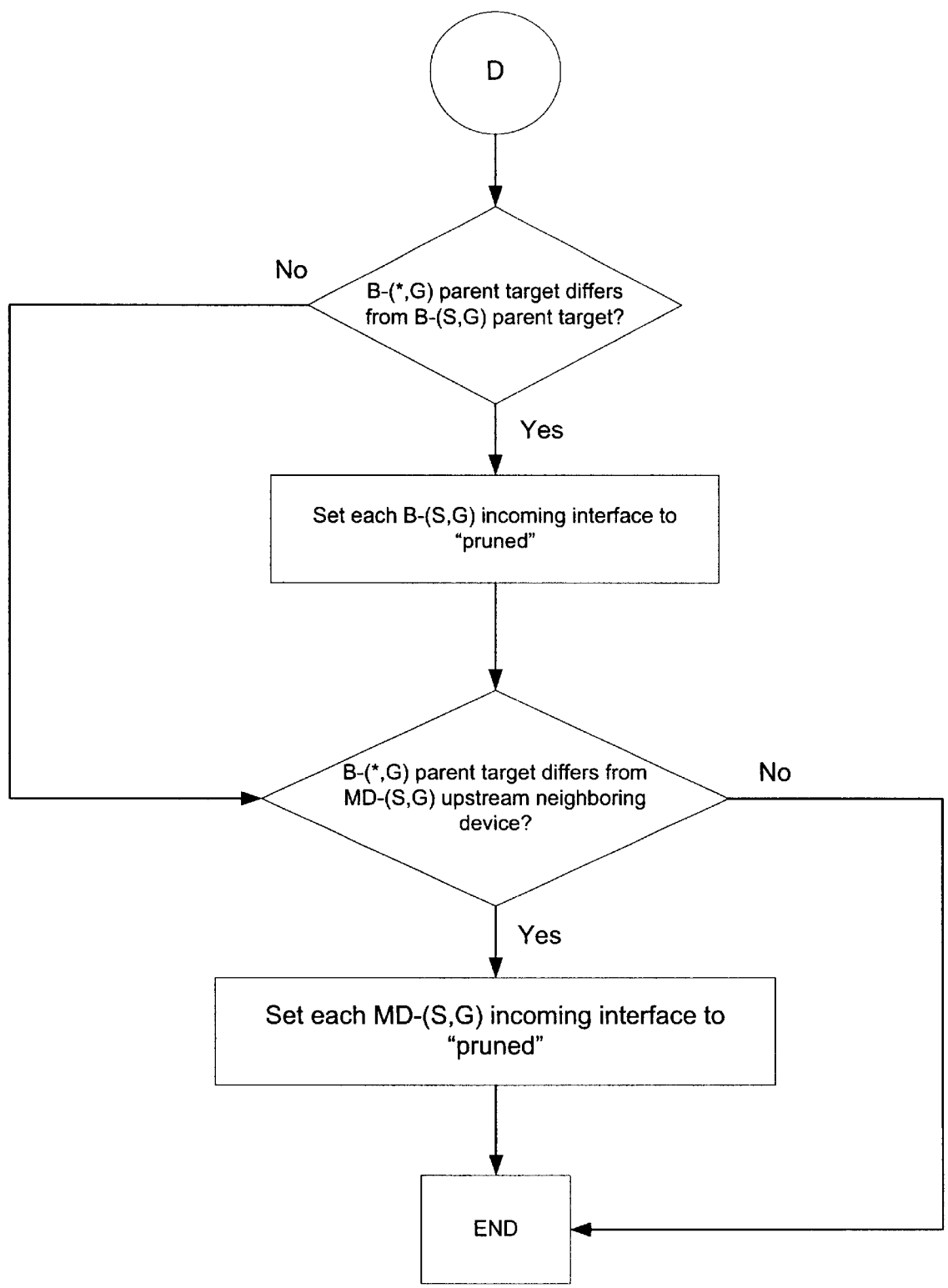

FIGS. 3A, 3B, and 3C show exemplary logic for processing a B-Join message. After starting in step 302, and upon receiving a B-Join message in step 304, the logic processes the B-Join message in accordance with the BGMP protocol, in step 306. The logic then deletes all DB-(*,G) and DB-(S,G) States, in step 308. If a B-(S,G) State was created as a result of processing the B-Join message (YES in step 310), then the logic proceeds to step 311. If a B-(*,G) State was created as a result of processing the B-Join message (YES in step 312), then the logic proceeds to step 314. The logic terminates in step 316.

From step 311 (FIG. 3B), the logic determines whether the router has a B-(*,G) State, in step 318. If the router has the B-(*,G) State (YES in step 318), then the logic sets the B-(S,G) incoming interface to "pruned." If the router does not have the B-(*,G) State (NO in step 318), then the logic sets the B-(S,G) incoming interface to "preferred."From step 314 (FIG. 3C), the logic determines whether the B-(*,G) parent target differs from the B-(S,G) parent target. If the B-(*,G) parent target differs from the B-(S,G) parent target (YES in step 326), then the logic sets each B-(S,G) incoming interface to "pruned," in step 328, and proceeds to step 330. If the B-(*,G) parent target is the same as the B-(S,G) parent target (NO in step 326), then the logic proceeds to step 330.

In step 330, the logic determines whether the B-(*,G) parent target differs from the MD-(S,G) upstream neighboring device. If the B-(*,G) parent target differs from the MD-(S,G) upstream neighboring device (YES in step 330), then the logic sets each MD-(S,G) incoming interface to "pruned."

Receiving DB-Join for (*,G) from Child Peer

Upon receiving a DB-Join message for (*,G) from a child peer, a DB-Router processes the DB-Join message as follows.

If the DB-Router has a B-(*,G) State, then the DB-Router returns a DB-Root message to the child peer with MD-Metric set to zero (0), and adds the child peer to the child target list. Otherwise, if the DB-Router has a "pending" DB-(*,G) state, then the DB-Router adds the child as a pending peer to the child target list.

Otherwise, if the DB-Router has a "confirmed" DB-(*,G) state, which means that there is no complete BGMP path to the root domain, then the DB-Router returns a DB-Root message to the child peer with MD-Metric set to "infinity."

Otherwise, if the next hop router towards the multicast group G does not support DBGMP, then the DB-Router returns a DB-Root message to the child peer with MD-Metric set to "infinity."

Otherwise, if the DB-Router is a border router for the root domain, then the DB-Router creates a B-(*,G) State, adds the child to the child target list, and returns a DB-Root message to the child peer with MD-Metric set to zero (0).

Otherwise, the DB-Router creates a DB-(*,G) State, forwards a DB-Join message to the next hop router towards the multicast group G, and adds the child peer as a pending peer to the child target list.

Figure 4:
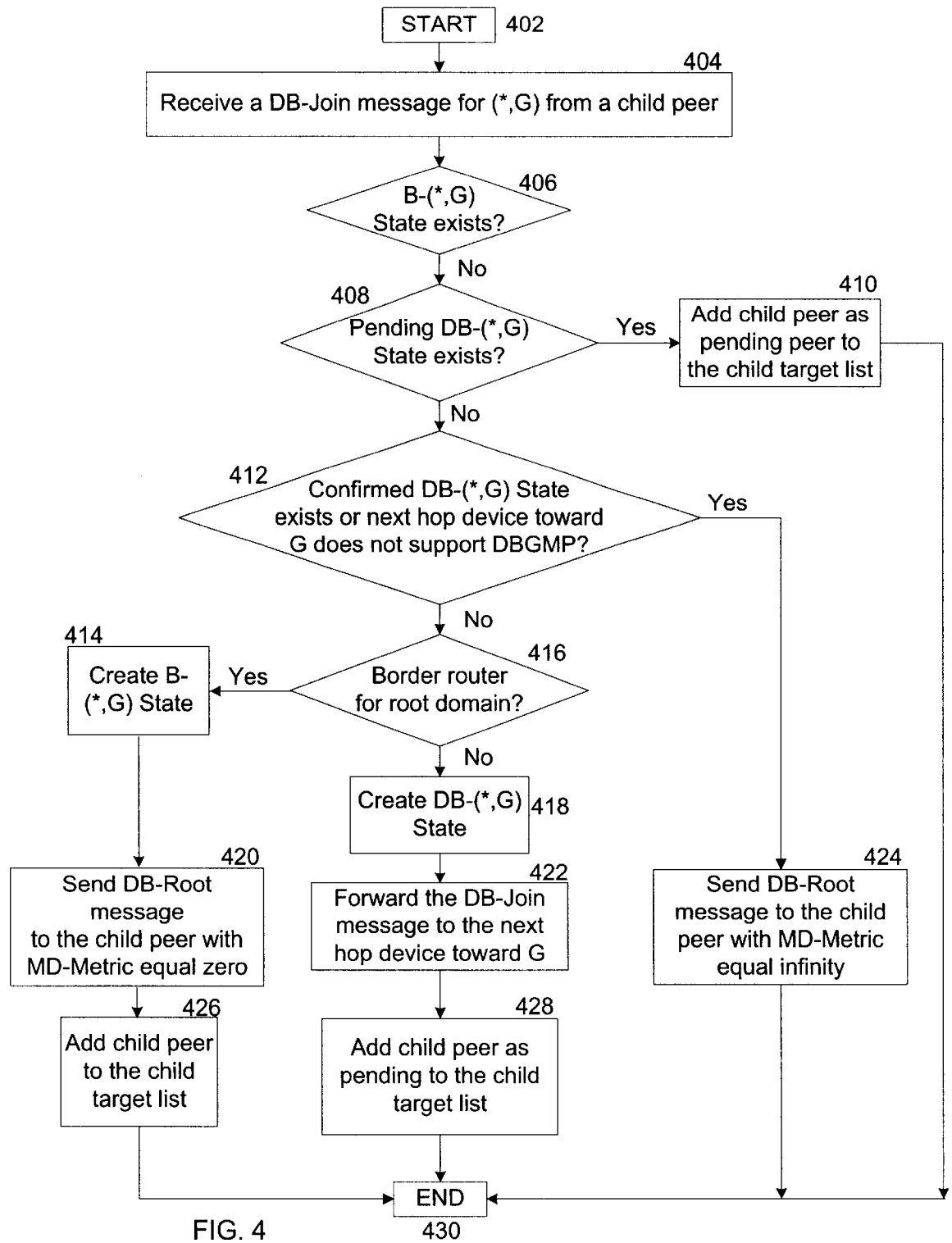
FIG. 4 is a logic flow diagram showing exemplary logic for processing a DB-Join for (*,G) in accordance with an embodiment of the present invention.

FIG. 4 shows exemplary logic for processing a DB-Join message for (*,G) received from a child peer. After starting in step 402, and upon receiving a DB-Join message for (*,G) from a child peer in step 404, the logic determines whether the router has a B-(*,G) State, in step 406. If the router has a B-(*,G) State (YES in step 406), then the logic sends a DB-Root message to the child peer with MD-Metric equal to zero (0), in step 420, adds the child peer to the child target list, in step 426, and terminates in step 430.

If the router does not have the B-(*,G) State (NO in step 406), then the logic proceeds to determine whether the router has a pending DB-(*,G) State, in step 408. If the router has the pending DB-(*,G) State (YES in step 408), then the logic adds the child peer as a pending peer to the child target list, in step 410, and terminates in step 430.

If the router does not have the pending DB-(*,G) State (NO in step 408), then the logic proceeds to determine whether the router has a confirmed DB-(*,G) State or the next hop router towards the multicast group G does not support DBGMP, in step 412. If the router has a confirmed DB-(*,G) State or the next hop router towards the multicast group G does not support DBGMP (YES in step 412), then the logic sends a DB-Root message to the child peer with MD-Metric equal to "infinity," in step 424, and terminates in step 430.

If the router does not have a confirmed DB-(*,G) State and the next hop router towards the multicast group G supports DBGMP (NO in step 412), then the logic proceeds to determine whether the router is a border router for the root domain, in step 416. If the router is a border router for the root domain (YES in step 416), then the logic creates a B-(*,G) State, in step 414, sends a DB-Root message to the child peer with MD-Metric equal to zero (0), in step 420, adds the child peer to the child target list, in step 426, and terminates in step 430. If the router is not a border router for the root domain (NO in step 416), then the logic creates a DB-(*,G) State, forwards the DB-Join message to the next hop router towards the multicast group G, in step 422, adds the child peer as a pending peer to the child target list, in step 428, and terminates in step 430.

Receiving DB-Join for (S,G) from Child Peer

Upon receiving a DB-Join message for (S,G) from a child peer, a DB-Router processes the DB-Join message as follows.

If the DB-Router has a B-(S,G) State, then the DB-Router adds the child to the child target list, and returns a DB-Root message to the child peer with MD-Metric equal to the BGMP Regional MD-Metric for (S,G).

Otherwise, if the DB-Router has a DB-(S,G) State, then the DB-Router adds the child as a pending peer to the child target list.

Otherwise, if the DB-Router has a B-(*,G) State, then the DB-Router creates a B-(S,G) State, sets the B-(S,G) incoming interface to "pruned," adds the child to the child target list, and returns a DB-Root message to the child peer with MD-Metric set to zero (0).

Otherwise, if the next hop router towards the multicast source S is not a DB-Router, then the DB-Router creates a B-(S,G) State, sets the B-(S,G) incoming interface to "pruned," adds the child to the child target list, and returns a DB-Root message to the child peer with MD-Metric equal to the metric value of the DB-Router.

Otherwise, if the DB-Router is a border router for the source domain, then the DB-Router creates a B-(S,G) State, sets the B-(S,G) incoming interface to "pruned," adds the child to the child target list, and returns a DB-Root message to the child peer with MD-Metric equal to zero (0).

Otherwise, the DB-Router.creates a DB-(S,G) State, sends a DB-Join message to the next hop router towards the multicast source S, and adds the child as a pending peer to the child target list.

Figure 5:
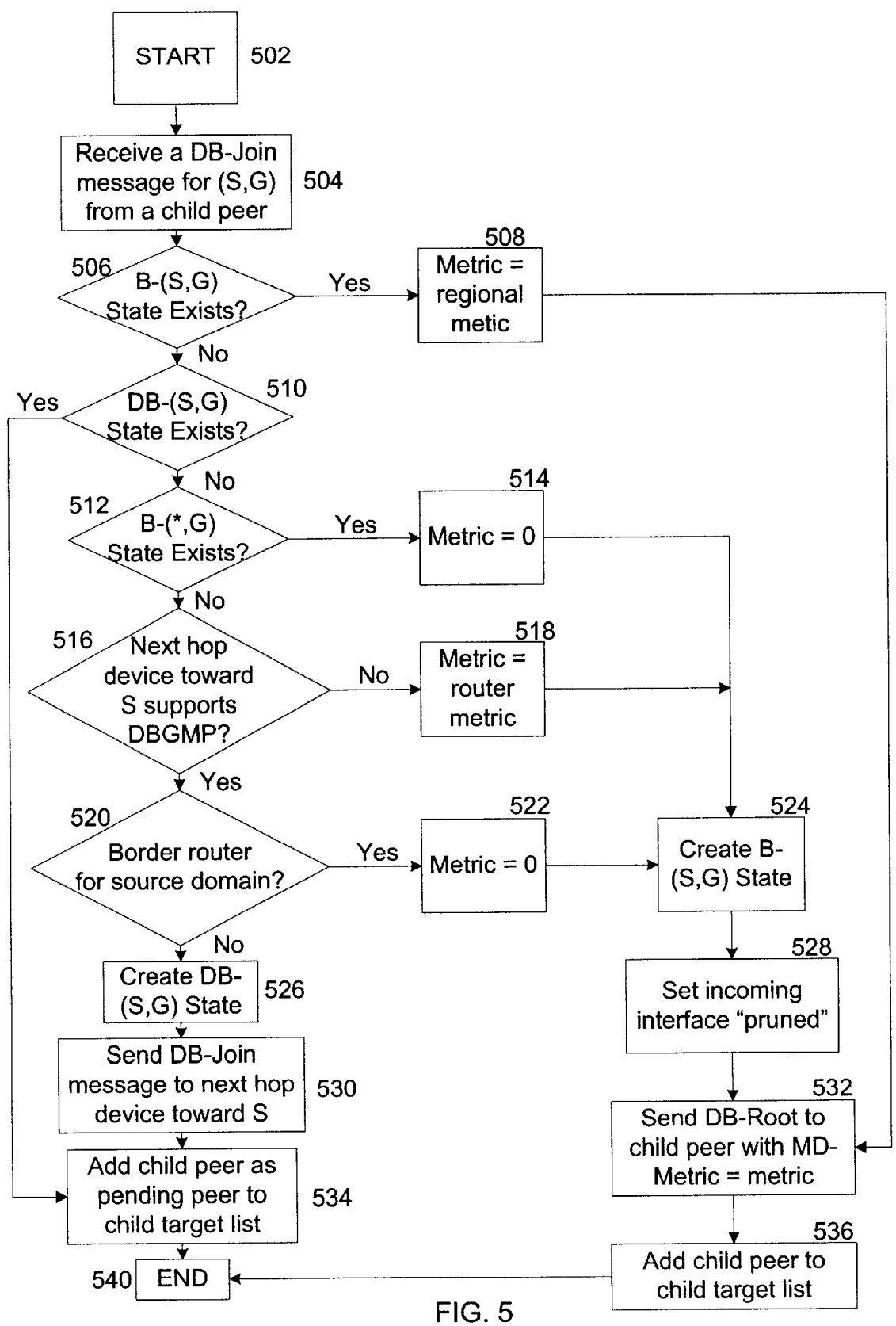
FIG. 5 is a logic flow diagram showing exemplary logic for processing a DB-Join for (S,G) in accordance with an embodiment of the present invention.

FIG. 5 shows exemplary logic for processing a DB-Join message for (S,G) received from a child peer. After starting in step 502, and upon receiving a DB-Join message for (S,G) from a child peer in step 504, the logic proceeds to determine whether the router has a B-(S,G) State, in step 506. If the router has a B-(S,G) State (YES in step 506), then the logic sends a DB-Root message to the child peer with MD-Metric equal to the BGMP Regional MD-Metric for (S,G) (from step 508), in step 532, adds the child peer to the child target list, in step 536, and terminates in step 540.

If the router does not have a B-(S,G) State (NO in step 506), then the logic proceeds to determine whether the router has a DB-(S,G) State, in step 510. If the router has a DB-(S,G) State (YES in step 510), then the logic adds the child peer as a pending peer to the child target list, in step 534, and terminates in step 540.

If the router does not have the DB-(S,G) State (NO in step 510), then the logic proceeds to determine whether the router has a B-(*,G) State, in step 512. If the router has a B-(*,G) State (YES in step 512), then the logic creates a B-(S,G) State, in step 524, sets the B-(S,G) incoming interface to "pruned," in step 528, sends a DB-Root message to the child peer with MD-Metric equal to zero (from step 514), in step 532, adds the child peer to the child target list, in step 536, and terminates in step 540.

If the router does not have a B-(*,G) State (NO in step 512), then the logic proceeds to determine whether the next hop router towards the multicast source S supports DBGMP, in step 516. If the next hop router towards the multicast source S does not support DBGMP (NO in step 516), then the logic creates a B-(S,G) State, in step 524, sets the B-(S,G) incoming interface to "pruned," in step 528, sends a DB-Root message to the child peer with MD-Metric equal to the router's metric (from step 518), in step 532, adds the child peer to the child target list, in step 536, and terminates in step 540.

If the next hop router towards the multicast source S supports DBGMP (YES in step 516), then the logic proceeds to determine whether the router is a border router for the source domain, in step 520. If the router is a border router for the source domain (YES in step 520), then the logic creates a B-(S,G) State, in step 524, sets the B-(S,G) incoming interface to "pruned," in step 528, sends a DB-Root message to the child peer with MD-Metric equal to zero (from step 522), in step 532, adds the child peer to the child target list, in step 536, and terminates in step 540.

If the router is not a border router for the source domain (NO in step 520), then the logic creates a DB-(S,G) State, in step 526, sends a DB-Join message to the next hop router towards the multicast source S, in step 530, adds the child peer as a pending peer to the child target list, in step 534, and terminates in step 540.

Receiving DB-Root for (*,G) from Parent Peer

A DB-Root message for (*,G) received from a parent peer will have MD-Metric equal to either zero (0) or "infinity." Upon receiving a DB-Root message for (*,G) from a parent peer, a DB-Router processes the DB-Root message as follows.

If the MD-Metric in the DB-Root message is equal to "infinity," then the DB-Router processes the DB-Root message as follows. First, the DB-Router either changes a "pending" DB-(*,G) State into a "confirmed" DB-(*,G) State, if the "pending DB-(*,G) State exists, or creates a "confirmed" DB-(*,G) State, if the "pending" DB-(*,G) State does not exist. Then, if the DB-Router has a B-(*,G) State, the DB-Router sends a DB-Join message to the parent target of each B-(S,G) State, and deletes the B-(*,G) State. The DB-Router then sends a B-Prune message to the parent peer, and forwards the DB-Root message to all child peers on the B-(*,G) child target list. If the DB-Router subsequently determines that it is a Regional BGMP Root, then the DB-Router sends a MD-Graft message to the upstream neighboring routers of each MD-(S,G) State.

If the MD-Metric in the DB-Root message is equal to zero (0), then the DB-Router processes the DB-Root message as follows. The DB-Router deletes an existing DB-(*,G) State, creates a B-(*,G) State if one does not already exist, and forwards the DB-Root message to all pending peers in the child target list. Then, if the DB-Router has a B-(S,G) State and the next hop peers toward the multicast source S and the multicast group G differ, then the DB-Router sends a B-Prune message to the B-(S,G) patent target, and sets the B-(S,G) incoming interface to "pruned." Also, if the DB-Router has an MD-(S,G) State and the B-(*,G) parent target is different than the MD-(S,G) upstream neighboring router, then the DB-Router sends an MD-Prune message to the MD-(S,G) upstream neighboring router and sets the MD-(S,G) incoming interface to "pruned."

In either case, the DB-Router clears the "pending" status for all pending peers in the child target list, if any exist.

Figure 6A:
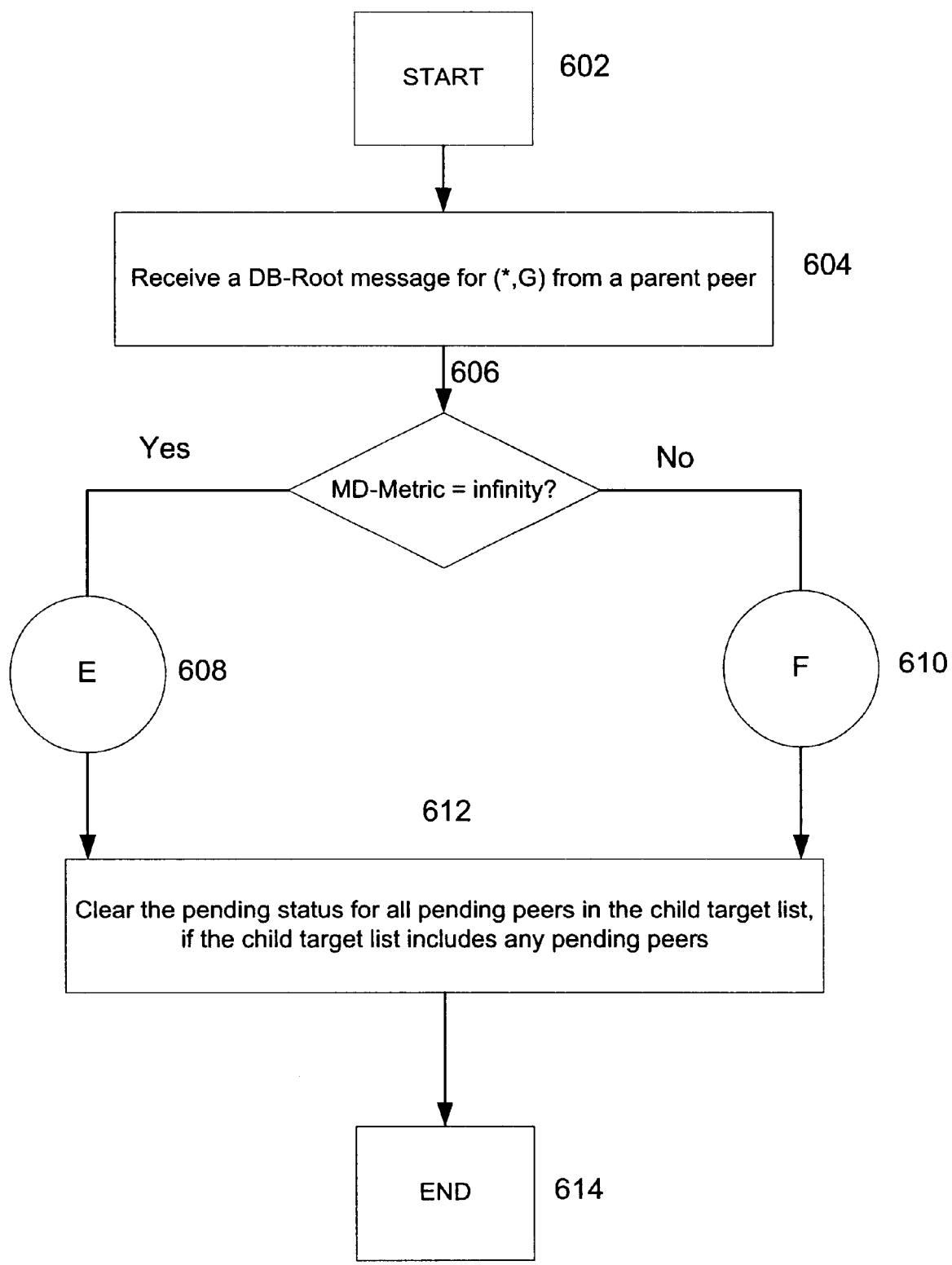
FIGS. 6A, 6B, and 6C are logic flow diagrams showing exemplary logic for processing a DB-Root message for (*,G) received from a parent peer in accordance with an embodiment of the present invention.
Figure 6B:
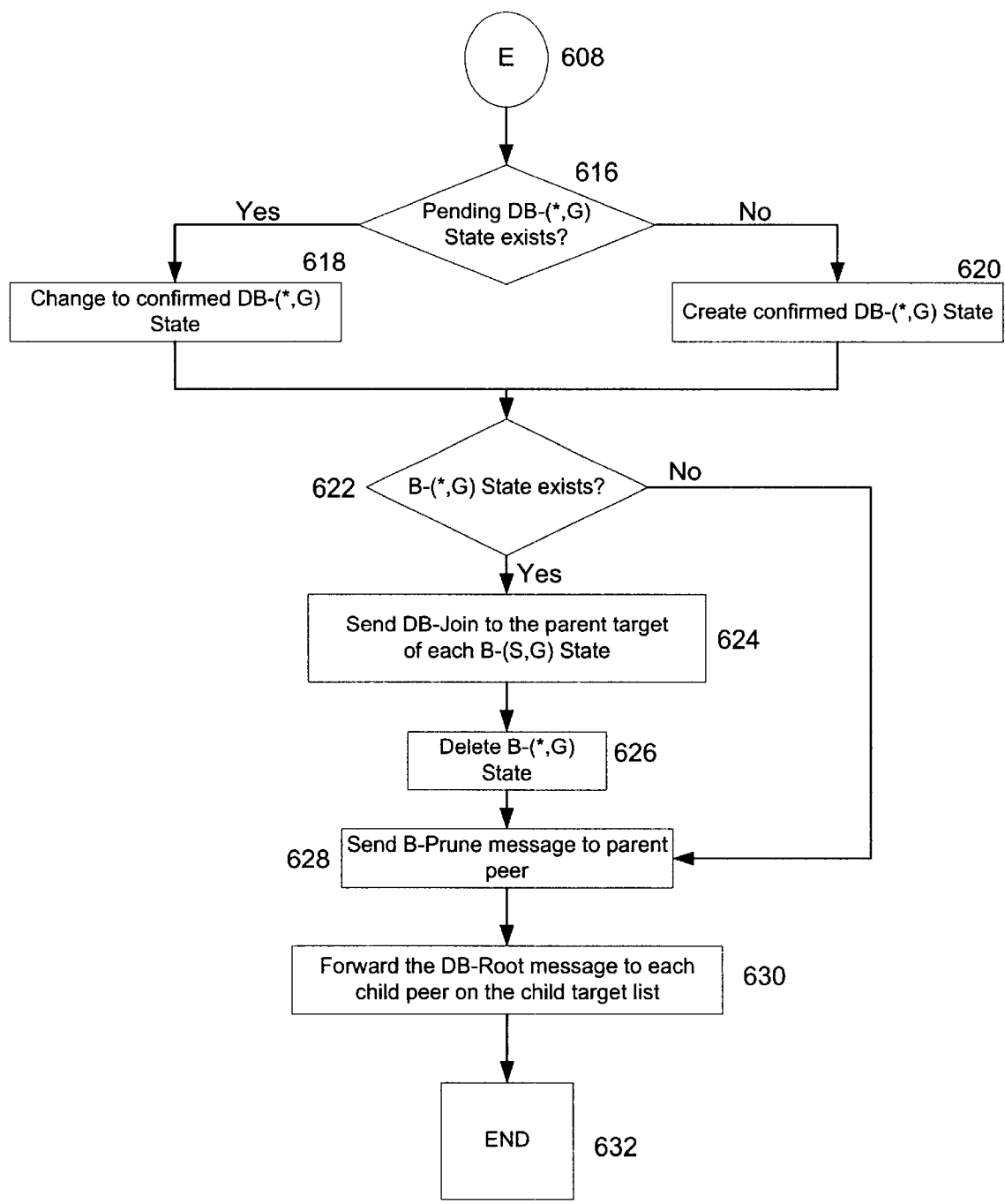
Figure 6C:
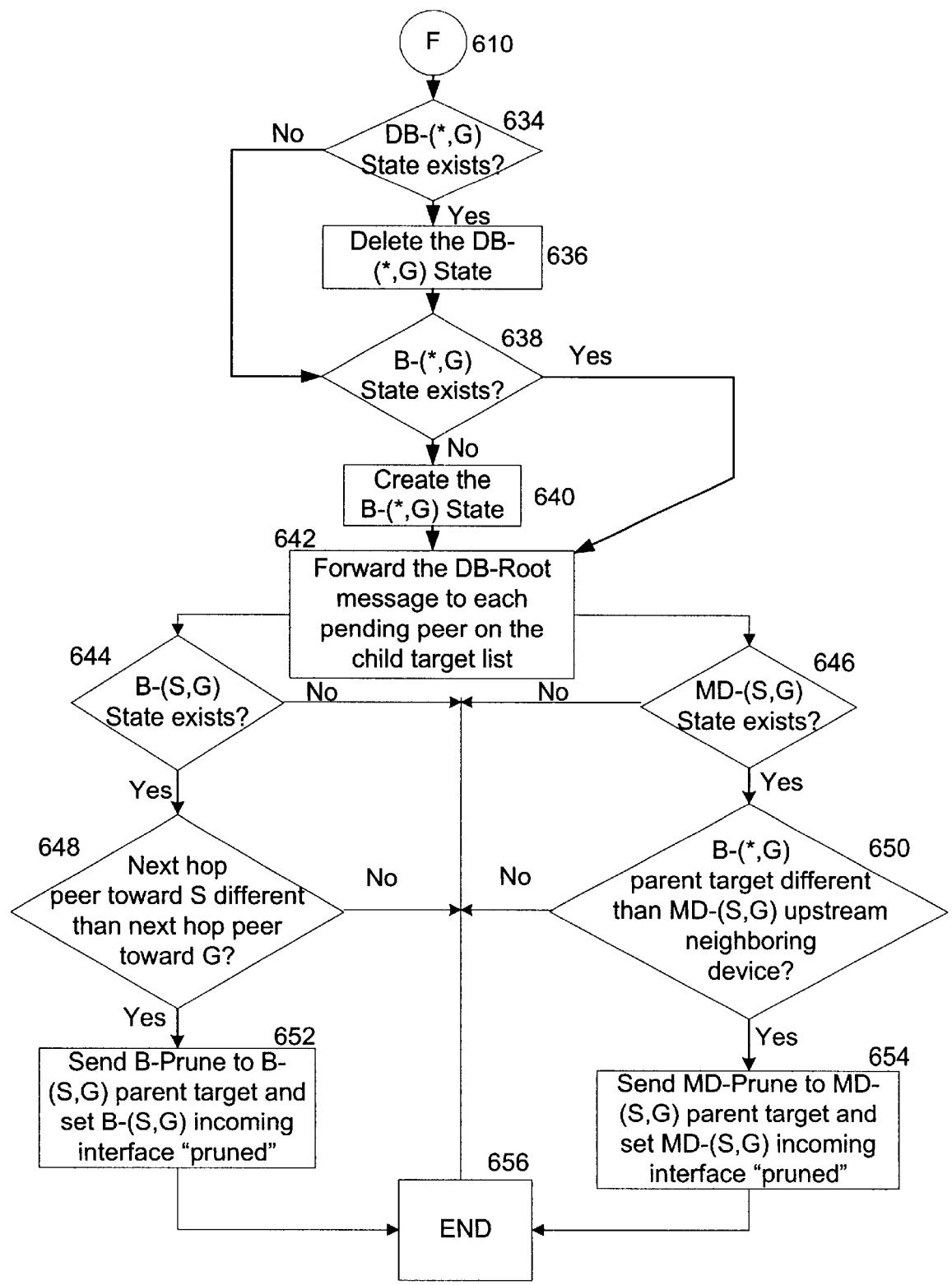

FIGS. 6A, 6B, and 6C show exemplary logic for processing a DB-Root message for (*,G) received from a parent peer. After starting in step 602, and upon receiving a DB-Root message for (*,G) from a parent peer in step 604, the logic proceeds to determine whether the MD-Metric in the DB-Root message is equal to "infinity," in step 606. If the MD-Metric in the DB-Root message is equal to "infinity" (YES in step 606, then the logic proceeds to step 608. If the MD-Metric in the DB-Root message is not equal to "infinity" (NO in step 606), then the logic proceeds to step 610. After completing either step 608 or step 610, the logic clears the pending status of any pending peers in the child target list, in step 612, and terminates in step 614.

From step 608 (FIG. 6B), the logic determines whether the router has a pending DB-(*,G) State, in step 616. If the router has a pending DB-(*,G) State (YES in step 616, then the logic changes the pending DB-(*,G) State into a confirmed DB-(*,G) State, in step 618, and proceeds to step 622. If the router does not have a pending DB-(*,G) State (NO in step 616), then the logic creates a confirmed DB-(*,G) State, in step 620, and proceeds to step 622.

In step 622, the logic determines whether the router has a B-(*,G) State. If the router does not have a B-(*,G) State (NO in step 622), then the logic proceeds to step 628. If the router has a B-(*,G) State (YES in step 622), then the logic sends a DB-Join message to the parent target of each B-(S,G) State, in step 624, deletes the B-(*,G) State, in step 626, and proceeds to step 628.

At step 628, the logic sends a B-Prune message to the parent peer, and then forwards the DB-Root message to each child peers on the child target list, in step 630, before ending in step 632.

From step 610 (FIG. 6C), the logic determines whether the router has a DB-(*,G) State, in step 634. If the router does not have a DB-(*,G) State (NO in step 634), then the logic proceeds to step 638. If the router has a DB-(*,G) State (YES in step 634), then the logic deletes the DB-(*,G) State, in step 636, and proceeds to step 638.

In step 638, the logic determines whether the router has a B-(*,G) State. If the router has a B-(*,G) State (YES in step 638), then the logic proceeds to step 642. If the router does not have a B-(*,G) State (NO in step 638), then the logic creates a B-(*,G) State, in step 640, and proceeds to step 642.

In step 642, the logic forwards the DB-Root message to each pending peer on the child target list. The logic then sends a B-Prune message to the B-(S,G) target and sets the B-(S,G) incoming interface to "pruned," in step 652, if the router has a B-(S,G) State (YES in step 644) and the next hop router towards the multicast source S is different than the next hop peer towards the multicast group G (YES in step 648). Also, the logic sends an MD-Prune message to the MD-(S,G) upstream neighboring device and sets the MD-(S,G) incoming interface to "pruned," in step 654, if the router has an MD-(S,G) State (YES in step 646) and the B-(*,G) parent target is different than the MD-(S,G) upstream neighboring device (YES in step 650).

Receiving DB-Root for (S,G) from Parent Peer

Upon receiving a DB-Root message for (S,G) from a parent peer, a DB-Router processes the DB-Root message as follows.

If the MD-Metric in the DB-Root message is greater than the DB-Router's metric to the multicast source S or if they are the same but the DB-Router's metric to the multicast source S is "infinity," then the DB-Router forwards the DB-Root message to all child peers in the child target list, deletes any existing DB-(S,G) State or B-(S,G) State, and sends a B-Prune message to the parent peer. Furthermore, if the DB-Router does not have a B-(*,G) State, then the MD-(S,G) incoming interface is a "preferred" incoming interface, so the DB-Router sends an MD-Graft message to the MD-(S,G) upstream neighboring router if the MD-(S,G) incoming interface is considered to be "pruned," and sets the MD-(S,G) incoming interface to "preferred."

Otherwise, the DB-Router forwards the DB-Root message to all pending peers in the child target list, and establishes a B-(S,G) State (which may involve changing a DB-(S,G) State into the B-(S,G) State. Furthermore, if the DB-Router has a B-(*,G) State and the next hop peers toward the multicast source S and the multicast group G differ, then the DB-Router sends a B-Prune message to the B-(S,G) parent target and sets the B-(S,G) incoming interface to "pruned." Also, if the DB-Router has an MD-(S,G) State and the B-(S,G) parent target differs from MD-(S,G) upstream neighboring router, then the DB-Router sets the MD-(S,G) incoming interface to "deprecated."

In either case, the DB-Router clears the "pending" status for all pending peers in the child target list, if any exist.

Figure 7A:
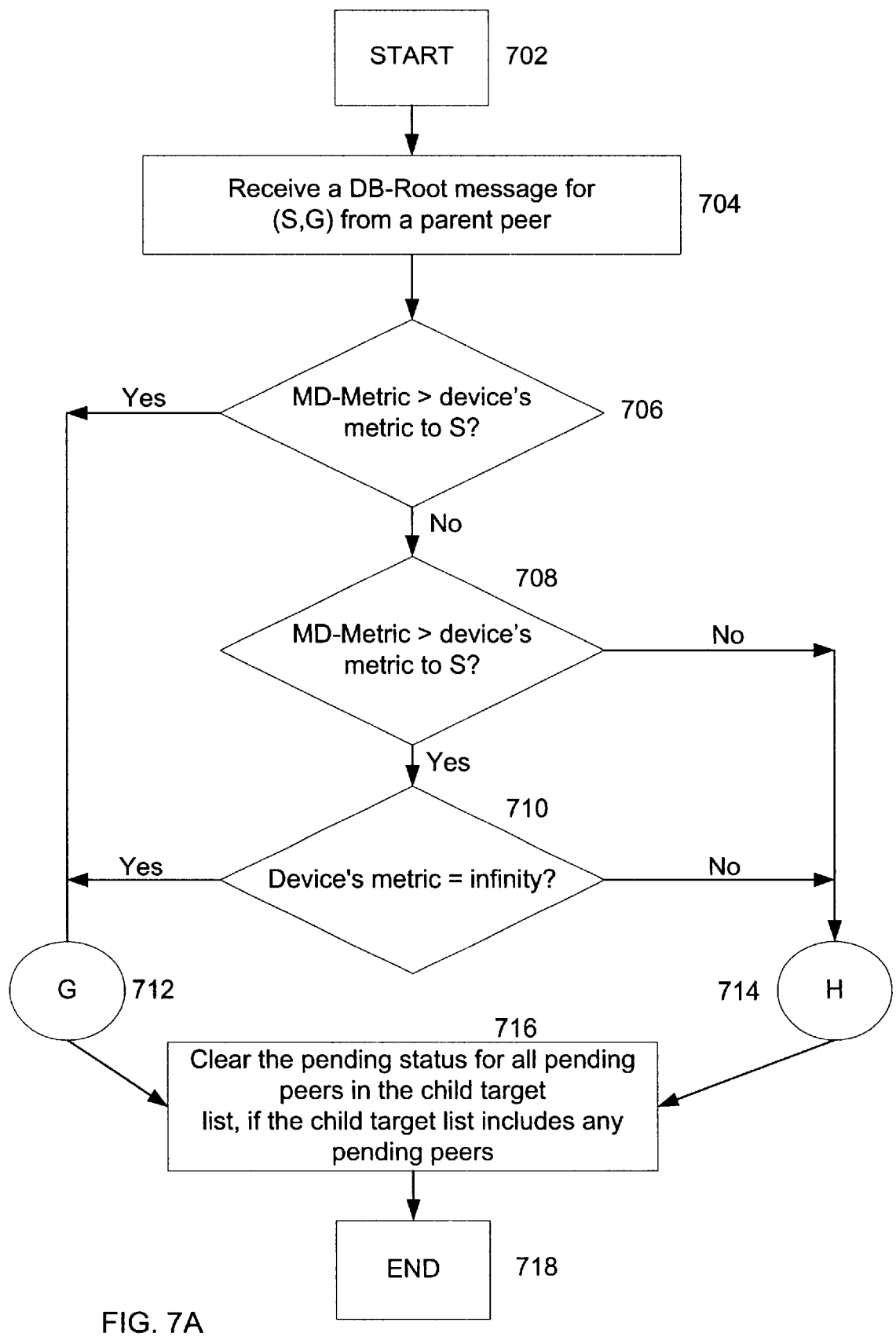
FIGS. 7A, 7B, and 7C are logic flow diagrams showing exemplary logic for processing a DB-Root message for (S,G) received from a parent peer in accordance with an embodiment of the present invention.
Figure 7B:
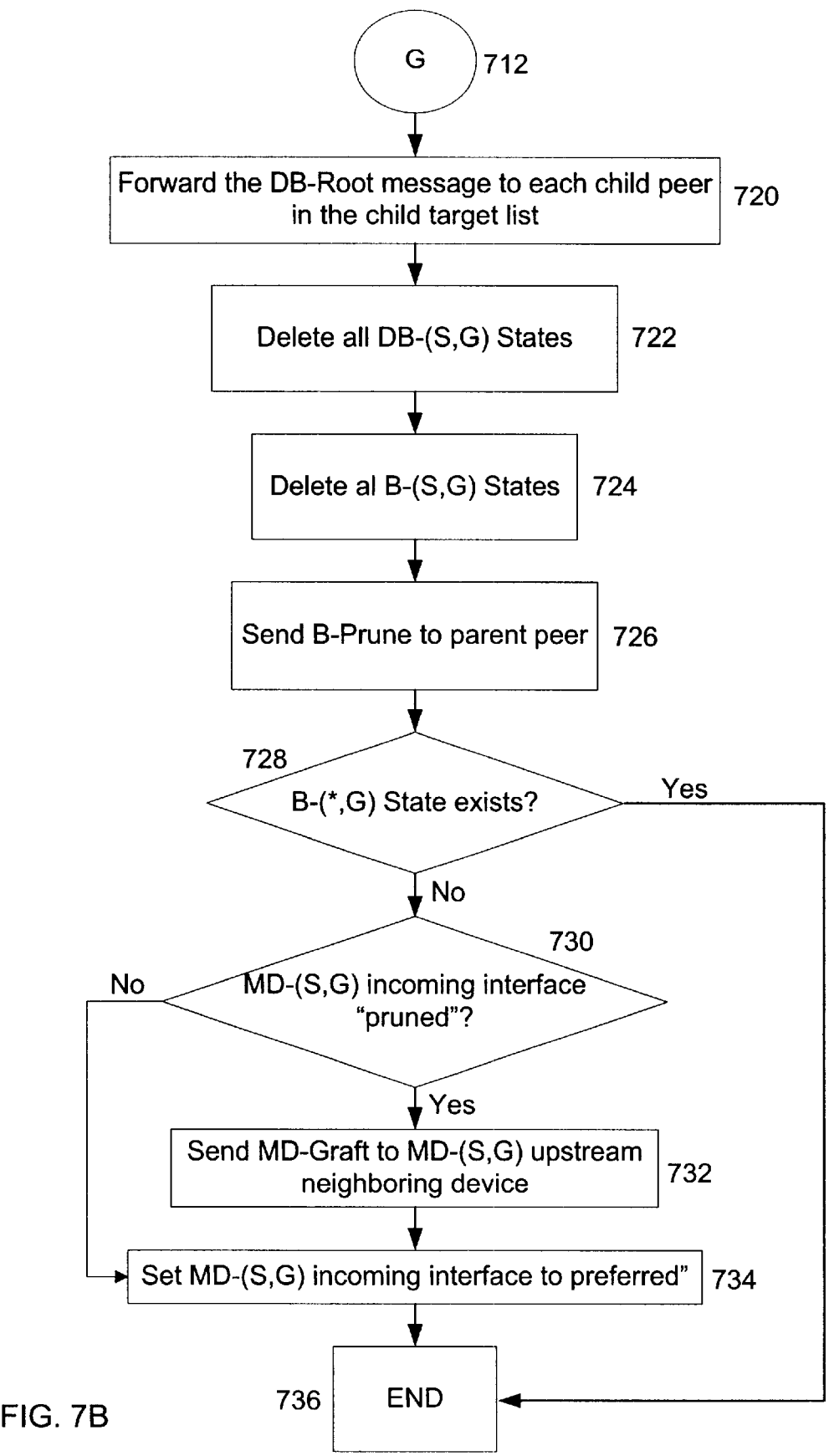
Figure 7C:
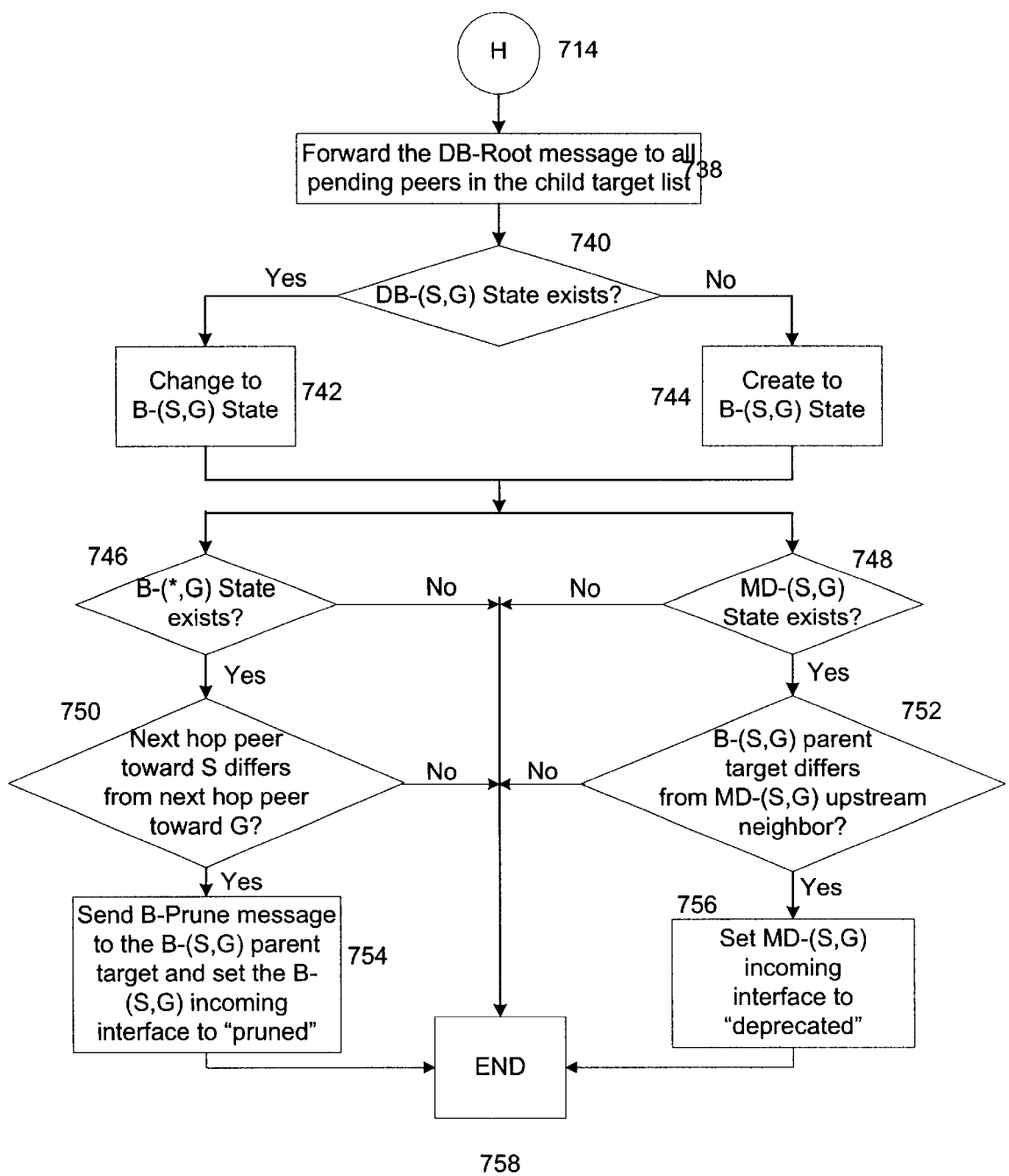

FIGS. 7A, 7B, and 7C show exemplary logic for processing a DB-Root message for (S,G) received from a parent peer. After starting in step 702, and upon receiving a DB-Root message for (S,G) from a parent peer in step 704, the logic determines whether the MD-Metric in the DB-Root message is greater than the router's metric to the multicast source S, in step 706. If the MD-Metric in the DB-Root message is greater than the router's metric to the multicast source S (YES in step 706), then the logic proceeds to step 712.

If the MD-Metric in the DB-Root message is not greater than the router's metric to the multicast source S (NO in step 706), then the logic proceeds to determine whether the MD-Metric in the DB-Root message is equal to the router's metric to the multicast source S, in step 708. If the MD-Metric in the DB-Root message is not equal to the router's metric to the multicast source S (NO in step 708), then the logic proceeds to step 714.

If the MD-Metric in the DB-Root message is equal to the router's metric to the multicast source S (YES in step 708), then the logic proceeds to determine whether the device's metric to the multicast source S is "infinity," in step 710. If the device's metric to the multicast source S is "infinity" (YES in step 710), then the logic proceeds to step 712. If the device's metric to the multicast source S is not "infinity" (NO in step 710), then the logic proceeds to step 714.

After completing either step 712 or step 714, the logic clears the pending stat us of any pending peers in the child target list, in step 716, and terminates in step 718.

From step 712 (FIG. 7B), the logic forwards the DB-Root message to each child peer in the child target list, in step 720, deletes all DB-(S,G) States, in step 722, deletes all B-(S,G) States, in step 724, and sends a B-Prune message to the parent peer, in step 726. The logic then proceeds to determine whether the router has a B-(*,G) State, in step 728. If the router has a B-(*,G) State (YES in step 728), then the logic ends in step 736. If the router does not have the B-(*,G) State (NO in step 728), then the logic proceeds to determine whether the MD-(S,G) incoming interface is considered to be "pruned," in step 730. If the MD-(S,G) incoming interface is not considered to be "pruned" (NO in step 730), then the logic sets the MD-(S,G) incoming interface to "preferred," in step 734, and ends in step 736. It the MD-(S,G) incoming interface is considered to be "pruned" (YES in step 730), then the logic sends an MD-Graft message to the MD-(S,G) upstream neighboring device, in step 732, sets the MD-(S,G) incoming interface to "preferred," in step 734, and ends in step 736.

From step 714 (FIG. 7C), the logic forwards the DB-Root message to all pending peers in the child target list, in step 738, and proceeds to determine whether the router has a DB-(S,G) State, in step 740. If the router has the DB-(S,G) State (YES in step 740), then the logic changes the DB-(S,G) State into a B-(S,G) State, in step 742. If the router does not have the DB-(S,G) State (NO in step 740), then the logic creates a B-(S,G) State, in step 744.

After changing the DB-(S,G) State into the B-(S,G) State, in step 742, or creating the B-(S,G) State, in step 744, the logic sends a B-Prune message to the B-(S,G) parent target and sets the B-(S,G) incoming interface to "pruned," in step 754, if the router has a B-(*,G) State (YES in step 746) and the next hop peer towards the multicast source S differs from the next hop peer towards the multicast group G (YES in step 750). Also after changing the DB-(S,G) State into the B-(S,G) State, in step 742, or creating the B-(S,G) State, in step 744, the logic sets the MD-(S,G) incoming interface to "deprecated," in step 756, if the router has a MD-(S,G) State (YES in step 748) and the B-(S,G) parent target differs from the MD-(S,G) upstream neighboring device (YES in step 752). The logic ends in step 758.

Absence of Group over Downstreams

When a multicast group leaves a particular downstream, DVMRP deletes outgoing interfaces associated with the multicast group, and BGMP deletes child peers associated with the multicast group. Upon receiving an MD-Prune message, the DB-Router deletes outgoing interfaces in accordance with DVMRP. Upon receiving a B-Prune message, the DB-Router deletes child peers in accordance with BGMP.

Specifically, if the DB-Router receives a B-Prune message, the DB-Router deletes child peers from the child target list in accordance with BGMP. It the DB-Router deletes the B-(*,G) state as a result of processing the B-Prune message, then the DB-Router sends a B-Prune message to the B-(*,G) parent target and sends a DB-Join message to the parent target of each B-(S,G) state. If the DB-Router subsequently determines that it is a Regional BGMP Root, then the DB-Router sends a MD-Graft message to the upstream neighboring routers of each MD-(S,G) State.

It the DB-Router receives an MD-Prune message, the DB-Router deletes outgoing interfaces in accordance with DVMRP.

After processing a B-Prune message or an MD-Prune message, the DB-Router deletes the B-(S,G) State if and only if the DB-Router has no BGMP child target and no DVMRP downstream neighboring router for (S,G). If the DB-Router deletes the B-(S,G) State and the B-(S,G) State was considered to be "preferred" or "deprecated" (i.e., not "pruned"), then the DB-Router sends a B-Prune message to the B-(S,G) parent target.

Also, after processing a B-Prune message or an MD-Prune message, the DB-Router deletes the MD-(S,G) State if and only if the DB-Router has no BGMP child target and no DVMRP downstream neighboring router for (S,G). If the DB-Router deletes any outgoing interfaces associated with the MD-(S,G) state as a result of processing the MD-Prune message and the MD-(S,G) state was considered to be "preferred" or "deprecated" (i.e., not "pruned"), then the DB-Router sends an MD-Prune message to the MD-(S, G) upstream neighboring router.

Figure 8:
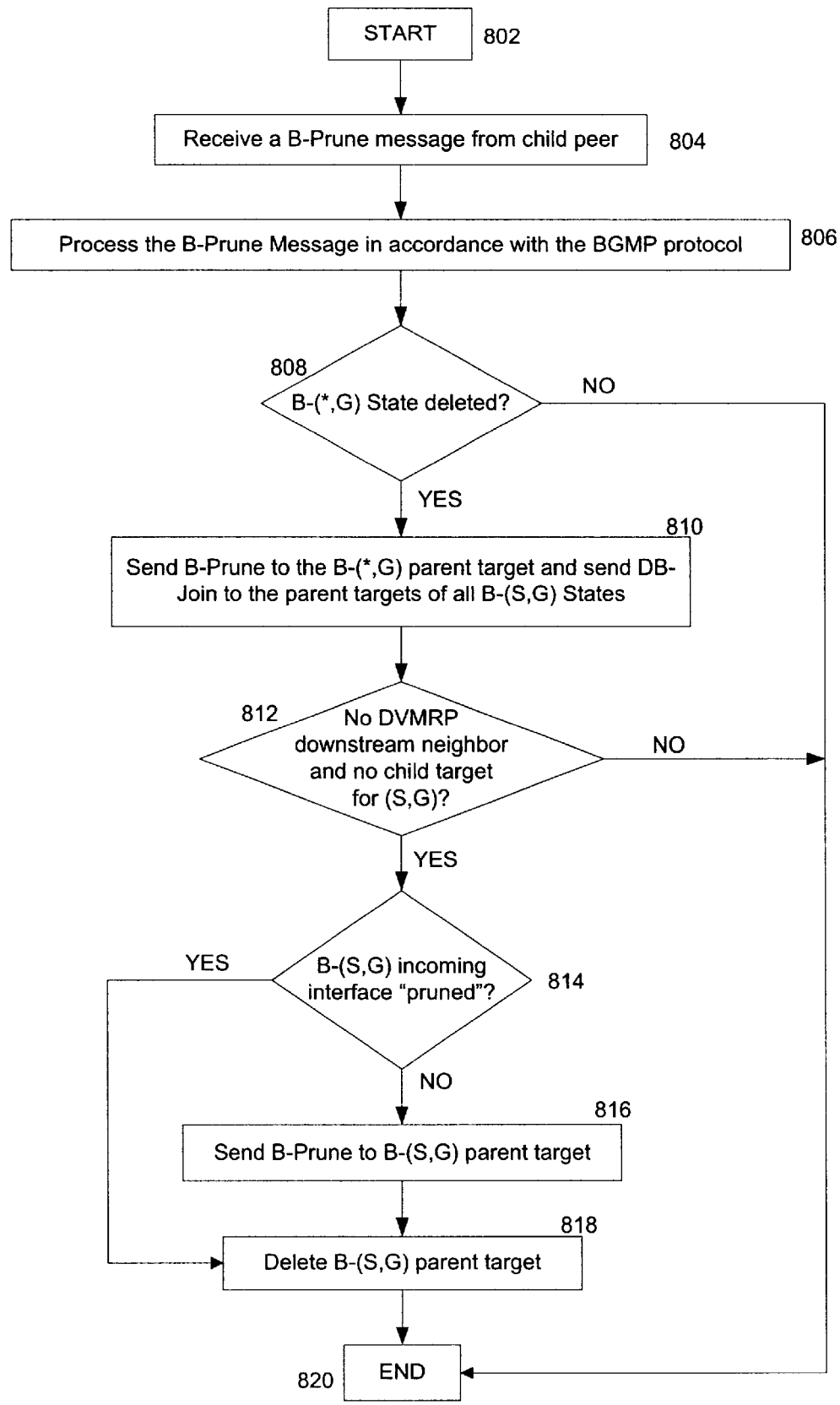
FIG. 8 is a logic flow diagram showing exemplary logic for processing a B-Prune message received from a child peer in accordance with an embodiment of the present invention.

FIG. 8 shows exemplary logic for processing a B-Prune message received from a child peer. After starting in step 802, and upon receiving a B-Prune message from a child peer in step 804, the logic processes the B-Prune message in accordance with the BGMP protocol, in step 806. It the B-(*,G) State was deleted as a result of processing the B-Prune message (YES in step 808), then the logic proceeds to send a B-Prune message to the B-(*,G) parent target and send a DB-Join message to the parent target of each B-(S,G) State, in step 810. If there are no DVMRP downstream neighboring routers and a B-(S,G) State has no child targets (YES in step 812), then the logic determines whether the B-(S,G) incoming interface is considered to be "pruned," in step 814. If the B-(S,G) incoming interface is not considered to be "pruned" (NO in step 816), then the logic sends a B-Prune message to the B-(S,G) parent target. In any case, the logic then deletes the B-(S,G) State, in step 818, and ends in step 820.

Figure 9:
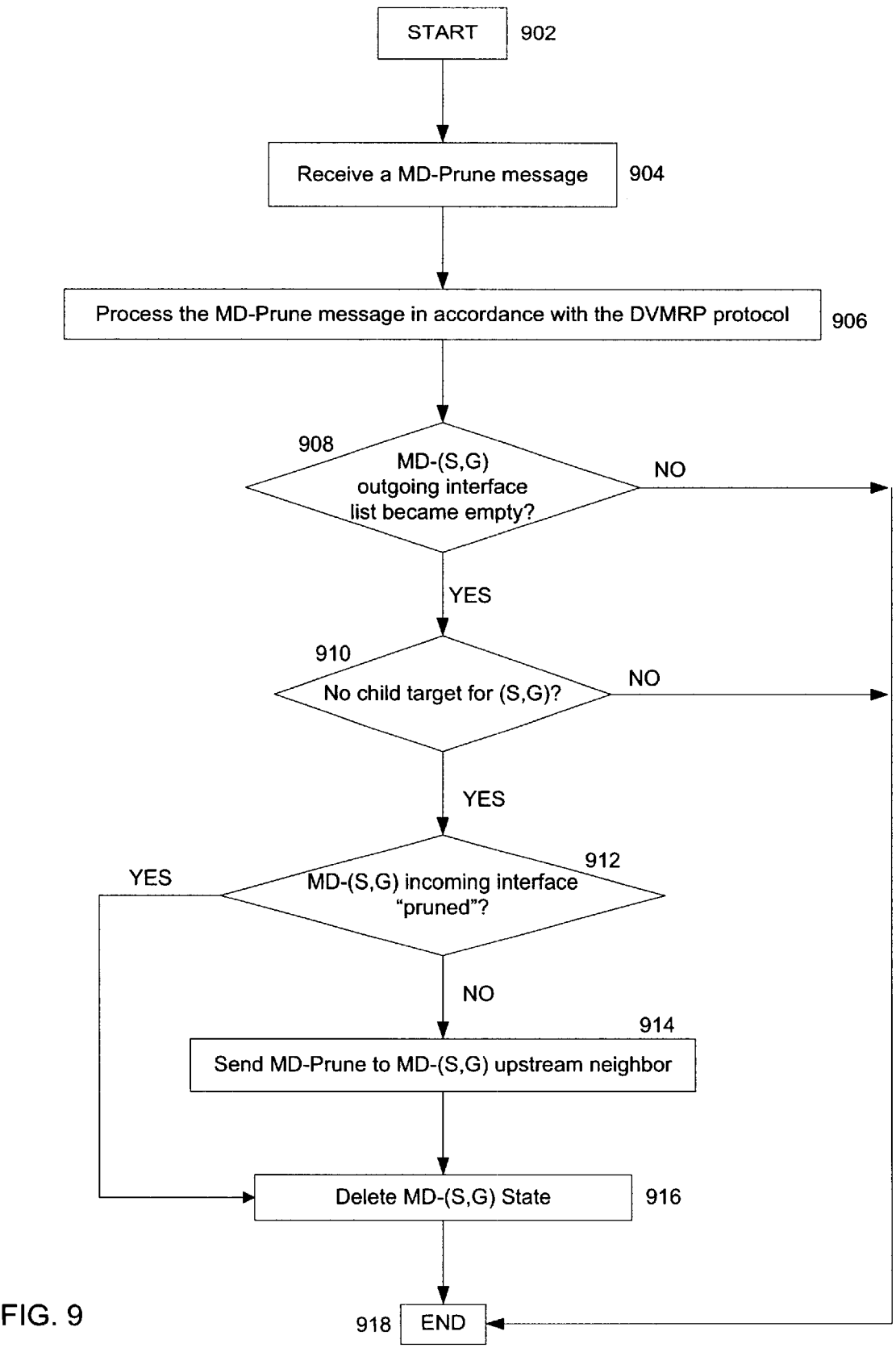
FIG. 9 is a logic flow diagram showing exemplary logic for processing an MD-Prune message in accordance with an embodiment of the present invention.

FIG. 9 shows exemplary logic for processing an MD-Prune message. After starting in step 902, and upon receiving an MD-Prune message in step 904, the logic processes the MD-Prune message in accordance with the DVMRP protocol, in step 906. If the MD-(S,G) outgoing interface list became empty as a result of processing the MD-Prune message (YES in step 908), and there are no BGMP child targets (YES in step 910), then the logic proceeds to determine whether the MD-(S,G) incoming interface is considered to be "pruned," in step 912. If the MD-(S,G) incoming interface is not considered to be "pruned" (NO in step 912), then the logic sends an MD-Prune message to the MD-(S,G) upstream neighboring router, in step 914. In any case, the logic deletes the MD-(S,G) State, in step 916, and ends in step 918.

Presence of Group over Downstreams

When a multicast group joins a particular downstream, DVMRP adds outgoing interfaces associated with the multicast group, and BGMP adds child peers associated with the multicast group. Upon receiving an MD-Graft message, the DB-Router adds outgoing interfaces in accordance with DVMRP. Upon receiving a B-Join message or a DB-Join message, the DB-Router adds child peers in accordance with DBGMP.

If the list of outgoing interfaces associated with the MD-(S,G) state had been empty (null) but becomes non-empty (non-null) as a result of the DVMRP processing (i.e., the MD-(S,G) State becomes "active"), then the DB-Router sends an MD-Graft message to the MD-(S,G) upstream neighboring router, and triggers a DB-Join/DB-Root process as described above.

Figure 10:
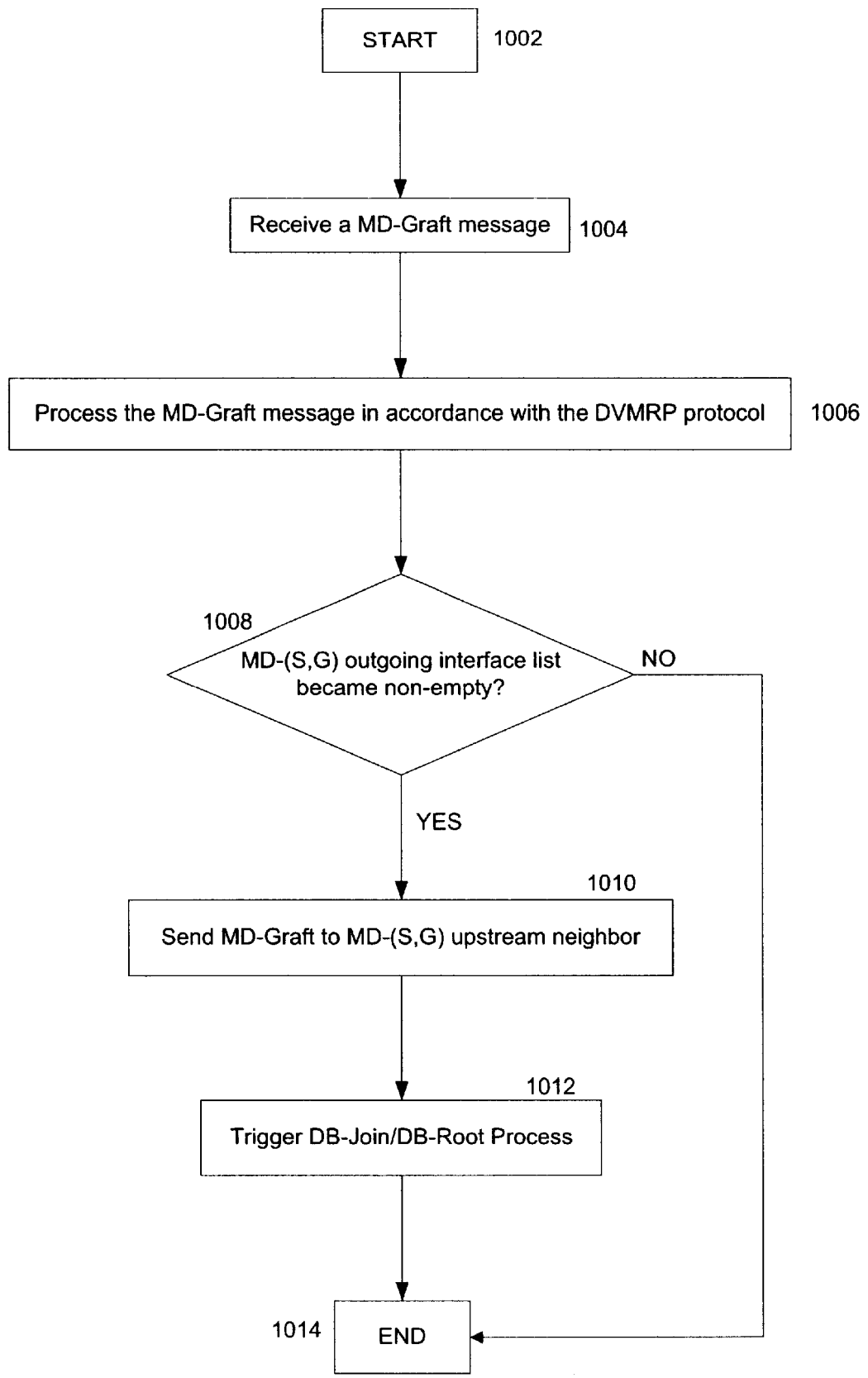
FIG. 10 is a logic flow diagram showing exemplary logic for processing an MD-Graft message in accordance with an embodiment of the present invention.

FIG. 10 shows exemplary logic for processing an MD-Graft message. After starting in step 1002, and upon receiving an MD-Graft message in step 1004, the logic processes the MD-Graft message in accordance with the DVMRP protocol, in step 1006. If the MD-(S,G) outgoing interface list became non-empty as a result of processing the MD-Graft message (YES in step 1008), then the logic sends an MD-Graft message to the MD-(S,G) upstream neighboring router, in step 1010. Also, because the MD-(S,G) State became "active," the logic triggers a DB-Join/DB-Root process as described above specifically with reference to FIG. 2A, in step 1012, and terminates in step 1014.

Exemplary logic for processing a B-Join message is described above with reference to FIGS. 3A, 3B, and 3C.

Exemplary logic for processing a DB-Join message is described above with reference to FIGS. 4 and 5.

DVMRP Routing Change

If an MDB-router determines its metric value to the multicast source S changes and the new metric value is less than the metric value of the Regional BGMP Root, then the MDB-Router is a DBGMP Break Point, and becomes the Regional BGMP Root of a new BGMP Regional Tree. In this case, the MDB-Router sends a DB-Root message with MD-Metric equal to its new metric value to each of the child peers associated with each of the B-(S,G) States. If the B-(S,G) incoming interface is considered to be "preferred" or "deprecated" (i.e., not "pruned"), then the MDB-Router sends a B-Prune message to the B-(S,G) parent target and sets the B-(S,G) incoming interface to "pruned." The MDB-Router also sends an MD-Graft message to the MD-(S,G) upstream neighboring router if the MD(S,G) incoming interface is considered to be "pruned," and sets the MD-(S,G) incoming interface to "preferred."

Figure 11A:
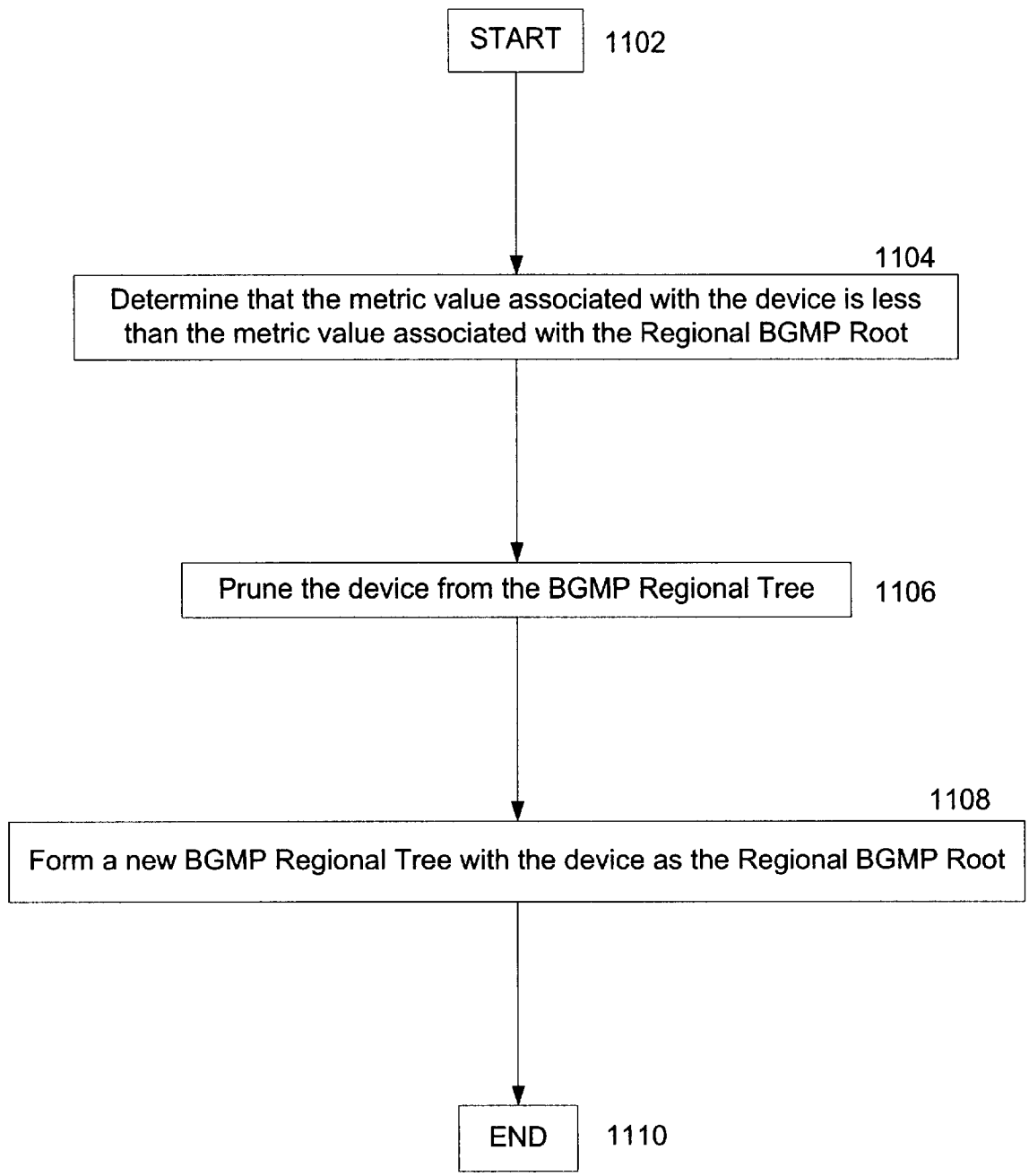
FIGS. 11A and 11B are logic flow diagrams showing exemplary logic for processing a DVMRP routing change in accordance with an embodiment of the present invention.

FIG. 11A shows exemplary logic for processing a DVMRP routing change. After starting in step 1102, and upon determining that the device's metric value is less than the metric value of the Regional BGMP Root in step 1104, the logic prunes the router from the BGMP Regional Tree, in step 1106, and forms a new BGMP Regional Tree with the router as the Regional BGMP Root, in step 1108. The logic terminates in step 1110.

Figure 11B:
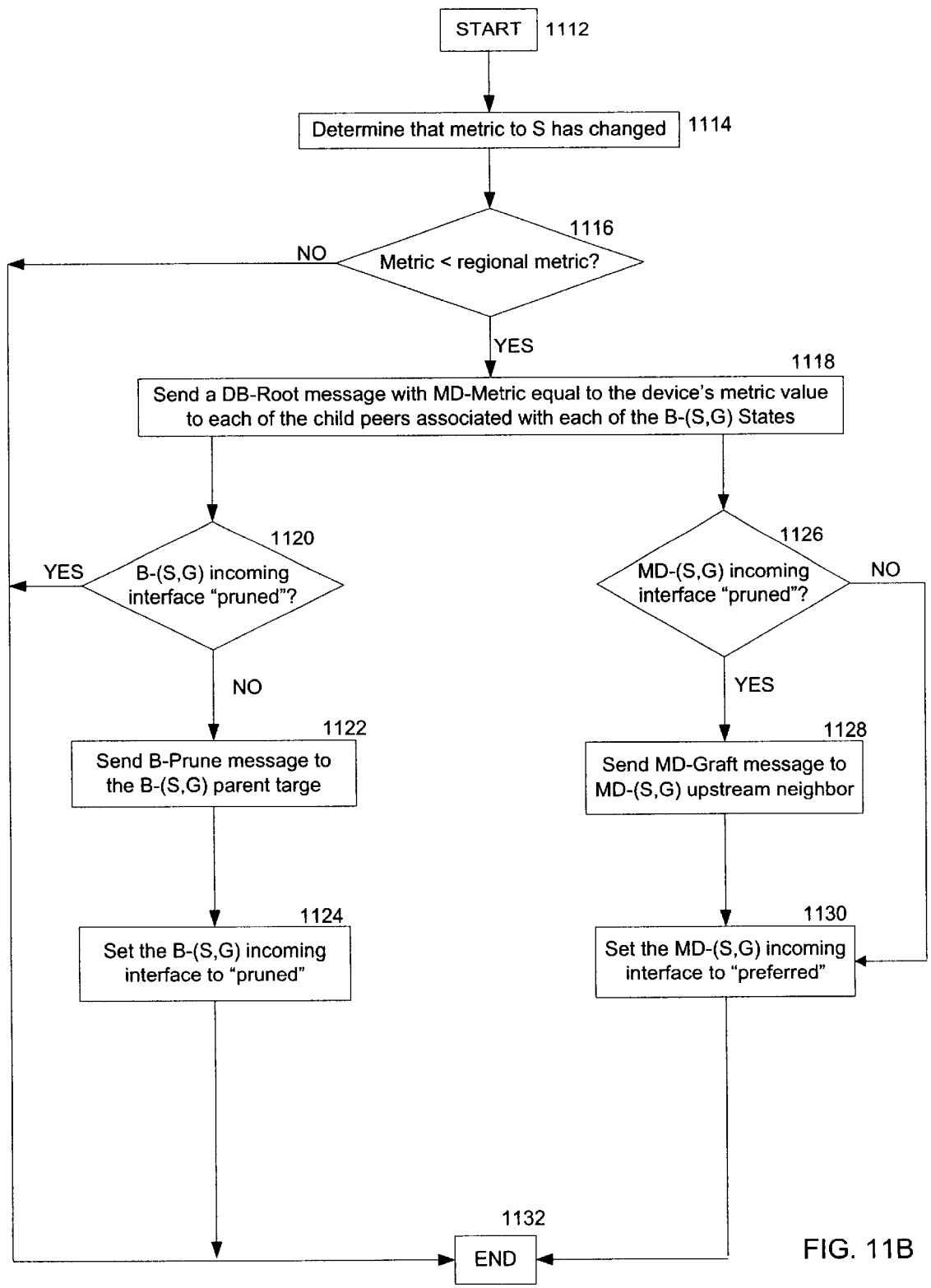

FIG. 11B shows exemplary logic for processing a DVMRP routing change in additional detail. After starting in step 1112, and upon determining that the router's metric to the multicast source S has changed in step 1114, the logic proceeds to determine whether the device's metric is less than the BGMP Regional MD-Metric, in step 1116. If the device's metric is less than the BGMP Regional MD-Metric (YES in step 1116), then the logic sends a DB-Root message to each of the child peers associated with each of the B-(S,G) States with MD-Metric equal to the device's (new) metric value, in step 1118. If the B-(S,G) incoming interface is not considered to be "pruned" (NO in step 1120), then the logic sends a B-Prune message to the B-(S,G) parent target, in step 1122, and sets the B-(S,G) incoming interface to "pruned," in step 1124. Also, if the MD-(S,G) incoming interface is considered to be "pruned" (YES in step 1126), then the logic sends an MD-Graft message to the MD-(S,G) upstream neighboring router, in step 1128. In any case, the logic sets the MD-(S,G) incoming interface to "preferred," in step 1130. The logic terminates in step 1132.

BGMP Routing Change

A DB-Router processes a BGMP routing change in accordance with BGMP. In making the routing change, the DB-Router may change from a Regional BGMP Root to a BGMP child or from a BGMP child to a Regional BGMP Root. For each B-(S,G) State involved in the routing change, the DB-Router sends a DB-Root message to each of the child peers associated with the B-(S,G) State. The MD-Metric in the DB-Root message is set to the new BGMP Regional MD-Metric for (S,G), if the DB-Router changes from a Regional BGMP Root to a BGMP child, or to its own metric value, if the DB-Router changes from a BGMP child to Regional BGMP Root.

Figure 12:
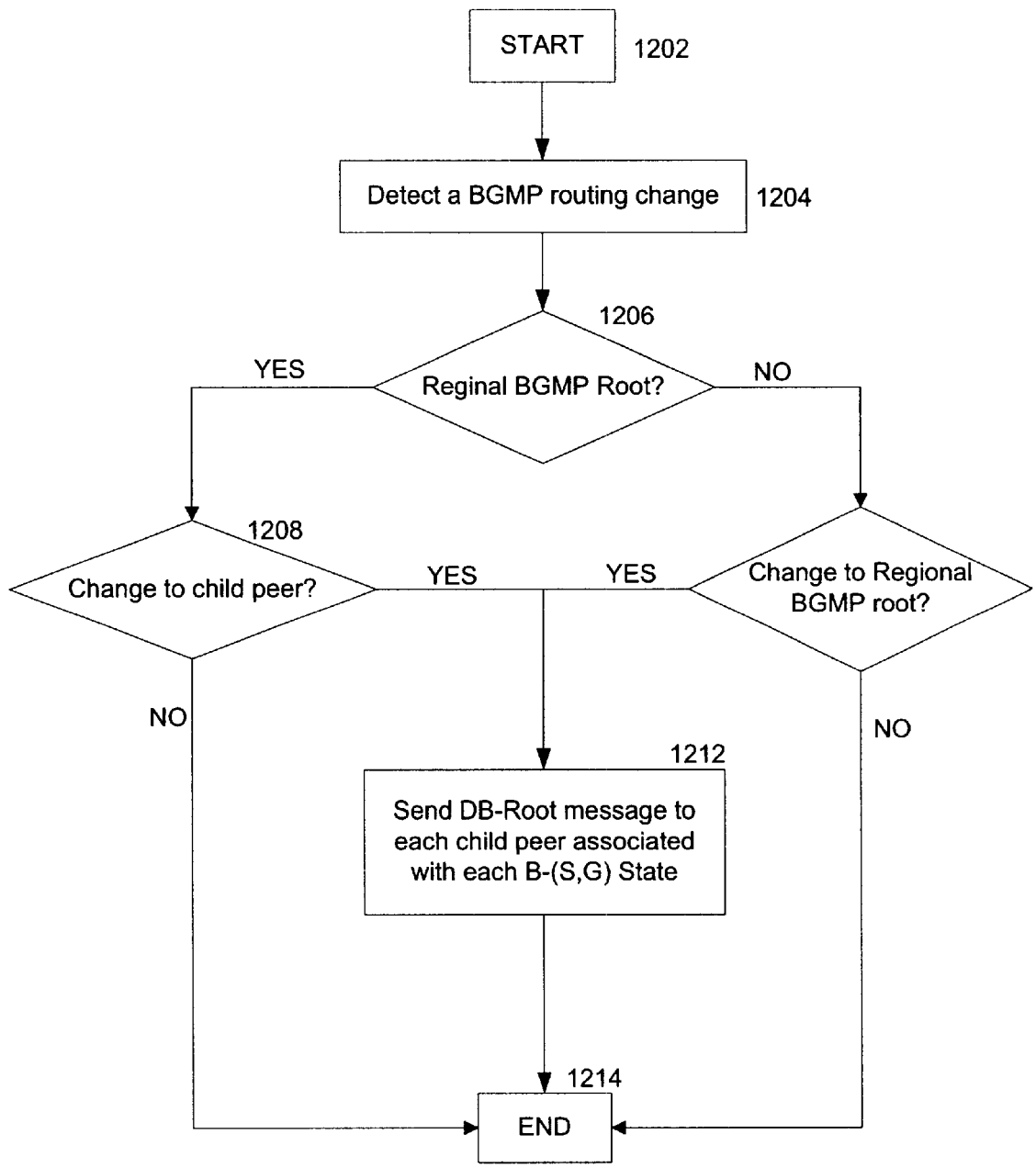
FIG. 12 is a logic flow diagram showing exemplary logic for processing a BGMP routing change in accordance with an embodiment of the present invention.
Figure 13A:
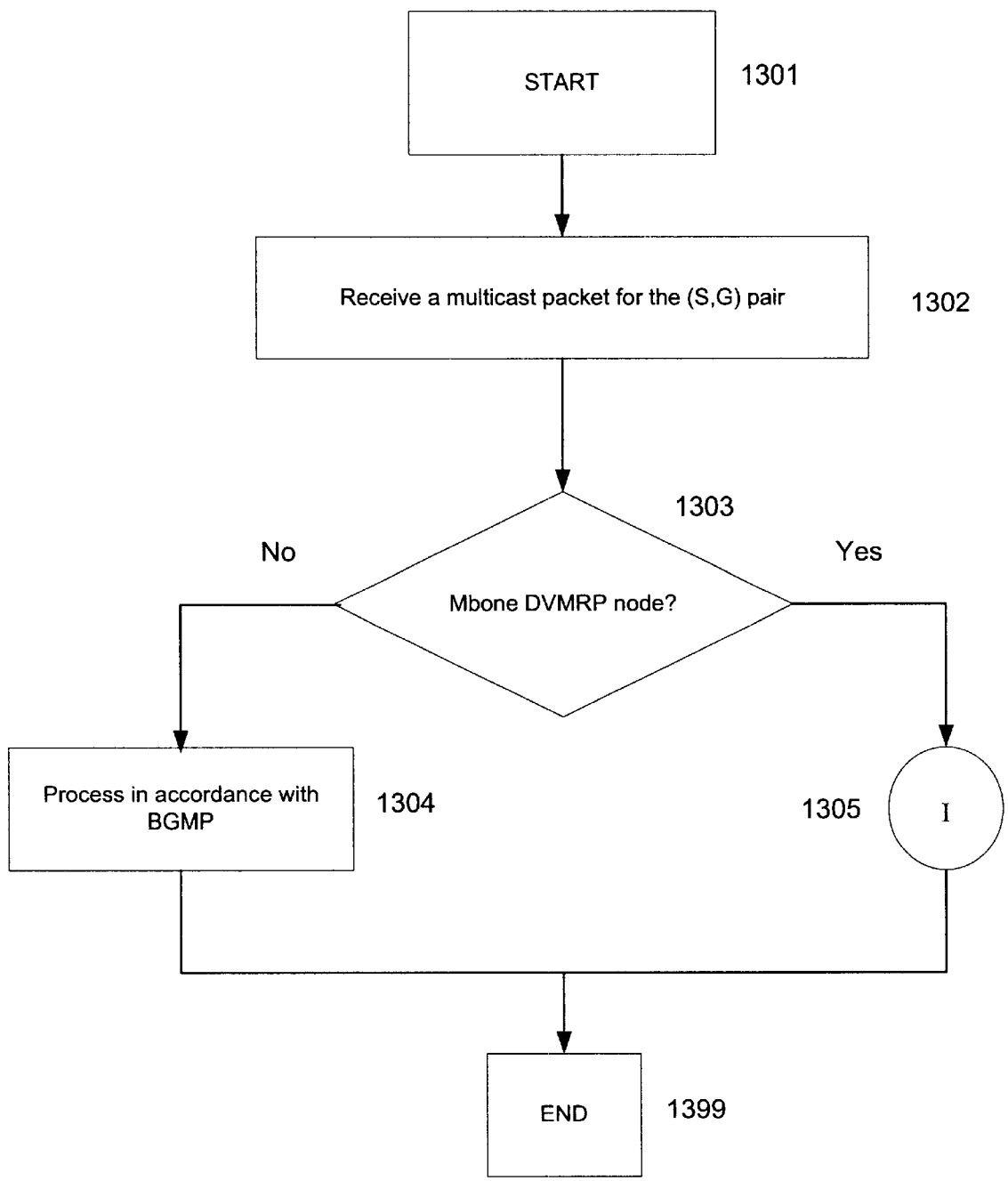
FIGS. 13A, 13B, 13C, 13D, 13E, 13F, 13G, and 13H are logic flow diagrams showing exemplary logic for processing a multicast packet in accordance with an embodiment of the present invention.
Figure 13B:
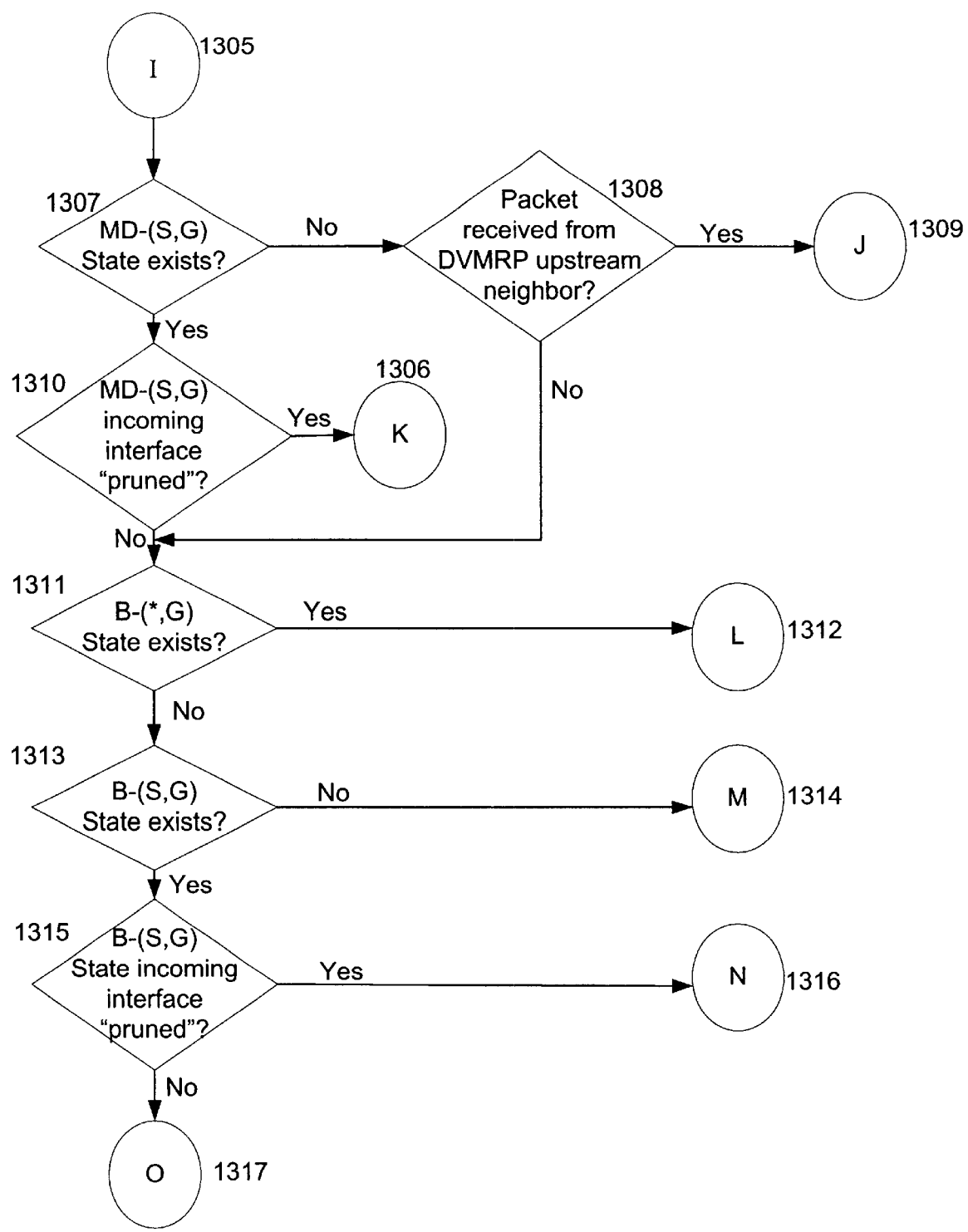
Figure 13C:
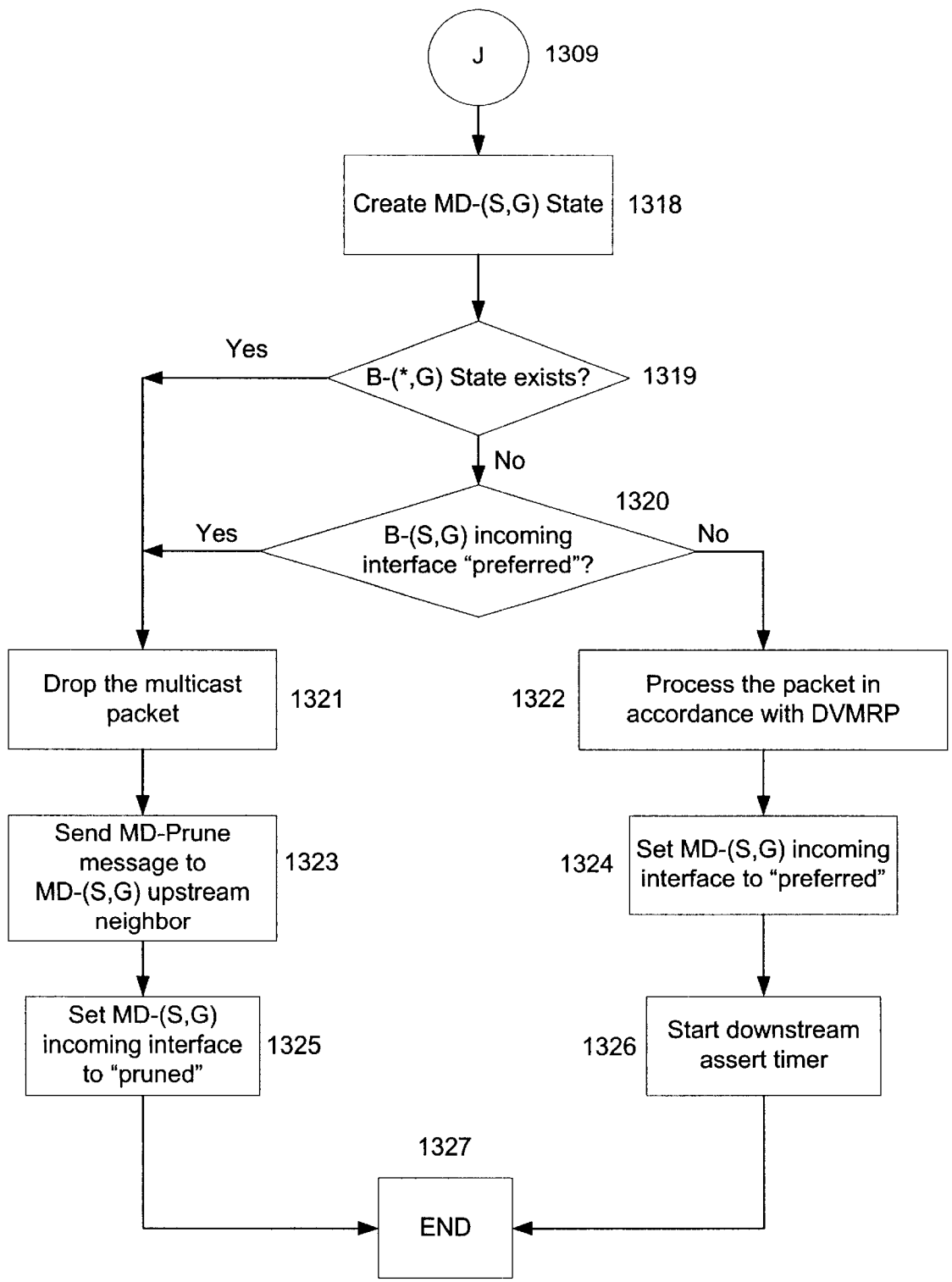
Figure 13D:
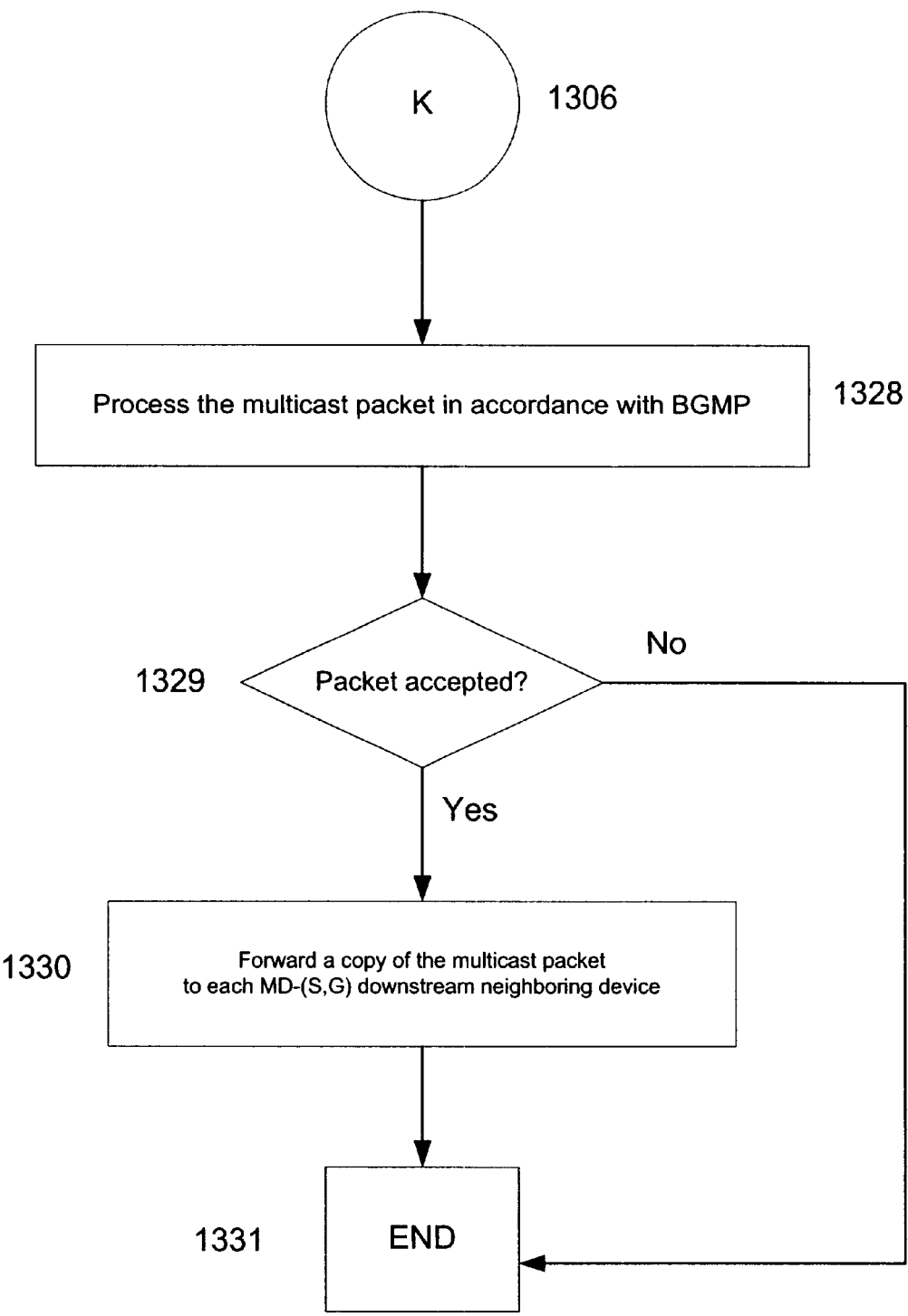
Figure 13E:
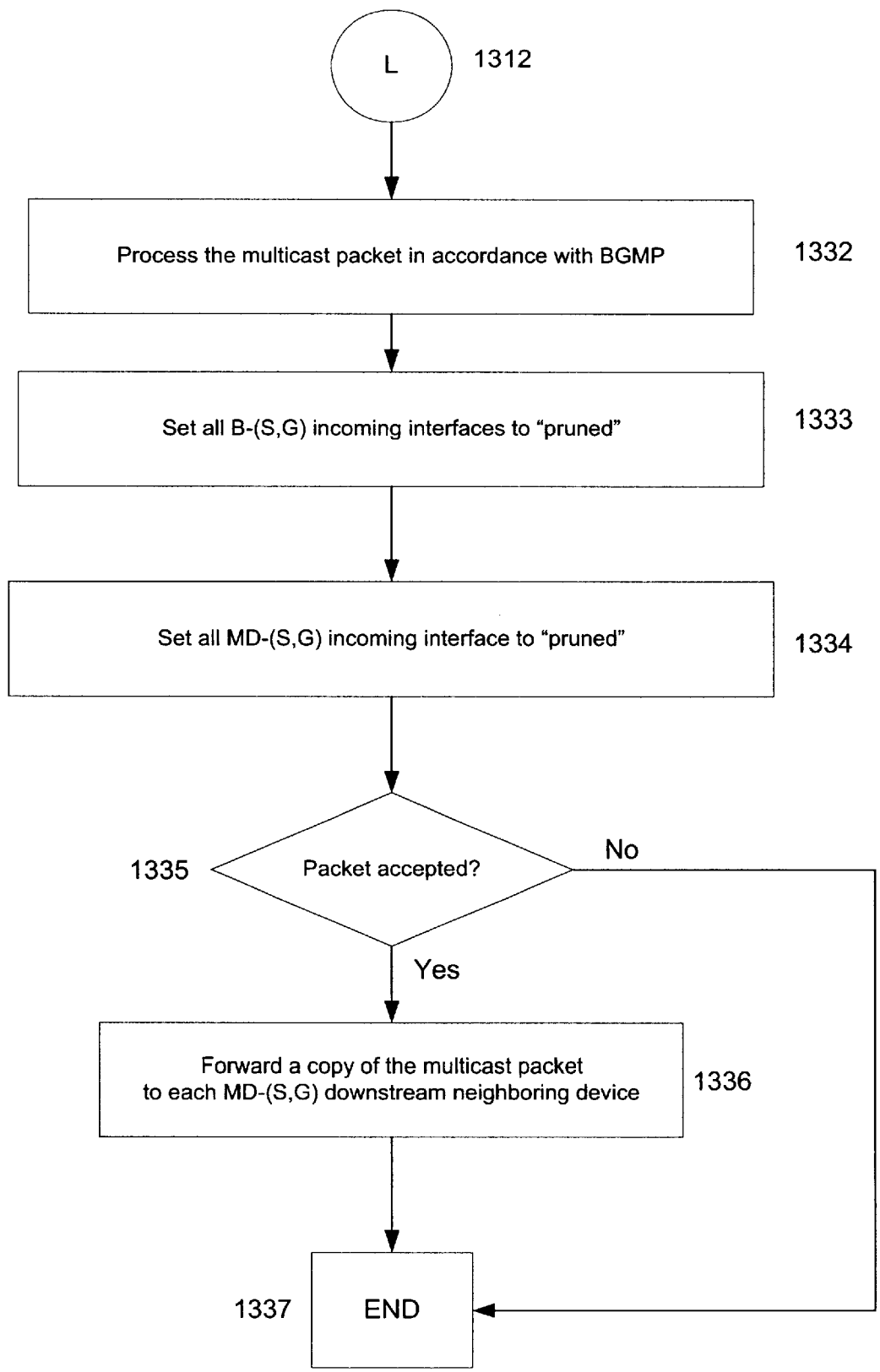
Figure 13F:
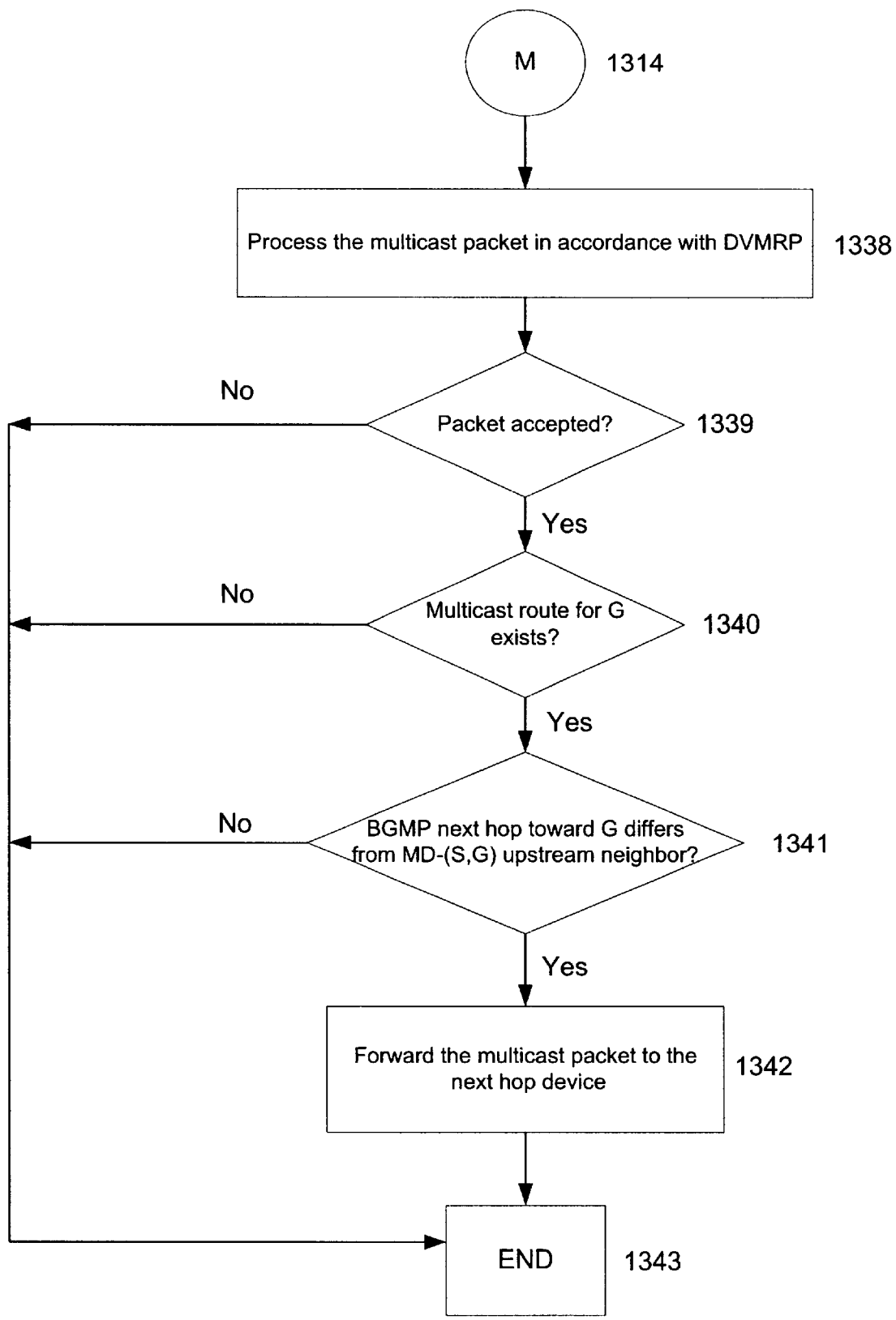
Figure 13G:
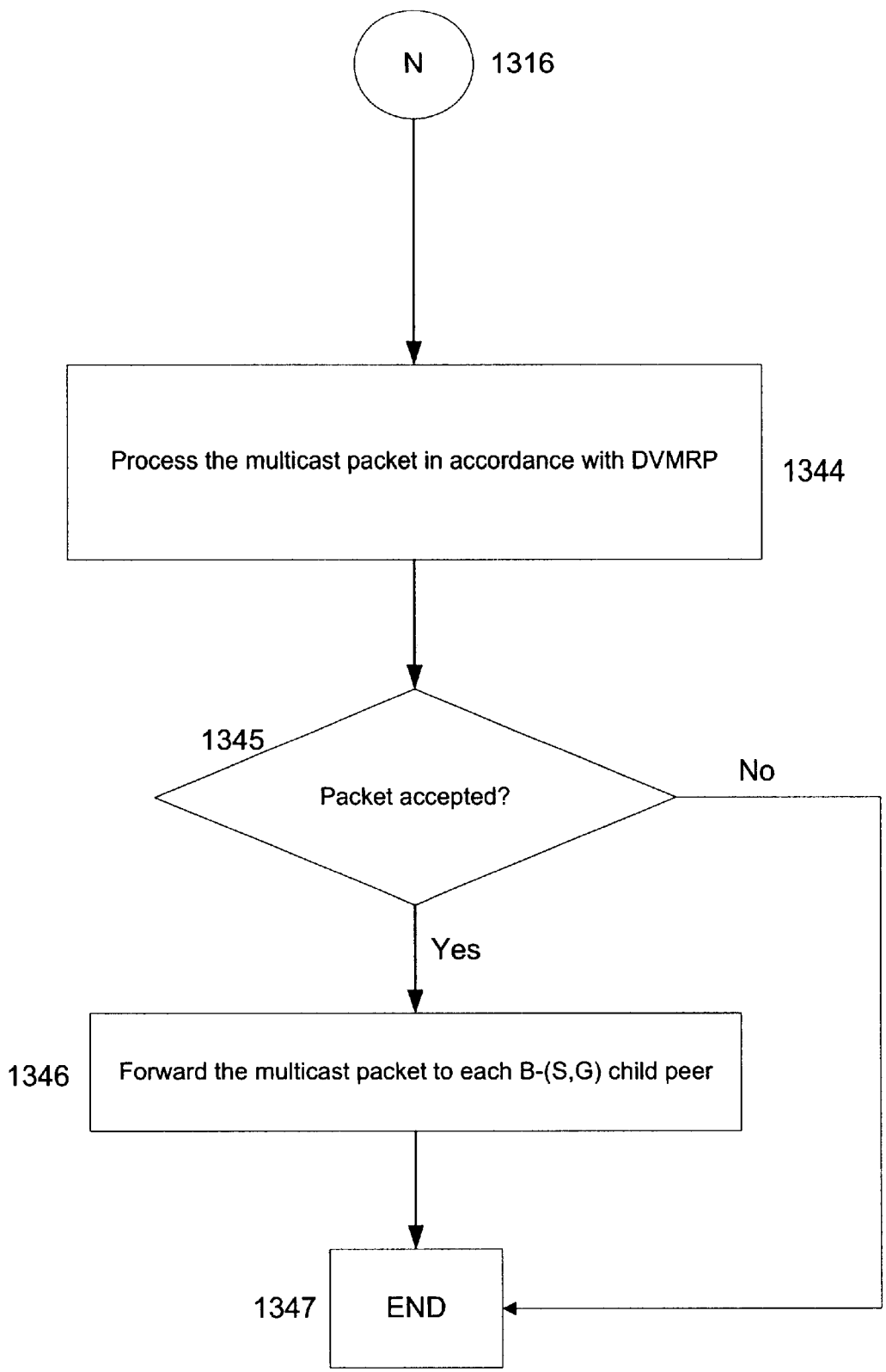
Figure 13H:
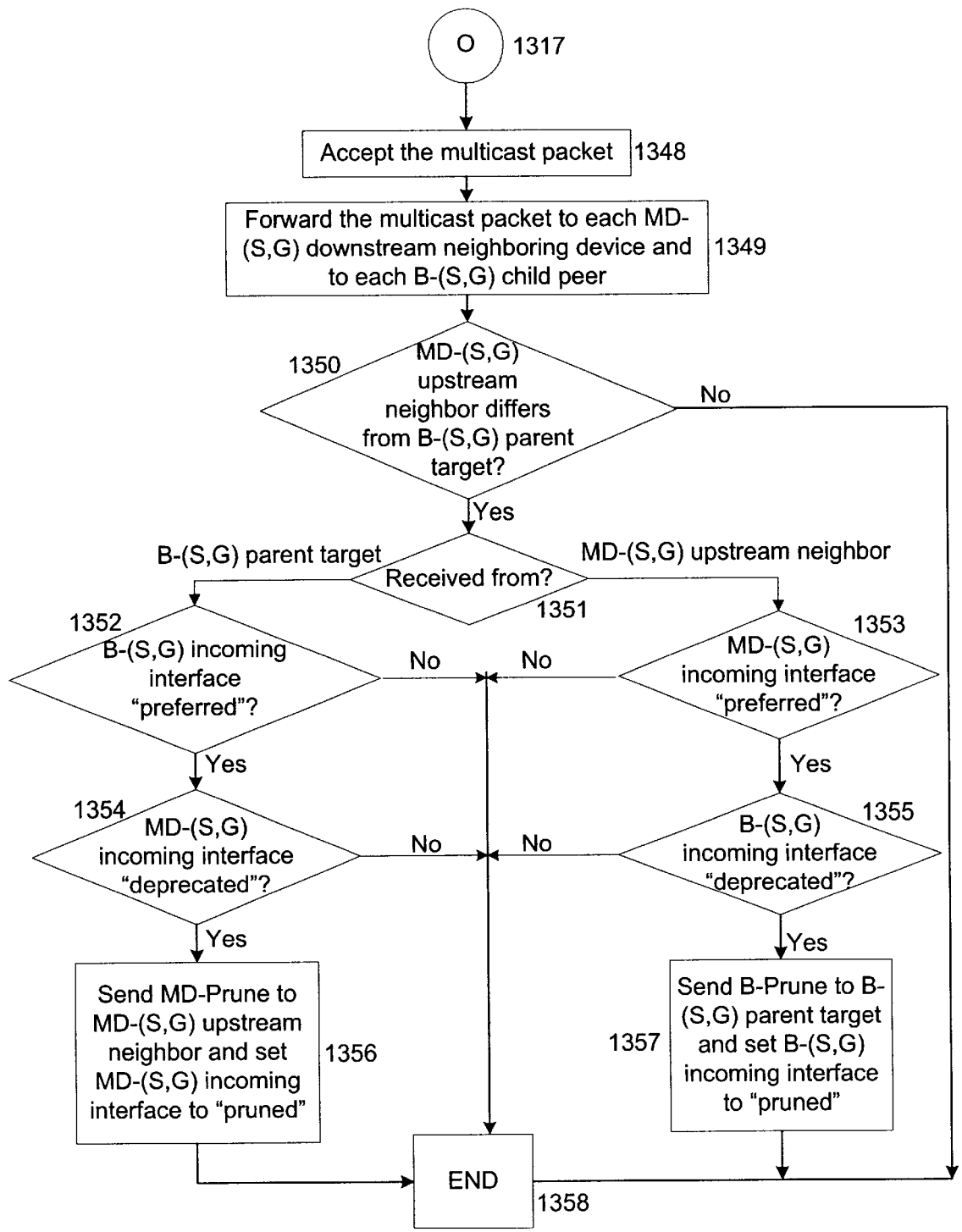
Figure 13:
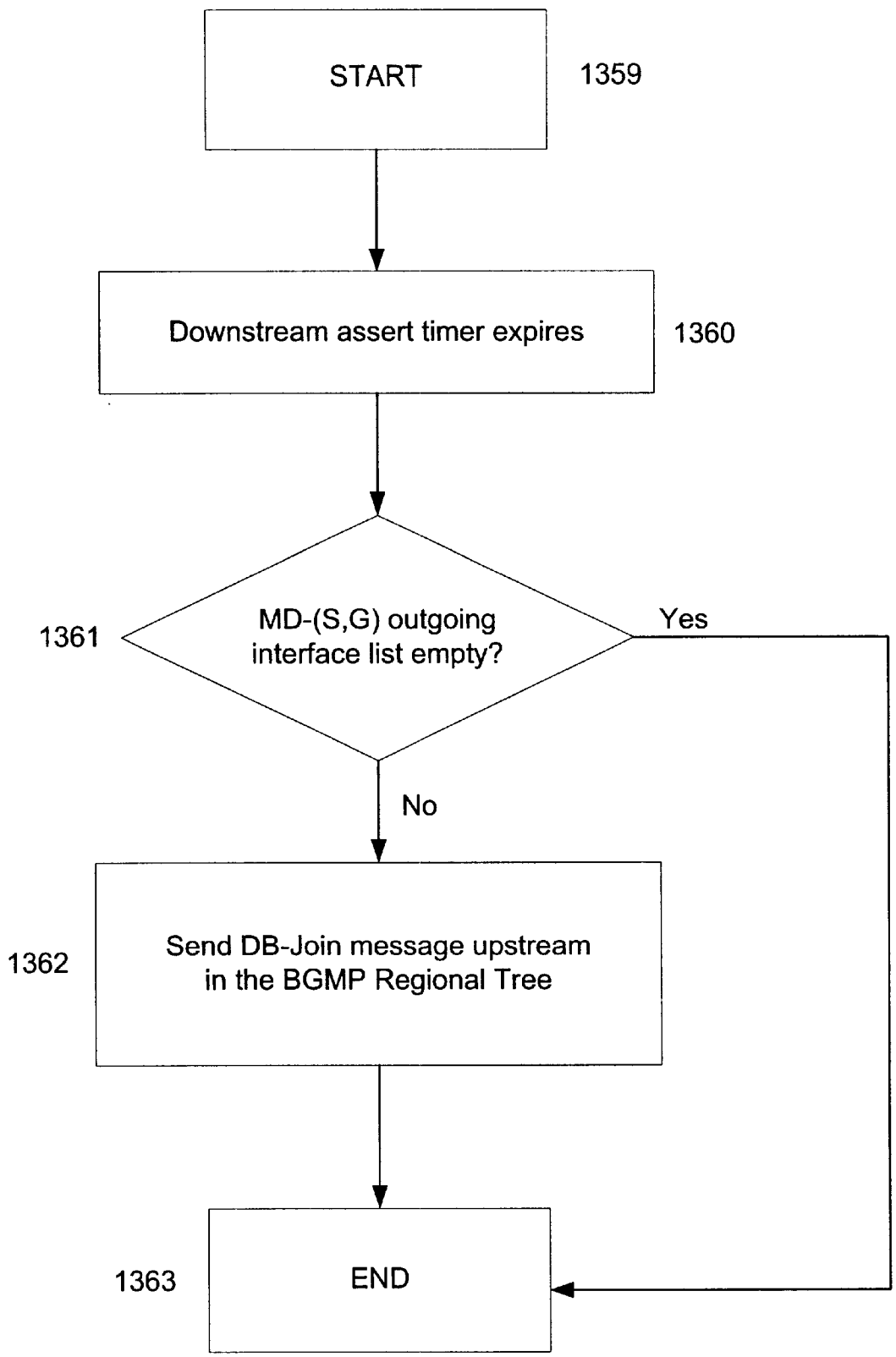
FIG. 13I is a logic flow diagram showing exemplary logic for a downstream assert timer in accordance with an embodiment of the present invention.

FIG. 12 shows exemplary logic for processing a BGMP routing change. After starting in step 1202, and upon detecting a BGMP routing change in step 1204, the logic proceeds to determine whether the router is the Regional BGMP Root, in step 1206. If the router is the Regional BGMP Root (YES in step 1206) and the BGMP routing change requires the router to become a child peer rather than a Regional BGMP Root (YES in step 1208), or if the router is not the Regional BGMP Root (NO in step 1206) and the BGMP routing change requires the router to become the Regional BGMP Root (YES in step 1210, then the logic sends a DB-Root message to each child peer associated with each B-(S,G) State, in step 1212, and terminates in step 1214.

Multicast Data Forwarding

When a DB-Router receives a multicast packet for the (S,G) pair, the DB-Router processes the multicast packet as follows.

If the DB-Router is not an Mbone DVMRP node (i.e., the DB-Router is not an MDB-Router), then the DB-Router processes the multicast packet in accordance with BGMP.

Otherwise, the MDB-Router searches the BGMP forwarding table for a B-(S,G) State and searches the DVMRP forwarding table for an MD-(S,G) State. If the MDB-Router does not have the MD-(S,G) but the multicast packet is received from a DVMRP upstream neighboring router, then the MDB-router creates an MD-(S,G) State. If the MDB-Router has a B-(*,G) State or the B-(S,G) incoming interface is considered to be "preferred," then the DB-Router drops the multicast packet, sends an MD-Prune message to the DVMRP upstream neighboring router, and sets the MD-(S,G) incoming interface to "pruned." Otherwise, the MDB-Router processes the multicast packet in accordance with DVMRP, sets the MD-(S,G) incoming interface to "preferred," and starts a downstream assert timer. When the downstream assert timer expires, the MDB-Router sends a DB-Join message upstream in the BGMP Regional Tree if and only if the list of outgoing interfaces associated with the MD-(S,G) State is not empty (null), that is, if the MD-(S,G) State is "active."

Otherwise, if the MDB-Router has the MD-(S,G) state but the MD-(S,G) incoming interface is considered to be "pruned," then the MDB-router processes the multicast packet in accordance with BGMP. In this case, when the MDB-Router accepts the multicast packet, the MDB-Router preferably forwards a copy of the multicast packet to each MD-(S,G) downstream neighboring router. It should be noted that the MDB-Router should never forward the multicast packet to the MD-(S,G) upstream neighboring router or to the B-(S,G) and B-(*,G) parent targets.

Otherwise, if the MDB-Router has the B-(*,G) State (which implies that there exists a complete BGMP path to the root domain), then the MDB-Router processes the multicast packet in accordance with BGMP. The MDB-Router prunes all B-(S,G) and MD-(S,G) incoming interfaces, if such incoming interfaces exist. In this case, when the MDB-Router accepts the multicast packet, the MDB-Router preferably forwards a copy of the multicast packet to each MD-(S,G) downstream neighboring router. It should be noted that the MDB-Router should never forward the multicast packet to the MD-(S,G) upstream neighboring router or to the B-(S,G) and B-(*,G) parent targets.

Otherwise, if the MDB-Router does not have the B-(S,G) State, then the MDB-Router processes the multicast packet in accordance with DVMRP. In this case, when the MDB-Router accepts the multicast packet, the MDB-Router preferably forwards the multicast packet to the next hop router if there is a multicast route for the multicast group G and the BGMP next hop router towards the multicast group G is not the MDB-Router's MD-(S,G) upstream neighboring router.

Otherwise, if the B-(S,G) incoming interface is considered to be "pruned," then the MDB-Router processes the multicast packet in accordance with DVMRP. In this case, when the MDB-Router accepts the multicast packet, the MDB-Router preferably forwards the multicast packet to each B-(S,G) child peer in the child target list. It should be noted that the MDB-Router should never forward the multicast packet to the MD-(S,G) upstream neighboring router or to the B-(S,G) parent target.

Otherwise, the MDB-Router does not have the B-(*,G) State but does have both the MD-(S,G) State and the B-(S,G) State, and neither the MD-(S,G) incoming interface nor the B-(S,G) incoming interface is considered to be "pruned." In this case, the MDB-Router accepts the multicast packet and forwards the multicast packet to each MD-(S,G) downstream neighboring router and to each B-(S,G) child peer in the child target list. It should be noted that the MDB-Router should never forward the multicast packet to the MD-(S,G) upstream neighboring router or to the B-(S,G) parent target. Furthermore, if the MD-(S,G) upstream neighboring router differs from the B-(S,G) parent target, then the MDB-Router may have to prune itself from either the Mbone DVMRP distribution tree or the BGMP Regional Tree. If the MDB-Router received the multicast packet from the B-(S,G) parent target, the B-(S,G) incoming interface is considered to be "preferred," and the MD-(S,G) incoming interface is considered to be "deprecated," then the MDB-Router prunes itself from the Mbone DVMRP distribution tree by sending an MD-Prune message to the MD-(S,G) upstream neighboring router and setting the MD-(S,G) incoming interface to "pruned." However, if the MDB-Router received the multicast packet from the MD-(S,G) upstream neighboring router, the MD-(S,G) incoming interface is considered to be "preferred," and the B-(S,G) incoming interface is considered to be "deprecated," then the MDB-Router prunes itself from the BGMP Regional Tree by sending a B-Prune message to the B-(S,G) parent target and setting the B-(S,G) incoming interface to "pruned."

FIGS. 13A through 13H show exemplary logic for processing a multicast packet. Starting in step 1301, and upon receiving a multicast packet in step 1302, the logic proceeds to determine whether the router is an Mbone DVMRP node, in step 1303. If the router is not an Mbone DVMRP node (NO in step 1303), then the logic processes the multicast packet in accordance with the BGMP protocol, in step 1304. If the router is an Mbone DVMRP node (YES in step 1303), then the logic proceeds to step 1305. After processing the multicast packet in step 1304 or step 1305, the logic terminates in step 1399.

From step 1305 (FIG. 13B), the logic determines whether the router has a MD-(S,G) State, in step 1307. If the router does not have a MD-(S,G) State (NO in step 1307), then the logic proceeds to determine whether the multicast packet was received from the DVMRP upstream neighboring router, in step 1308. If the multicast packet was received from the DVMRP upstream neighboring router (YES in step 1308), then the logic proceeds to step 1309. If the multicast packet was not received from the DVMRP upstream neighboring router (NO in step 1308), then the logic proceeds to step 1311.

If the router has the MD-(S,G) State (YES in step 1307), then the logic proceeds to determine whether the MD-(S,G) incoming interface is considered to be "pruned," in step 1310. If the MD-(S,G) incoming interface is considered to be "pruned" (YES in step 1310), then the logic proceeds to step 1306. If the MD-(S,G) incoming interface is not considered to be "pruned" (NO in step 1310), then the logic proceeds to step 1311.

In step 1311, the logic determines whether the router has a B-(*,G) State. If the router has a B-(*,G) State (YES in step 1312), then the logic proceeds to step 1312. If the router does not have the B-(*,G) State (NO in step 1312), then the logic proceeds to step 1313.

In step 1313, the logic determines whether the router has a B-(S,G) State. If the router does not have a B-(S,G) State (NO in step 1313), then the logic proceeds to step 1314. If the router has the B-(S,G) State (YES in step 1313), then the logic proceeds to step 1315.

In step 1315, the logic determines whether the B-(S,G) incoming interface is considered to be "pruned." If the B-(S,G) incoming interface is considered to be "pruned" (YES in step 1315), then the logic proceeds to step 1316. If the B-(S,G) incoming interface is not considered to be "pruned" (NO in step 1315), then the logic proceeds to step 1317.

From step 1309 (FIG. 13C), the logic creates an MD-(S,G) State, in step 1318, and proceeds to determine whether the router has a B-(*,G) State, in step 1319. If the router has the B-(*,G) State (YES in step 1319), then the logic drops the multicast packet, in step 1321, sends an MD-Prune message to the MD-(S,G) upstream neighboring router, in step 1323, sets the MD-(S,G) incoming interface to "pruned," in step 1325, and terminates in step 1327.

If the router does not have the B-(*,G) State (NO in step 1319), then the logic proceeds to determine whether the B-(S,G) incoming interface is considered to be "preferred," in step 1320. If the B-(S,G) incoming interface is considered to be "preferred" (YES in step 1320, then the logic drops the multicast packet, in step 1321, sends an MD-Prune message to the MD-(S,G) upstream neighboring router, in step 1323, sets the MD-(S,G) incoming interface to "pruned," in step 1325, and terminates in step 1327.

If the B-(S,G) incoming interface is not considered to be "preferred" (NO in step 1320), then the logic processes the multicast packet in accordance with the DVMRP protocol, in step 1322, sets the MD-(S,G) incoming interface to "preferred," in step 1324, starts the downstream assert timer, in step 1326, and terminates in step 1327.

From step 1306 (FIG. 13D), the logic processes the multicast packet in accordance with the BGMP protocol, in step 1328. Then, if the multicast packet was accepted (YES in step 1329), the logic forwards a copy of the multicast packet to each MD-(S,G) downstream neighboring router, in step 1330. The logic terminates in step 1331.

From step 1312 (FIG. 13E), the logic processes the multicast packet in accordance with the BGMP protocol, in step 1332, sets all B-(S,G) incoming interfaces to "pruned," in step 1333, and sets all MD-(S,G) incoming interfaces to "pruned," in step 1334. Then, if the multicast packet was accepted (YES in step 1335), the logic forwards a copy of the multicast packet to each MD-(S,G) downstream neighboring router, in step 1336. The logic terminates in step 1337.

From step 1314 (FIG. 13F), the logic processes the multicast packet in accordance with the DVMRP protocol , in step 1338. Then, if the multicast packet was accepted (YES in step 1339), there exists a multicast route for the multicast group G (YES in step 1340), and the BGMP next hop router towards the multicast group G differs from the MD-(S,G) upstream neighboring router (YES in step 1341), then the logic forwards the multicast packet to the next hop router, in step 1342. The logic terminates in step 1343.

From step 1316 (FIG. 13G), the logic processes the multicast packet in accordance with the DVMRP protocol, in step 1344. Then, if the multicast packet was accepted (YES in step 1345), the logic forwards the multicast packet to each B-(S,G) child peer, in step 1346.

The logic terminates in step 1347.

From step 1317 (FIG. 13H), the logic accepts the multicast packet, in step 1348, and forwards the multicast packet to each MD-(S,G) downstream neighboring router and to each B-(S,G) child peer, in step 1349. Then, if the MD-(S,G) upstream neighboring router differs from the B-(S,G) parent target (YES in step 1350) and the multicast packet was received from the B-(S,G) parent target, the logic sends an MD-Prune message to the MD-(S,G) upstream neighboring router and sets the MD-(S,G) incoming interface to "pruned," in step 1356, if the B-(S,G) incoming interface is considered to be "pruned" (YES in step 1352) and the MD-(S,G) incoming interface is considered to be "deprecated" (YES in step 1354). However, if the MD-(S,G) upstream neighboring router differs from the B-(S,G) parent target (YES in step 1350) and the multicast packet was received from the MD-(S,G) upstream neighboring router, then the logic sends a B-Prune to the B-(S,G) parent target and sets the B-(S,G) incoming interface to "pruned," in step 1357, if the MD-(S,G) incoming interface is considered to be "preferred" (YES in step 1353) and the B-(S,G) incoming interface is considered to be "deprecated" (YES in step 1355). The logic terminates in step 1358.

FIG. 13I shows exemplary logic for the downstream assert timer. After starting in step 1359, and upon determining that the downstream assert timer expired in step 1360, the logic sends a DB-Join message upstream in the BGMP Regional Tree, in step 1361, if the MD-(S,G) outgoing interface list is not empty (NO in step 1361. The logic terminates in step 1363.

Many of the above-described machinations can be demonstrated by example. FIG. 14 is a block diagram of a router network 1400 in accordance with an exemplary embodiment of the present invention. The connections represented by solid lines are physical connections, while the connections represented by dotted lines are Mbone virtual connections. The routers designated with the letter "B," in particular routers B1 through B7, are routers that support DBGMP. The routers B1, B2, B4, B5, B6, and B7 support both DBGMP and DVMRP. The routers designated with the letter "D," in particular routers D1 through D4, are routers that support DVMRP but not DBGMP. These routers have an MD-(S,G) State. The routers designated with the letter "X," in particular routers X1 through X5, are routers that support neither DBGMP nor DVMRP. In this example, the router D1 is in the multicast source domain (represented by the letter "S"), while the routers B1, B2, and B6 are in multicast group domains (represented by the letter "G"). The router D1 forwards multicast packets for the multicast source S.

The router B1 creates a DB-(S,G) State, but does not send a DB-Join message to the router X3 because the router X3 does not support DBGMP.

The router B2 sends a DB-Join message to the routers B3, B4, and B5. The routers B2, B3, and B4 create a DB-(S,G) State. The router B5 determines that the router X1 does not support DBGMP, creates a B-(S,G) State, and sends a DB-Root message to the routers B4, B3, and B2. Upon receiving the DB-Root message from the router B5, the routers B4, B3, and B2 change the DB-(S,G) State to the B-(S,G) State.

The router B6 sends a DB-Join message to the routers B7 and B5. The routers B7 and B5 create a DB-(S,G) State. Since the router B5 already has a B-(S,G) State, the router B5 returns a DB-Root message to the routers B7 and B6. The routers B7 and B6 change to the B-(S,G) State.

The router D1 forwards a multicast packet to the router D2 via a DVMRP "tunnel." The router D2 in turn forwards the multicast packet to the router B5. The router B5 in turn forwards the multicast packet to the DVMRP downstream neighboring router D3 and to the BGMP child peer routers B4 and B7.

The router D3 forwards the multicast packet to the DVMRP downstream neighboring routers B1 and B4.

The router B4 receives the multicast packet from the routers B5 and D3. When the router B4 receives the multicast packet from the router B5, the router B4 prunes the DVMRP upstream neighboring router D3, and forwards the multicast packet to the DVMRP downstream neighboring routers B2 and B7 and to the BGMP child peer router B3.

The router B3 forwards the multicast packet to the BGMP child peer router B2.

The router B2 receives the multicast packet from the routers B4 and B3. When the router B2 receives the multicast packet from the router B3, the router B2 prunes the DVMRP upstream neighboring router B4.

The router B7 receives the multicast packet from the routers B5 and B4. When the router B7 receives the multicast packet from the router B5, the router B7 prunes the DVMRP upstream neighboring router B4, and forwards the multicast packet to the DVMRP downstream neighboring router D4 and to the BGMP child peer router B6.

The router D4 forwards the multicast packet to the router B6.

The router B6 receives the multicast packet from the routers B7 and D4. When the router B6 receives the multicast packet from the router B7, the router B6 prunes the DVMRP upstream neighboring router D4, which in turn prunes the DVMRP upstream neighboring router B7.

Another example demonstrates how the metric is used to determine BGMP Break Points. FIG. 15 is a block diagram of an exemplary router network 1500 showing the original DVMRP forwarding paths prior to determining BGMP Break Points. FIG. 16 is a block diagram of an exemplary router network 1600 showing the mixed DVMRP/DBGMP forwarding paths subsequent to determining BGMP Break Points. As in FIG. 14, the connections represented by solid lines are physical connections, while the connections represented by dotted lines are Mbone virtual connections. The routers designated with the letter "B," in particular routers B1 through B8, are routers that support DBGMP. The routers designated with the letter "D," in particular routers D1 through D9, are routers that support DVMRP but not DBGMP. The router designated with the letter "X" supports neither DBGMP nor DVMRP.

As described above, each DB-Router is associated with a metric value. Each DVMRP router is also associated with a metric value. In the exemplary router network 15200 shown in FIG. 15, the metric value associated with each of the routers B1, B3, B5, and B7 is "infinity," while the metric value associated with each of the routers S, D1, B4, D2, D3, B2, D4, D5, B8, D6, D7, B6, and B8 is 0, 1, 2, 3, 4, 5, 6, 7 ,8, 9, 10, 11, and 12, respectively.

The router B1 sends a DB-Join message, which reaches the router B8. The router B8 in turn sends a DB-Root message to the routers B7 and B6 with MD-Metric equal to the metric value associated with the router B8, which is eight (8).

Upon receiving the DB-Root message from the router B8, the router B6 determines that the metric value associated with the router B8 (from the MD-Metric in the DB-Root message) is less than its own metric value of eleven (11), and thus forwards the DB-Root to the routers B5 and B4.

Upon receiving the DB-Root message forwarded by the router B6, the router B4 determines that its metric value of two (2) is less than the metric value associated with the router B8 (from the MD-Metric in the DB-Root message), and thus determines itself to be a BGMP Break Point. The router B4 therefore sends a DB-Prune message to the router B5, which in turn sends a DB-Prune to the router B6. The router B4 also sends a new DB-Root message to the routers B3, B2, and B1 with MD-Metric equal to its own metric value of two (2).

Upon receiving the DB-Root message from the router B4, the router B2 determines that the metric value associated with the router B4 (from the MD-Metric in the DB-Root message) is less than its own metric value of five (5), and thus forwards the DB-Root message to the router B1.

When the routers B6 and B2 receive a multicast packet from their respective BGMP parent peers, the routers B6 and B2 send MD-Prune messages to the routers D7 and D3, respectively.

The resulting router network 1600, shown in FIG. 16, includes the router B4 as the Regional BGMP Root for a BGMP Regional Tree. The routers X and B5 are pruned completely from the multicast distribution tree. Certain DVMRP routes, for example, the DVMRP routes between routers D7 and B6 and between routers D3 and B2 shown in FIG. 15, are pruned from the Mbone DVMRP distribution tree. BGMP routes, for example, the BGMP routes between routers B8, B7, and B6 and between routers B4, B3, B2, and B1, are grafted onto the BGMP Regional Tree.

In a preferred embodiment of the present invention, predominantly all of the DBGMP logic is implemented as a set of computer program instructions that are stored in a computer readable medium and executed by an embedded microprocessor system within the DB-Router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

We claim:

1. A method for transitioning from Distance Vector Multicast Routing Protocol (DVMRP) to Border Gateway Multicast Protocol (BGMP) for interdomain multicast routing by a device in a multicast communication network having a plurality of interconnected devices, the method comprising running an extended BGMP (DBGMP) protocol and optionally running the DVMRP protocol, wherein the DVMRP protocol defines at least a DVMRP (S,G) State, a DVMRP Graft message, and a DVMRP Prune message, and wherein the DBGMP protocol defines at least a BGMP (*,G) State, a BGMP (S,G) State, a BGMP Join message, a BGMP Prune message, a pending DBGMP (*,G) State for a multicast group G, a confirmed DBGMP (*,G) State for the multicast group G, a DBGMP (S,G) State for a multicast source S and the multicast group G, a DBGMP Join message, and a DBGMP Root message including a metric field.

2. The method of claim 1, wherein running the DBGMP protocol comprises:

learning a multicast route for the multicast group G using a BGMP mechanism;

creating a pending DBGMP (*,G) State and sending a DBGMP Join message to a next hop device towards the multicast group G, if the device does not have a BGMP (*,G) State, there does not exist a complete BGMP path to the root domain, and the device does not have a DBGMP (*,G) State; and creating the BGMP (*,G) State, sending a BGMP Join message to a next hop device towards the multicast group G, sending a BGMP Prune message and setting the BGMP (S,G) incoming interface to "pruned" for each BGMP (S,G) State that has an unpruned incoming interface and also has a different parent target that the BGMP (*,G) parent target, and sending a DVMRP Prune message to a DVMRP upstream neighboring device and setting the DVMRP (S,G) incoming interface to "pruned" for each DVMRP (S,G) that has an unpruned incoming interface and also has an upstream neighboring device that differs from the BGMP (*,G) parent target, if the device does not have the BGMP (*,G) State and there exists a complete BGMP path to the root domain.

3. The method of claim 1, wherein running the DBGMP protocol comprises:

detecting an active DVMRP (S,G) State; and creating a DBGMP (S,G) State and sending a DBGMP Join message to a next hop device towards the multicast source S, if the next hop device towards the multicast source S supports the DBGMP protocol and the device does not have a BGMP (*,G) State, a B-(S,G) State, or a DBGMP (S,G) State.

4. The method of claim 1, wherein the device is a border device, and wherein running the DBGMP protocol comprises:

creating a BGMP (S,G) State, setting the BGMP (S,G) incoming interface to "preferred," and sending a BGMP Join message to the next hop device toward the multicast source S, if the device is a border device for a domain associated with an (S,G) state, the multicast source S is in a remote domain, there exists a complete BGMP path to the source domain, and the device does not have a BGMP (*,G) State or a BGMP (S,G) State.

5. The method of claim 1, wherein running the DBGMP protocol comprises:

receiving a BGMP Join message;

processing the BGMP Join message in accordance with the BGMP protocol:

deleting all DBGMP (*,G) and DBGMP (S,G) States;

setting the BGMP (S,G) incoming interface to "pruned," if a BGMP (S,G) State was created as a result of processing the BGMP Join message and the device has the BGMP (*,G) State;

setting the BGMP (S,G) incoming interface to "preferred," if a BGMP (S,G) State was created as a result of processing the BGMP Join message and the device does not have the BGMP (*,G) State;

setting each BGMP (S,G) incoming interface to "pruned," if a BGMP (*,G) State was created as a result of processing the BGMP Join message and the BGMP (*,G) parent target differs from the BGMP (S,G) parent target;

setting each DVMRP (S,G) incoming interface to "pruned," if a BGMP (*,G) State was created as a result of processing the BGMP Join message and the BGMP (*,G) parent target differs from the DVMRP (S,G) upstream neighboring device.

6. The method of claim 1, wherein running the DBGMP protocol comprises:

receiving a DBGMP Join message for (*,G) from a child peer;

returning a DBGMP Root message to the child peer with the metric value set to zero (0) and adding the child peer to a child target list, if the device has a BGMP (*,G) State;

adding the child as a pending peer to the child target list, if the device does not have the BGMP (*,G) State and the device has a pending DBGMP (*,G) state;

returning a DBGMP Root message to the child peer with the metric value set to infinity, if the device does not have the BGMP (*,G) State or a pending DBGMP (*,G) state and either the device has a confirmed DBGMP (*,G) state or the next hop device towards the multicast group G does not support the DBGMP protocol;

creating a BGMP (*,G) State, adding the child to the child target list, and returning a DBGMP Root message to the child peer with the metric value set to zero (0), if the device does not have the BGMP (*,G) State, the pending DBGMP (*,G) state, or the confirmed DBGMP (*,G) state, the next hop device towards the multicast group G supports the DBGMP protocol, and the device is a border device for the root domain; and creating a DBGMP (*,G) State, forwarding a DBGMP Join message to the next hop device towards the multicast group G, and adding the child peer as a pending peer to the child target list, if the device does not have the BGMP (*,G) State, the pending DBGMP (*,G) state, or the confirmed DBGMP (*,G) state, the next hop device towards the multicast group G supports the DBGMP protocol, and the device is not a border device for the root domain.

7. The method of claim 1, wherein running the DBGMP protocol comprises:

receiving a DBGMP Join message for (S,G) from a child peer;

returning a DBGMP Root message to the child peer with the metric value equal to a BGMP Regional MD-Metric for (S,G) and adding the child peer to the child target list, if the device has a BGMP (S,G) State;

adding the child peer as a pending peer to the child target list, if the device does not have the BGMP (S,G) State and the device has a DBGMP (S,G) State;

creating a BGMP (S,G) State, setting the BGMP (S,G) incoming interface to "pruned," returning a DBGMP Root message to the child peer with the metric value equal to zero, and adding the child peer to the child target list, if the device does not have the BGMP (S,G) State or the DBGMP (S,G) State and the device has the BGMP (*,G) State;

creating a BGMP (S,G) State, setting the BGMP (S,G) incoming interface to "pruned," returning a DBGMP Root message to the child peer with the metric value equal to the device's metric value, and adding the child peer to the child target list, if the device does not have the BGMP (S,G) State, the DBGMP (S,G) State, or the BGMP (*,G) State and the next hop device towards the multicast source S does not support the DBGMP protocol;

creating a BGMP (S,G) State, setting the BGMP (S,G) incoming interface to "pruned," returning a DBGMP Root message to the child peer with the metric value equal to zero, and adding the child peer to the child target list, if the device does not have the BGMP (S,G) State, the DBGMP (S,G) State, or the BGMP (*,G) State, the next hop device towards the multicast source S supports the DBGMP protocol, and the device is a border device for the source domain; and creating a DBGMP (S,G) State, sending a DBGMP Join message to the next hop device towards the multicast source S, and adding the child peer as a pending peer to the child target list, if the device does not have the BGMP (S,G) State, the DBGMP (S,G) State, or the BGMP (*,G) State, the next hop device towards the multicast source S supports the DBGMP protocol, and the device is not a border device for the source domain.

8. The method of claim 1, wherein running the DBGMP protocol comprises:

receiving a DBGMP Root message for (*,G) from a parent peer;

determining whether the metric value in the DBGMP Root message is equal to infinity or zero;

if the metric value in the DBGMP Root message is equal to infinity:
changing a pending DBGMP (*,G) State into a confirmed DBGMP (*,G) State, if the device has the pending DBGMP (*,G) State;
creating a confirmed DBGMP (*,G) State, if the device does not have the pending DBGMP (*,G) State;
sending a DBGMP Join message to the parent target of each BGMP (S,G) State and deleting the BGMP (*,G) State, if the device has a BGMP (*,G) State;
sending a BGMP Prune message to the parent peer; and
forwarding the DBGMP Root message to all child peers on the BGMP (*,G) child target list;

if the metric value in the DBGMP Root message is equal to zero:
deleting the DBGMP (*,G) State, if the device has the DBGMP (*,G) State;
creating a BGMP (*,G) State, if the device does not have the BGMP (*,G) State;
forwarding the DBGMP Root message to all pending peers in the child target list;
sending a BGMP Prune message to the BGMP (S,G) patent target and setting the BGMP (S,G) incoming interface to "pruned," if the device has a BGMP (S,G) State and the next hop peers toward the multicast source S and the multicast group G differ; and
sending a DVMRP Prune message to the DVMRP (S,G) upstream neighboring device and setting the DVMRP (S,G) incoming interface to "pruned," if the device has a DVMRP (S,G) State and the BGMP (*,G) parent target is different than the DVMRP (S,G) upstream neighboring device; and clearing the pending status for all pending peers in the child target list, if the child target list includes any pending peers.

9. The method of claim 1, wherein running the DBGMP protocol comprises:

receiving a DBGMP Root message for (S,G) from a parent peer;

if the metric value in the DBGMP Root message is greater than the device's metric to the multicast source S or if they are the same but the device's metric to the multicast source S is infinity:
forwarding the DBGMP Root message to each child peer in the child target list;
deleting any existing DBGMP (S,G) State;
deleting any existing BGMP (S,G) State;
sending a BGMP Prune message to the parent peer;
sending a DVMRP Graft message to the DVMRP (S,G) upstream neighboring device, if the DVMRP (S,G) incoming interface is considered to be "pruned" and the device does not have a BGMP (*,G) State; and
setting the DVMRP (S,G) incoming interface to "preferred," if the device does not have a BGMP (*,G) State;

if the metric value in the DBGMP Root message is less than the device's metric to the multicast source S or if they are the same but the device's metric to the multicast source S is not infinity:
forwarding the DBGMP Root message to all pending peers in the child target list;
changing the DBGMP (S,G) State into a BGMP (S,G) State, if the device has the DBGMP (S,G) State;
creating a BGMP (S,G) State, if the device does not have the DBGMP (S,G) State;
sending a BGMP Prune message to the BGMP (S,G) parent target and setting the BGMP (S,G) incoming interface to "pruned," if the device has a BGMP (*,G) State and the next hop peers toward the multicast source S and the multicast group G differ; and
setting the DVMRP (S,G) incoming interface to "deprecated," if the device has a DVMRP (S,G) State and the BGMP (S,G) parent target differs from DVMRP (S,G) upstream neighboring device; and clearing the pending status for all pending peers in the child target list, if the child target list includes any pending peers.

10. The method of claim 1, wherein running the DBGMP protocol comprises:

receiving a first BGMP Prune message;

processing the first BGMP Prune message in accordance with the BGMP protocol; and if a BGMP (*,G) State is deleted as a result of processing the first BGMP Prune message:
sending a second BGMP Prune message to the BGMP (*,G) parent target;
sending a DBGMP Join message to the parent target of each of a number of BGMP (S,G) states;
sending a third BGMP Prune message to the BGMP (S,G) parent target, if there is no DVMRP downstream neighbor device and no BGMP child target for (S,G) and the BGMP (S,G) incoming interface is not considered to be "pruned;" and deleting the BGMP (S,G) State, if there is no DVMRP downstream neighbor device and no BGMP child target for (S,G).

11. The method of claim 1, wherein running the DBGMP protocol comprises:
   receiving a DVMRP Prune message;
   processing the DVMRP Prune message in accordance with the DVMRP protocol;
   sending a DVMRP Prune message to the DVMRP (S,G) upstream neighboring device, if the DVMRP (S,G) outgoing interface list became empty as a result of processing the DVMRP Prune message, there is no child target for (S,G), and the DVMRP (S,G) incoming interface is not considered to be "pruned;" and
   deleting the DVMRP (S,G) State, if the DVMRP (S,G) outgoing interface list became empty as a result of processing the DVMRP Prune message and there is no child target for (S,G).

12. The method of claim 1, wherein running the DBGMP protocol comprises:
   receiving a DVMRP Graft message;
   adding outgoing interface(s) in accordance with the DVMRP protocol; and
   sending a DVMRP Graft message to the DVMRP (S,G) upstream neighboring device, if the DVMRP (S,G) outgoing interface list became empty as a result of processing the DVMRP Graft message.

13. The method of claim 1, wherein running the DBGMP protocol comprises:
   pruning from the BGMP Regional Tree and forming a new BGMP Regional Tree, if the metric value associated with the device is less than the metric value associated with the Regional BGMP Root.

14. The method of claim 13, wherein pruning from the BGMP Regional Tree and forming a new BGMP Regional Tree comprises:
   sending a DBGMP Root message with the metric value equal to the device's metric value to each of the child peers associated with each of the BGMP (S,G) States;
   sending a BGMP Prune message to the BGMP (S,G) parent target and setting the BGMP (S,G) incoming interface to "pruned," if the BGMP (S,G) incoming interface is not considered to be "pruned;" and
   sending a DVMRP Graft message to the DVMRP (S,G) upstream neighboring device and setting the DVMRP (S,G) incoming interface to "preferred," if the DVMRP (S,G) incoming interface is considered to be "pruned."

15. The method of claim 1, comprising:
   detecting a BGMP routing change;
   changing from a Regional BGMP Root to a BGMP child; and
   sending a DBGMP Root message to the child peers associated with each BGMP (S,G) State, wherein the DBGMP Root message includes a metric value equal to a new BGMP Regional MD-Metric for (S,G).

16. The method of claim 1, wherein running the DBGMP protocol comprises:
   detecting a BGMP routing change;
   changing from a BGMP child to a Regional BGMP Root; and
   sending a DBGMP Root message to the child peers associated with each BGMP (S,G) State, wherein the DBGMP Root message includes a metric value equal to the device's metric value.

17. The method of claim 1, wherein the device is not an Mbone DVMRP node, and wherein running the DBGMP protocol further comprises:
   receiving a multicast packet for the (S,G) pair; and
   processing the multicast packet in accordance with the BGMP protocol.

18. The method of claim 1, wherein the device is an Mbone DVMRP node, and wherein running the DBGMP protocol further comprises:
   receiving a multicast packet for the (S,G) pair;
   if the device does not have a DVMRP (S,G) State and the multicast packet was received from a DVMRP upstream neighboring device:
      creating a DVMRP (S,G) State;
      dropping the multicast packet, sending a DVMRP Prune message to the DVMRP (S,G) upstream neighboring device, and setting the DVMRP (S,G) incoming interface to "pruned," if the device has a BGMP (*,G) State;
      dropping the multicast packet, sending a DVMRP Prune message to the DVMRP (S,G) upstream neighboring device, and setting the DVMRP (S,G) incoming interface to "pruned," if the device does not have the BGMP (*,G) State and the BGMP (S,G) incoming interface is considered to be "preferred;" and
      processing the multicast packet in accordance with the DVMRP protocol, setting the DVMRP (S,G) incoming interface to "preferred," and starting a downstream assert timer, if the device does not have the BGMP (*,G) State and the BGMP (S,G) incoming interface is not considered to be "preferred;"
   if the device has the DVMRP (S,G) State and the DVMRP (S,G) incoming interface is considered to be "pruned":
      processing the multicast packet in accordance with the BGMP protocol; and
      forwarding a copy of the multicast packet to each DVMRP (S,G) downstream neighboring device, if the device accepts the multicast packet as a result of processing the multicast packet in accordance with the BGMP protocol;
   if the device has a BGMP (*,G) State and either the device does not have the DVMRP (S,G) State and the multicast packet was not received from the DVMRP upstream neighboring device or the device has the DVMRP (S,G) State and the DVMRP (S,G) incoming interface is not considered to be "pruned":
      processing the multicast packet in accordance with the BGMP protocol;
      setting all BGMP (S,G) incoming interfaces to "pruned;"
      setting all DVMRP (S,G) incoming interfaces to "pruned;" and
      forwarding a copy of the multicast packet to each DVMRP (S,G) downstream neighboring device, if the device accepts the multicast packet as a result of processing the multicast packet in accordance with the BGMP protocol;
   if the device does not have a BGMP (S,G) State, the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
      processing the multicast packet in accordance with the DVMRP protocol; and
      forwarding the multicast packet to a next hop device, if the device accepts the multicast packet as a result of processing the multicast packet in accordance with the DVMRP protocol, there exists a multicast route for the multicast group G, and the BGMP next hop device towards the multicast group G differs from the DVMRP (S,G) upstream neighboring device;

if the device has the BGMP (S,G) State, the BGMP (S,G) incoming interface is considered to be "pruned," the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":

processing the multicast packet in accordance with the DVMRP protocol; and forwarding the multicast packet to each BGMP (S,G) child peer, if the device accepts the multicast packet as a result of processing the multicast packet in accordance with the DVMRP protocol; and if the device has the BGMP (S,G) State, the BGMP (S,G) incoming interface is not considered to be "pruned," the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":

accepting the multicast packet;

forwarding the multicast packet to each DVMRP (S,G) downstream neighboring device;

forwarding the multicast packet to each BGMP (S,G) child peer;

sending a DVMRP Prune message to the DVMRP (S,G) upstream neighboring device and setting the DVMRP (S,G) incoming interface to "pruned," if the DVMRP (S,G) upstream neighboring device differs from the BGMP (S,G) parent target, the multicast packet was received from the BGMP (S,G) parent target, the BGMP (S,G) incoming interface is considered to be "preferred," and the DVMRP (S,G) incoming interface is considered to be "deprecated;" and sending a BGMP Prune message to the BGMP (S,G) parent target and setting the BGMP (S,G) incoming interface to "pruned," if the DVMRP (S,G) upstream neighboring device differs from the BGMP (S,G) parent target, the multicast packet was received from the DVMRP (S,G) upstream neighboring device, the DVMRP (S,G) incoming interface is considered to be "preferred," and the BGMP (S,G) incoming interface is considered to be "deprecated."

19. The method of claim 18, further comprising:

determining that the downstream assert timer expired; and sending a DBGMP Join message upstream in the BGMP Regional Tree if and only if the list of outgoing interfaces associated with the DVMRP (S,G) State is not empty.

20. A device for transitioning a multicast communication network from Distance Vector Multicast Routing Protocol (DVMRP) to Border Gateway Multicast Protocol (BGMP), the device comprising protocol logic including extended BGMP (DBGMP) protocol logic and optionally including DVMRP protocol logic, wherein the DVMRP protocol logic defines at least a DVMRP (S,G) State, a DVMRP Graft message, and a DVMRP Prune message, and wherein the DBGMP logic defines at least a BGMP (*,G) State, a BGMP (S,G) State, a BGMP Join message, a BGMP Prune message, a pending DBGMP (*,G) State for a multicast group G, a confirmed DBGMP (*,G) State for the multicast group G, a DBGMP (S,G) State for a multicast source S and the multicast group G, a DBGMP Join message, and a DBGMP Root message including a metric field.

21. The device of claim 20, wherein the DBGMP protocol logic comprises:

means for learning a multicast route for the multicast group G using a BGMP mechanism;

means for creating a pending DBGMP (*,G) State and sending a DBGMP Join message to a next hop device towards the multicast group G, if the device does not have a BGMP (*,G) State, there does not exist a complete BGMP path to the root domain, and the device does not have a DBGMP (*,G) State; and means for creating the BGMP (*,G) State, sending a BGMP Join message to a next hop device towards the multicast group G, sending a BGMP Prune message and setting the BGMP (S,G) incoming interface to "pruned" for each BGMP (S,G) State that has an unpruned incoming interface and also has a different parent target that the BGMP (*,G) parent target, and sending a DVMRP Prune message to a DVMRP upstream neighboring device and setting the DVMRP (S,G) incoming interface to "pruned" for each DVMRP (S,G) that has an unpruned incoming interface and also has an upstream neighboring device that differs from the BGMP (*,G) parent target, if the device does not have the BGMP (*,G) State and there exists a complete BGMP path to the root domain.

22. The device of claim 20, wherein the DBGMP protocol logic comprises:

means for detecting an active DVMRP (S,G) State; and means for creating a DBGMP (S,G) State and sending a DBGMP Join message to a next hop device towards the multicast source S, if the next hop device towards the multicast source S supports the extended BGMP protocol and the device does not have a BGMP (*,G) State, a B-(S,G) State, or a DBGMP (S,G) State.

23. The device of claim 20, wherein the device is a border device, and wherein the DBGMP protocol logic comprises:

means for creating a BGMP (S,G) State, setting the BGMP (S,G) incoming interface to "preferred," and sending a BGMP Join message to the next hop device toward the multicast source S, if the device is a border device for a domain associated with an (S,G) state, the multicast source S is in a remote domain, there exists a complete BGMP path to the source domain, and the device does not have a BGMP (*,G) State or a BGMP (S,G) State.

24. The device of claim 20, wherein the DBGMP protocol logic comprises:

means for receiving a BGMP Join message;

means for processing the BGMP Join message in accordance with the BGMP protocol;

means for deleting all DBGMP (*,G) and DBGMP (S,G) States;

means for setting the BGMP (S,G) incoming interface to "pruned," if a BGMP (S,G) State was created as a result of processing the BGMP Join message and the device has the BGMP (*,G) State;

means for setting the BGMP (S,G) incoming interface to "preferred," if a BGMP (S,G) State was created as a result of processing the BGMP Join message and the device does not have the BGMP (*,G) State;

means for setting each BGMP (S,G) incoming interface to "pruned," if a BGMP (*,G) State was created as a result of processing the BGMP Join message and the BGMP (*,G) parent target differs from the BGMP (S,G) parent target;

means for setting each DVMRP (S,G) incoming interface to "pruned," if a BGMP (*,G) State was created as a result of processing the BGMP Join message and the BGMP (*,G) parent target differs from the DVMRP (S,G) upstream neighboring device.

25. The device of claim 20, wherein the DBGMP protocol logic comprises:

means for receiving a DBGMP Join message for (*,G) from a child peer;

means for returning a DBGMP Root message to the child peer with the metric value set to zero (0) and adding the child peer to a child target list, if the device has a BGMP (*,G) State;

means for adding the child as a pending peer to the child target list, if the device does not have the BGMP (*,G) State and the device has a pending DBGMP (*,G) state;

means for returning a DBGMP Root message to the child peer with the metric value set to infinity, if the device does not have the BGMP (*,G) State or a pending DBGMP (*,G) state and either the device has a confirmed DBGMP (*,G) state or the next hop device towards the multicast group G does not support the extended BGMP protocol;

means for creating a BGMP (*,G) State, adding the child to the child target list, and returning a DBGMP Root message to the child peer with the metric value set to zero (0), if the device does not have the BGMP (*,G) State, the pending DBGMP (*,G) state, or the confirmed DBGMP (*,G) state, the next hop device towards the multicast group G supports the extended BGMP protocol, and the device is a border device for the root domain; and means for creating a DBGMP (*,G) State, forwarding a DBGMP Join message to the next hop device towards the multicast group G, and adding the child peer as a pending peer to the child target list, if the device does not have the BGMP (*,G) State, the pending DBGMP (*,G) state, or the confirmed DBGMP (*,G) state, the next hop device towards the multicast group G supports the extended BGMP protocol, and the device is not a border device for the root domain.

26. The device of claim 20, wherein the DBGMP protocol logic comprises:

means for receiving a DBGMP Join message for (S,G) from a child peer;

means for returning a DBGMP Root message to the child peer with the metric value equal to a BGMP Regional MD-Metric for (S,G) and adding the child peer to the child target list, if the device has a BGMP (S,G) State;

means for adding the child peer as a pending peer to the child target list, if the device does not have the BGMP (S,G) State and the device has a DBGMP (S,G) State;

means for creating a BGMP (S,G) State, setting the BGMP (S,G) incoming interface to "pruned," returning a DBGMP Root message to the child peer with the metric value equal to zero, and adding the child peer to the child target list, if the device does not have the BGMP (S,G) State or the DBGMP (S,G) State and the device has the BGMP (*,G) State;

means for creating a BGMP (S,G) State, setting the BGMP (S,G) incoming interface to "pruned," returning a DBGMP Root message to the child peer with the metric value equal to the device's metric value, and adding the child peer to the child target list, if the device does not have the BGMP (S,G) State, the DBGMP (S,G) State, or the BGMP (*,G) State and the next hop device towards the multicast source S does not support the extended BGMP protocol;

means for creating a BGMP (S,G) State, setting the BGMP (S,G) incoming interface to "pruned," returning a DBGMP Root message to the child peer with the metric value equal to zero, and adding the child peer to the child target list, if the device does not have the BGMP (S,G) State, the DBGMP (S,G) State, or the BGMP (*,G) State, the next hop device towards the multicast source S supports the extended BGMP protocol, and the device is a border device for the source domain; and means for creating a DBGMP (S,G) State, sending a DBGMP Join message to the next hop device towards the multicast source S, and adding the child peer as a pending peer to the child target list, if the device does not have the BGMP (S,G) State, the DBGMP (S,G) State, or the BGMP (*,G) State, the next hop device towards the multicast source S supports the extended BGMP protocol, and the device is not a border device for the source domain.

27. The device of claim 20, wherein the DBGMP protocol logic comprises:

means for receiving a DBGMP Root message for (*,G) from a parent peer;

means for determining whether the metric value in the DBGMP Root message is equal to infinity or zero;

if the metric value in the DBGMP Root message is equal to infinity:

means for changing a pending DBGMP (*,G) State into a confirmed DBGMP (*,G) State, if the device has the pending DBGMP (*,G) State;

means for creating a confirmed DBGMP (*,G) State, if the device does not have the pending DBGMP (*,G) State;

means for sending a DBGMP Join message to the parent target of each BGMP (S,G) State and deleting the BGMP (*,G) State, if the device has a BGMP (*,G) State;

means for sending a BGMP Prune message to the parent peer; and means for forwarding the DBGMP Root message to all child peers on the BGMP (*,G) child target list;

if the metric value in the DBGMP Root message is equal to zero:

means for deleting the DBGMP (*,G) State, if the device has the DBGMP (*,G) State;

means for creating a BGMP (*,G) State, if the device does not have the BGMP (*,G) State;

means for forwarding the DBGMP Root message to all pending peers in the child target list;

means for sending a BGMP Prune message to the BGMP (S,G) patent target and setting the BGMP (S,G) incoming interface to "pruned," if the device has a BGMP (S,G) State and the next hop peers toward the multicast source S and the multicast group G differ; and means for sending a DVMRP Prune message to the DVMRP (S,G) upstream neighboring device and setting the DVMRP (S,G) incoming interface to "pruned," if the device has a DVMRP (S,G) State and the BGMP (*,G) parent target is different than the DVMRP (S,G) upstream neighboring device; and means for clearing the pending status for all pending peers in the child target list, if the child target list includes any pending peers.

28. The device of claim 20, wherein the DBGMP protocol logic comprises:

means for receiving a DBGMP Root message for (S,G) from a parent peer;

if the metric value in the DBGMP Root message is greater than the device's metric to the multicast source S or if they are the same but the device's metric to the multicast source S is infinity:

means for forwarding the DBGMP Root message to each child peer in the child target list;

means for deleting any existing DBGMP (S,G) State;

means for deleting any existing BGMP (S,G) State;

means for sending a BGMP Prune message to the parent peer;

means for sending a DVMRP Graft message to the DVMRP (S,G) upstream neighboring device, if the DVMRP (S,G) incoming interface is considered to be "pruned" and the device does not have a BGMP (*,G) State; and means for setting the DVMRP (S,G) incoming interface to "preferred," if the device does not have a BGMP (*,G) State;

if the metric value in the DBGMP Root message is less than the device's metric to the multicast source S or if they are the same but the device's metric to the multicast source S is not infinity:

means for forwarding the DBGMP Root message to all pending peers in the child target list;

means for changing the DBGMP (S,G) State into a BGMP (S,G) State, if the device has the DBGMP (S,G) State;

means for creating a BGMP (S,G) State, if the device does not have the DBGMP (S,G) State;

means for sending a BGMP Prune message to the BGMP (S,G) parent target and setting the BGMP (S,G) incoming interface to "pruned," if the device has a BGMP (*,G) State and the next hop peers toward the multicast source S and the multicast group G differ; and means for setting the DVMRP (S,G) incoming interface to "deprecated," if the device has a DVMRP (S,G) State and the BGMP (S,G) parent target differs from DVMRP (S,G) upstream neighboring device; and means for clearing the pending status for all pending peers in the child target list, if the child target list includes any pending peers.

29. The device of claim 20, wherein the DBGMP protocol logic comprises:

means for receiving a first BGMP Prune message;

means for processing the first BGMP Prune message in accordance with the BGMP protocol; and if a BGMP (*,G) State is deleted as a result of processing the first BGMP Prune message:

means for sending a second BGMP Prune message to the BGMP (*,G) parent target;

means for sending a DBGMP Join message to the parent target of each of a number of BGMP (S,G) states;

means for sending a third BGMP Prune message to the BGMP (S,G) parent target, if there is no DVMRP downstream neighbor device and no BGMP child target for (S,G) and the BGMP (S,G) incoming interface is not considered to be "pruned;" and means for deleting the BGMP (S,G) State, if there is no DVMRP downstream neighbor device and no BGMP child target for (S,G).

30. The device of claim 20, wherein the DBGMP protocol logic comprises:

means for receiving a DVMRP Prune message;

means for processing the DVMRP Prune message in accordance with the DVMRP protocol;

means for sending a DVMRP Prune message to the DVMRP (S,G) upstream neighboring device, if the DVMRP (S,G) outgoing interface list became empty as a result of processing the DVMRP Prune message, there is no child target for (S,G), and the DVMRP (S,G) incoming interface is not considered to be "pruned;" and means for deleting the DVMRP (S,G) State, if the DVMRP (S,G) outgoing interface list became empty as a result of processing the DVMRP Prune message and there is no child target for (S,G).

31. The device of claim 20, wherein the DBGMP protocol logic comprises:

means for receiving a DVMRP Graft message;

means for adding outgoing interface(s) in accordance with the DVMRP protocol; and means for sending a DVMRP Graft message to the DVMRP (S,G) upstream neighboring device, if the DVMRP (S,G) outgoing interface list became empty as a result of processing the DVMRP Graft message.

32. The device of claim 20, wherein the DBGMP protocol logic comprises:

means for pruning from the BGMP Regional Tree and forming a new BGMP Regional Tree, if the metric value associated with the device is less than the metric value associated with the Regional BGMP Root.

33. The device of claim 32, wherein pruning from the BGMP Regional Tree and forming a new BGMP Regional Tree comprises:

means for sending a DBGMP Root message with the metric value equal to the device's metric value to each of the child peers associated with each of the BGMP (S,G) States;

means for sending a BGMP Prune message to the BGMP (S,G) parent target and setting the BGMP (S,G) incoming interface to "pruned," if the BGMP (S,G) incoming interface is not considered to be "pruned;" and means for sending a DVMRP Graft message to the DVMRP (S,G) upstream neighboring device and setting the DVMRP (S,G) incoming interface to "preferred," if the DVMRP (S,G) incoming interface is considered to be "pruned."

34. The device of claim 20, wherein the DBGMP protocol logic comprises:

means for detecting a BGMP routing change;

means for changing from a Regional BGMP Root to a BGMP child; and means for sending a DBGMP Root message to the child peers associated with each BGMP (S,G) State, wherein the DBGMP Root message includes a metric value equal to a new BGMP Regional MD-Metric for (S,G).

35. The device of claim 20, wherein the DBGMP protocol logic comprises:

means for detecting a BGMP routing change;

means for changing from a BGMP child to a Regional BGMP Root; and means for sending a DBGMP Root message to the child peers associated with each BGMP (S,G) State, wherein the DBGMP Root message includes a metric value equal to the device's metric value.

36. The device of claim 20, wherein the device is not an Mbone DVMRP node, and wherein the DBGMP protocol logic further comprises:
means for receiving a multicast packet for the (S,G) pair; and
means for processing the multicast packet in accordance with the BGMP protocol.

37. The device of claim 21, wherein the device is an Mbone DVMRP node, and wherein the DBGMP protocol logic further comprises:
means for receiving a multicast packet for the (S,G) pair;
if the device does not have a DVMRP (S,G) State and the multicast packet was received from a DVMRP upstream neighboring device:
means for creating a DVMRP (S,G) State;
means for dropping the multicast packet, sending a DVMRP Prune message to the DVMRP (S,G) upstream neighboring device, and setting the DVMRP (S,G) incoming interface to "pruned," if the device has a BGMP (*,G) State;
means for dropping the multicast packet, sending a DVMRP Prune message to the DVMRP (S,G) upstream neighboring device, and setting the DVMRP (S,G) incoming interface to "pruned," if the device does not have the BGMP (*,G) State and the BGMP (S,G) incoming interface is considered to be "preferred;" and
means for processing the multicast packet in accordance with the DVMRP protocol, setting the DVMRP (S,G) incoming interface to "preferred," and starting a downstream assert timer, if the device does not have the BGMP (*,G) State and the BGMP (S,G) incoming interface is not considered to be "preferred;"
if the device has the DVMRP (S,G) State and the DVMRP (S,G) incoming interface is considered to be "pruned":
means for processing the multicast packet in accordance with the BGMP protocol; and
means for forwarding a copy of the multicast packet to each DVMRP (S,G) downstream neighboring device, if the device accepts the multicast packet as a result of processing the multicast packet in accordance with the BGMP protocol;
if the device has a BGMP (*,G) State and either the device does not have the DVMRP (S,G) State and the multicast packet was not received from the DVMRP upstream neighboring device or the device has the DVMRP (S,G) State and the DVMRP (S,G) incoming interface is not considered to be "pruned":
means for processing the multicast packet in accordance with the BGMP protocol;
means for setting all BGMP (S,G) incoming interfaces to "pruned;"
means for setting all DVMRP (S,G) incoming interfaces to "pruned;" and
means for forwarding a copy of the multicast packet to each DVMRP (S,G) downstream neighboring device, if the device accepts the multicast packet as a result of processing the multicast packet in accordance with the BGMP protocol;
if the device does not have a BGMP (S,G) State, the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
means for processing the multicast packet in accordance with the DVMRP protocol; and
means for forwarding the multicast packet to a next hop device, if the device accepts the multicast packet as a result of processing the multicast packet in accordance with the DVMRP protocol, there exists a multicast route for the multicast group G, and the BGMP next hop device towards the multicast group G differs from the DVMRP (S,G) upstream neighboring device;
if the device has the BGMP (S,G) State, the BGMP (S,G) incoming interface is considered to be "pruned," the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
means for processing the multicast packet in accordance with the DVMRP protocol; and
means for forwarding the multicast packet to each BGMP (S,G) child peer, if the device accepts the multicast packet as a result of processing the multicast packet in accordance with the DVMRP protocol; and
if the device has the BGMP (S,G) State, the BGMP (S,G) incoming interface is not considered to be "pruned," the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
means for accepting the multicast packet;
means for forwarding the multicast packet to each DVMRP (S,G) downstream neighboring device;
means for forwarding the multicast packet to each BGMP (S,G) child peer;
means for sending a DVMRP Prune message to the DVMRP (S,G) upstream neighboring device and setting the DVMRP (S,G) incoming interface to "pruned," if the DVMRP (S,G) upstream neighboring device differs from the BGMP (S,G) parent target, the multicast packet was received from the BGMP (S,G) parent target, the BGMP (S,G) incoming interface is considered to be "preferred," and the DVMRP (S,G) incoming interface is considered to be "deprecated;" and
means for sending a BGMP Prune message to the BGMP (S,G) parent target and setting the BGMP (S,G) incoming interface to "pruned," if the DVMRP (S,G) upstream neighboring device differs from the BGMP (S,G) parent target, the multicast packet was received from the DVMRP (S,G) upstream neighboring device, the DVMRP (S,G) incoming interface is considered to be "preferred," and the BGMP (S,G) incoming interface is considered to be "deprecated."

38. The device of claim 37, further comprising:
means for determining that the downstream assert timer expired; and
means for sending a DBGMP Join message upstream in the BGMP Regional Tree if and only if the list of outgoing interfaces associated with the DVMRP (S,G) State is not empty.

39. A program product comprising a computer readable medium having embodied therein a computer program for transitioning a multicast communication network from Distance Vector Multicast Routing Protocol (DVMRP) to Border Gateway Multicast Protocol (BGMP), the computer program comprising protocol logic including extended BGMP (DBGMP) protocol logic and optionally including DVMRP protocol logic, wherein the DVMRP protocol logic defines at least a DVMRP (S,G) State, a DVMRP Graft message, and a DVMRP Prune message, and wherein the DBGMP logic defines at least a BGMP (*,G) State, a BGMP (S,G) State, a BGMP Join message, a BGMP Prune message, a pending DBGMP (*,G) State for a multicast group G, a confirmed DBGMP (*,G) State for the multicast group G, a DBGMP (S,G) State for a multicast source S and the multicast group G, a DBGMP Join message, and a DBGMP Root message including a metric field.

40. The program product of claim 39, wherein the DBGMP protocol logic comprises:
computer readable program code means for learning a multicast route for the multicast group G using a BGMP mechanism;
computer readable program code means for creating a pending DBGMP (*,G) State and sending a DBGMP Join message to a next hop device towards the multicast group G, if the device does not have a BGMP (*,G) State, there does not exist a complete BGMP path to the root domain, and the device does not have a DBGMP (*,G) State; and
computer readable program code means for creating the BGMP (*,G) State, sending a BGMP Join message to a next hop device towards the multicast group G, sending a BGMP Prune message and setting the BGMP (S,G) incoming interface to "pruned" for each BGMP (S,G) State that has an unpruned incoming interface and also has a different parent target that the BGMP (*,G) parent target, and sending a DVMRP Prune message to a DVMRP upstream neighboring device and setting the DVMRP (S,G) incoming interface to "pruned" for each DVMRP (S,G) that has an unpruned incoming interface and also has an upstream neighboring device that differs from the BGMP (*,G) parent target, if the device does not have the BGMP (*,G) State and there exists a complete BGMP path to the root domain.

41. The program product of claim 39, wherein the DBGMP protocol logic comprises:
computer readable program code means for detecting an active DVMRP (S,G) State; and
computer readable program code means for creating a DBGMP (S,G) State and sending a DBGMP Join message to a next hop device towards the multicast source S, if the next hop device towards the multicast source S supports the extended BGMP protocol and the device does not have a BGMP (*,G) State, a B-(S,G) State, or a DBGMP (S,G) State.

42. The program product of claim 39, wherein the device is a border device, and wherein the DBGMP protocol logic comprises:
computer readable program code means for creating a BGMP (S,G) State, setting the BGMP (S,G) incoming interface to "preferred," and sending a BGMP Join message to the next hop device toward the multicast source S, if the device is a border device for a domain associated with an (S,G) state, the multicast source S is in a remote domain, there exists a complete BGMP path to the source domain, and the device does not have a BGMP (*,G) State or a BGMP (S,G) State.

43. The program product of claim 39, wherein the DBGMP protocol logic comprises:
computer readable program code means for receiving a BGMP Join message;
computer readable program code means for processing the BGMP Join message in accordance with the BGMP protocol;
computer readable program code means for deleting all DBGMP (*,G) and DBGMP (S,G) States;
computer readable program code means for setting the BGMP (S,G) incoming interface to "pruned," if a BGMP (S,G) State was created as a result of processing the BGMP Join message and the device has the BGMP (*,G) State;
computer readable program code means for setting the BGMP (S,G) incoming interface to "preferred," if a BGMP (S,G) State was created as a result of processing the BGMP Join message and the device does not have the BGMP (*,G) State;
computer readable program code means for setting each BGMP (S,G) incoming interface to "pruned," if a BGMP (*,G) State was created as a result of processing the BGMP Join message and the BGMP (*,G) parent target differs from the BGMP (S,G) parent target;
computer readable program code means for setting each DVMRP (S,G) incoming interface to "pruned," if a BGMP (*,G) State was created as a result of processing the BGMP Join message and the BGMP (*,G) parent target differs from the DVMRP (S,G) upstream neighboring device.

44. The program product of claim 39, wherein the DBGMP protocol logic comprises:
computer readable program code means for receiving a DBGMP Join message for (*,G) from a child peer;
computer readable program code means for returning a DBGMP Root message to the child peer with the metric value set to zero (0) and adding the child peer to a child target list, if the device has a BGMP (*,G) State;
computer readable program code means for adding the child as a pending peer to the child target list, if the device does not have the BGMP (*,G) State and the device has a pending DBGMP (*,G) state;
computer readable program code means for returning a DBGMP Root message to the child peer with the metric value set to infinity, if the device does not have the BGMP (*,G) State or a pending DBGMP (*,G) state and either the device has a confirmed DBGMP (*,G) state or the next hop device towards the multicast group G does not support the extended BGMP protocol;
computer readable program code means for creating a BGMP (*,G) State, adding the child to the child target list, and returning a DBGMP Root message to the child peer with the metric value set to zero (0), if the device does not have the BGMP (*,G) State, the pending DBGMP (*,G) state, or the confirmed DBGMP (*,G) state, the next hop device towards the multicast group G supports the extended BGMP protocol, and the device is a border device for the root domain; and
computer readable program code means for creating a DBGMP (*,G) State, forwarding a DBGMP Join message to the next hop device towards the multicast group G, and adding the child peer as a pending peer to the child target list, if the device does not have the BGMP (*,G) State, the pending DBGMP (*,G) state, or the confirmed DBGMP (*,G) state, the next hop device towards the multicast group G supports the extended BGMP protocol, and the device is not a border device for the root domain.

45. The program product of claim 39, wherein the DBGMP protocol logic comprises:

computer readable program code means for receiving a DBGMP Join message for (S,G) from a child peer;

computer readable program code means for returning a DBGMP Root message to the child peer with the metric value equal to a BGMP Regional MD-Metric for (S,G) and adding the child peer to the child target list, if the device has a BGMP (S,G) State;

computer readable program code means for adding the child peer as a pending peer to the child target list, if the device does not have the BGMP (S,G) State and the device has a DBGMP (S,G) State;

computer readable program code means for creating a BGMP (S,G) State, setting the BGMP (S,G) incoming interface to "pruned," returning a DBGMP Root message to the child peer with the metric value equal to zero, and adding the child peer to the child target list, if the device does not have the BGMP (S,G) State or the DBGMP (S,G) State and the device has the BGMP (*,G) State;

computer readable program code means for creating a BGMP (S,G) State, setting the BGMP (S,G) incoming interface to "pruned," returning a DBGMP Root message to the child peer with the metric value equal to the device's metric value, and adding the child peer to the child target list, if the device does not have the BGMP (S,G) State, the DBGMP (S,G) State, or the BGMP (*,G) State and the next hop device towards the multicast source S does not support the extended BGMP protocol;

computer readable program code means for creating a BGMP (S,G) State, setting the BGMP (S,G) incoming interface to "pruned," returning a DBGMP Root message to the child peer with the metric value equal to zero, and adding the child peer to the child target list, if the device does not have the BGMP (S,G) State, the DBGMP (S,G) State, or the BGMP (*,G) State, the next hop device towards the multicast source S supports the extended BGMP protocol, and the device is a border device for the source domain; and computer readable program code means for creating a DBGMP (S,G) State, sending a DBGMP Join message to the next hop device towards the multicast source S, and adding the child peer as a pending peer to the child target list, if the device does not have the BGMP (S,G) State, the DBGMP (S,G) State, or the BGMP (*,G) State, the next hop device towards the multicast source S supports the extended BGMP protocol, and the device is not a border device for the source domain.

46. The program product of claim 39, wherein the DBGMP protocol logic comprises:

computer readable program code means for receiving a DBGMP Root message for (*,G) from a parent peer;

computer readable program code means for determining whether the metric value in the DBGMP Root message is equal to infinity or zero;

if the metric value in the DBGMP Root message is equal to infinity:

computer readable program code means for changing a pending DBGMP (*,G) State into a confirmed DBGMP (*,G) State, if the device has the pending DBGMP (*,G) State;

computer readable program code means for creating a confirmed DBGMP (*,G) State, if the device does not have the pending DBGMP (*,G) State;

computer readable program code means for sending a DBGMP Join message to the parent target of each BGMP (S,G) State and deleting the BGMP (*,G) State, if the device has a BGMP (*,G) State;

computer readable program code means for sending a BGMP Prune message to the parent peer; and computer readable program code means for forwarding the DBGMP Root message to all child peers on the BGMP (*,G) child target list;

if the metric value in the DBGMP Root message is equal to zero:

computer readable program code means for deleting the DBGMP (*,G) State, if the device has the DBGMP (*,G) State;

computer readable program code means for creating a BGMP (*,G) State, if the device does not have the BGMP (*,G) State;

computer readable program code means for forwarding the DBGMP Root message to all pending peers in the child target list;

computer readable program code means for sending a BGMP Prune message to the BGMP (S,G) patent target and setting the BGMP (S,G) incoming interface to "pruned," if the device has a BGMP (S,G) State and the next hop peers toward the multicast source S and the multicast group G differ; and computer readable program code means for sending a DVMRP Prune message to the DVMRP (S,G) upstream neighboring device and setting the DVMRP (S,G) incoming interface to "pruned," if the device has a DVMRP (S,G) State and the BGMP (*,G) parent target is different than the DVMRP (S,G) upstream neighboring device; and computer readable program code means for clearing the pending status for all pending peers in the child target list, if the child target list includes any pending peers.

47. The program product of claim 39, wherein the DBGMP protocol logic comprises:

computer readable program code means for receiving a DBGMP Root message for (S,G) from a parent peer;

if the metric value in the DBGMP Root message is greater than the device's metric to the multicast source S or if they are the same but the device's metric to the multicast source S is infinity:

computer readable program code means for forwarding the DBGMP Root message to each child peer in the child target list;

computer readable program code means for deleting any existing DBGMP (S,G) State;

computer readable program code means for deleting any existing BGMP (S,G) State;

computer readable program code means for sending a BGMP Prune message to the parent peer;

computer readable program code means for sending a DVMRP Graft message to the DVMRP (S,G) upstream neighboring device, if the DVMRP (S,G) incoming interface is considered to be "pruned" and the device does not have a BGMP (*,G) State; and computer readable program code means for setting the DVMRP (S,G) incoming interface to "preferred," if the device does not have a BGMP (*,G) State;

if the metric value in the DBGMP Root message is less than the device's metric to the multicast source S or if they are the same but the device's metric to the multicast source S is not infinity:

computer readable program code means for forwarding the DBGMP Root message to all pending peers in the child target list;

computer readable program code means for changing the DBGMP (S,G) State into a BGMP (S,G) State, if the device has the DBGMP (S,G) State;

computer readable program code means for creating a BGMP (S,G) State, if the device does not have the DBGMP (S,G) State;

computer readable program code means for sending a BGMP Prune message to the BGMP (S,G) parent target and setting the BGMP (S,G) incoming interface to "pruned," if the device has a BGMP (*,G) State and the next hop peers toward the multicast source S and the multicast group G differ; and computer readable program code means for setting the DVMRP (S,G) incoming interface to "deprecated," if the device has a DVMRP (S,G) State and the BGMP (S,G) parent target differs from DVMRP (S,G) upstream neighboring device; and computer readable program code means for clearing the pending status for all pending peers in the child target list, if the child target list includes any pending peers.

48. The program product of claim 39, wherein the DBGMP protocol logic comprises:

computer readable program code means for receiving a first BGMP Prune message;

computer readable program code means for processing the first BGMP Prune message in accordance with the BGMP protocol; and if a BGMP (*,G) State is deleted as a result of processing the first BGMP Prune message:

computer readable program code means for sending a second BGMP Prune message to the BGMP (*,G) parent target;

computer readable program code means for sending a DBGMP Join message to the parent target of each of a number of BGMP (S,G) states;

computer readable program code means for sending a third BGMP Prune message to the BGMP (S,G) parent target, if there is no DVMRP downstream neighbor device and no BGMP child target for (S,G) and the BGMP (S,G) incoming interface is not considered to be "pruned;" and computer readable program code means for deleting the BGMP (S,G) State, if there is no DVMRP downstream neighbor device and no BGMP child target for (S,G).

49. The program product of claim 39, wherein the DBGMP protocol logic comprises:

computer readable program code means for receiving a DVMRP Prune message;

computer readable program code means for processing the DVMRP Prune message in accordance with the DVMRP protocol;

computer readable program code means for sending a DVMRP Prune message to the DVMRP (S,G) upstream neighboring device, if the DVMRP (S,G) outgoing interface list became empty as a result of processing the DVMRP Prune message, there is no child target for (S,G), and the DVMRP (S,G) incoming interface is not considered to be "pruned;" and computer readable program code means for deleting the DVMRP (S,G) State, if the DVMRP (S,G) outgoing interface list became empty as a result of processing the DVMRP Prune message and there is no child target for (S,G).

50. The program product of claim 39, wherein the DBGMP protocol logic comprises:

computer readable program code means for receiving a DVMRP Graft message;

computer readable program code means for adding outgoing interface(s) in accordance with the DVMRP protocol; and computer readable program code means for sending a DVMRP Graft message to the DVMRP (S,G) upstream neighboring device, if the DVMRP (S,G) outgoing interface list became empty as a result of processing the DVMRP Graft message.

51. The program product of claim 39, wherein the DBGMP protocol logic comprises:

computer readable program code means for pruning from the BGMP Regional Tree and forming a new BGMP Regional Tree, if the metric value associated with the device is less than the metric value associated with the Regional BGMP Root.

52. The program product of claim 51, wherein pruning from the BGMP Regional Tree and forming a new BGMP Regional Tree comprises:

computer readable program code means for sending a DBGMP Root message with the metric value equal to the device's metric value to each of the child peers associated with each of the BGMP (S,G) States;

computer readable program code means for sending a BGMP Prune message to the BGMP (S,G) parent target and setting the BGMP (S,G) incoming interface to "pruned," if the BGMP (S,G) incoming interface is not considered to be "pruned;" and computer readable program code means for sending a DVMRP Graft message to the DVMRP (S,G) upstream neighboring device and setting the DVMRP (S,G) incoming interface to "preferred," if the DVMRP (S,G) incoming interface is considered to be "pruned."

53. The program product of claim 39, wherein the DBGMP protocol logic comprises:

computer readable program code means for detecting a BGMP routing change;

computer readable program code means for changing from a Regional BGMP Root to a BGMP child; and computer readable program code means for sending a DBGMP Root message to the child peers associated with each BGMP (S,G) State, wherein the DBGMP Root message includes a metric value equal to a new BGMP Regional MD-Metric for (S,G).

54. The program product of claim 39, wherein the DBGMP protocol logic comprises:

computer readable program code means for detecting a BGMP routing change;

computer readable program code means for changing from a BGMP child to a Regional BGMP Root; and computer readable program code means for sending a DBGMP Root message to the child peers associated with each BGMP (S,G) State, wherein the DBGMP Root message includes a metric value equal to the device's metric value.

55. The program product of claim 39, wherein the device is not an Mbone DVMRP node, and wherein the DBGMP protocol logic further comprises:
  computer readable program code means for receiving a multicast packet for the (S,G) pair; and
  computer readable program code means for processing the multicast packet in accordance with the BGMP protocol.

56. The program product of claim 39, wherein the device is an Mbone DVMRP node, and wherein the DBGMP protocol logic further comprises:
  computer readable program code means for receiving a multicast packet for the (S,G) pair;
  if the device does not have a DVMRP (S,G) State and the multicast packet was received from a DVMRP upstream neighboring device:
    computer readable program code means for creating a DVMRP (S,G) State;
    computer readable program code means for dropping the multicast packet, sending a DVMRP Prune message to the DVMRP (S,G) upstream neighboring device, and setting the DVMRP (S,G) incoming interface to "pruned," if the device has a BGMP (*,G) State;
    computer readable program code means for dropping the multicast packet, sending a DVMRP Prune message to the DVMRP (S,G) upstream neighboring device, and setting the DVMRP (S,G) incoming interface to "pruned," if the device does not have the BGMP (*,G) State and the BGMP (S,G) incoming interface is considered to be "preferred;" and
    computer readable program code means for processing the multicast packet in accordance with the DVMRP protocol, setting the DVMRP (S,G) incoming interface to "preferred," and starting a downstream assert timer, if the device does not have the BGMP (*,G) State and the BGMP (S,G) incoming interface is not considered to be "preferred;"
  if the device has the DVMRP (S,G) State and the DVMRP (S,G) incoming interface is considered to be "pruned":
    computer readable program code means for processing the multicast packet in accordance with the BGMP protocol; and
    computer readable program code means for forwarding a copy of the multicast packet to each DVMRP (S,G) downstream neighboring device, if the device accepts the multicast packet as a result of processing the multicast packet in accordance with the BGMP protocol;
  if the device has a BGMP (*,G) State and either the device does not have the DVMRP (S,G) State and the multicast packet was not received from the DVMRP upstream neighboring device or the device has the DVMRP (S,G) State and the DVMRP (S,G) incoming interface is not considered to be "pruned":
    computer readable program code means for processing the multicast packet in accordance with the BGMP protocol;
    computer readable program code means for setting all BGMP (S,G) incoming interfaces to "pruned;"
    computer readable program code means for setting all DVMRP (S,G) incoming interfaces to "pruned;" and
    computer readable program code means for forwarding a copy of the multicast packet to each DVMRP (S,G) downstream neighboring device, if the device accepts the multicast packet as a result of processing the multicast packet in accordance with the BGMP protocol;
  if the device does not have a BGMP (S,G) State, the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
    computer readable program code means for processing the multicast packet in accordance with the DVMRP protocol; and
    computer readable program code means for forwarding the multicast packet to a next hop device, if the device accepts the multicast packet as a result of processing the multicast packet in accordance with the DVMRP protocol, there exists a multicast route for the multicast group G, and the BGMP next hop device towards the multicast group G differs from the DVMRP (S,G) upstream neighboring device;
  if the device has the BGMP (S,G) State, the BGMP (S,G) incoming interface is considered to be "pruned," the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
    computer readable program code means for processing the multicast packet in accordance with the DVMRP protocol; and
    computer readable program code means for forwarding the multicast packet to each BGMP (S,G) child peer, if the device accepts the multicast packet as a result of processing the multicast packet in accordance with the DVMRP protocol; and
  if the device has the BGMP (S,G) State, the BGMP (S,G) incoming interface is not considered to be "pruned," the device does not have the BGMP (*,G) State, and either the device does not have the DVMRP (S,G) State and the multicast packet was not received from the DVMRP upstream neighboring device or the device has the DVMRP (S,G) State and the DVMRP (S,G) incoming interface is not considered to be "pruned":
    computer readable program code means for accepting the multicast packet;
    computer readable program code means for forwarding the multicast packet to each DVMRP (S,G) downstream neighboring device;
    computer readable program code means for forwarding the multicast packet to each BGMP (S,G) child peer;
    computer readable program code means for sending a DVMRP Prune message to the DVMRP (S,G) upstream neighboring device and setting the DVMRP (S,G) incoming interface to "pruned," if the DVMRP (S,G) upstream neighboring device differs from the BGMP (S,G) parent target, the multicast packet was received from the BGMP (S,G) parent target, the BGMP (S,G) incoming interface is considered to be "preferred," and the DVMRP (S,G) incoming interface is considered to be "deprecated;" and
    computer readable program code means for sending a BGMP Prune message to the BGMP (S,G) parent target and setting the BGMP (S,G) incoming interface to "pruned," if the DVMRP (S,G) upstream neighboring device differs from the BGMP (S,G) parent target, the multicast packet was received from the DVMRP (S,G) upstream neighboring device, the DVMRP (S,G) incoming interface is considered to be "preferred," and the BGMP (S,G) incoming interface is considered to be "deprecated."

57. The program product of claim 56, further comprising:
  computer readable program code means for determining that the downstream assert timer expired; and computer readable program code means for sending a DBGMP Join message upstream in the BGMP Regional Tree if and only if the list of outgoing interfaces associated with the DVMRP (S,G) State is not empty.

58. A multicast communication system comprising a plurality of interconnected routers, each router running at least a routing protocol, wherein at least one of said routers runs an extended BGMP (DBGMP) protocol that defines at least a BGMP (*,G) State, a BGMP (S,G) State, a BGMP Join message, a BGMP Prune message, a pending DBGMP (*,G) State for a multicast group G, a confirmed DBGMP (*,G) State for the multicast group G, a DBGMP (S,G) State for a multicast source S and the multicast group G, a DBGMP Join message, and a DBGMP Root message including a metric field.

* * * * *